(12) United States Patent
Kiriyama

(10) Patent No.: US 11,510,140 B2
(45) Date of Patent: Nov. 22, 2022

(54) INFORMATION PROCESSING APPARATUS AND INFORMATION PROCESSING METHOD

(71) Applicant: SONY CORPORATION, Tokyo (JP)

(72) Inventor: Sawako Kiriyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,703

(22) PCT Filed: Aug. 20, 2019

(86) PCT No.: PCT/JP2019/032354
§ 371 (c)(1),
(2) Date: Feb. 22, 2021

(87) PCT Pub. No.: WO2020/049996
PCT Pub. Date: Mar. 12, 2020

(65) Prior Publication Data
US 2021/0195514 A1    Jun. 24, 2021

(30) Foreign Application Priority Data
Sep. 3, 2018   (JP) .............................. JP2018-164371

(51) Int. Cl.
*H04W 48/20*      (2009.01)
*H04B 17/336*   (2015.01)
(Continued)

(52) U.S. Cl.
CPC .......... *H04W 48/20* (2013.01); *H04B 17/336* (2015.01); *G16Y 30/00* (2020.01)

(58) Field of Classification Search
CPC . H04W 48/20; H04W 36/00835; H04W 4/70; H04B 17/336; G16Y 30/00
See application file for complete search history.

(56) References Cited

U.S. PATENT DOCUMENTS

2011/0151867 A1* 6/2011 Hirano ................ H04W 48/16
455/434
2012/0208571 A1* 8/2012 Park ...................... H04W 4/02
455/466
(Continued)

FOREIGN PATENT DOCUMENTS

JP   2017-034303 A   2/2017
JP   2017-535173 A   11/2017

OTHER PUBLICATIONS

International Search Report and Written Opinion of PCT Application No. PCT/JP2019/032354, dated Nov. 12, 2019, 21 pages of ISRWO.

*Primary Examiner* — Harry H Kim
(74) *Attorney, Agent, or Firm* — Chip Law Group

(57) ABSTRACT

The present technology relates to an information processing apparatus and an information processing method that enable a base station to appropriately determine a terminal in charge of receiving processing. Priority of a base station in charge of receiving processing of the terminal among base stations that have received a connection request from the terminal is set for each of a plurality of terminals, and a charged terminal in charge of the receiving processing is determined for each of a plurality of base stations according to the priority of the base station. The present technology can be applied to, for example, a wireless communication system in which a terminal and a base station perform wireless communication.

15 Claims, 45 Drawing Sheets

(51) Int. Cl.
  *G16Y 30/00*   (2020.01)
  *H04W 36/00*   (2009.01)
  *H04W 4/70*    (2018.01)

(56) References Cited

U.S. PATENT DOCUMENTS

2017/0085695 A1* 3/2017 Giesner .................. H04W 4/70
2017/0094014 A1* 3/2017 Nakatsukasa ........... H04L 67/60
2018/0041337 A1* 2/2018 Zhang .................. H04L 9/0816
2020/0084708 A1* 3/2020 Ingale .................. H04W 48/02

* cited by examiner

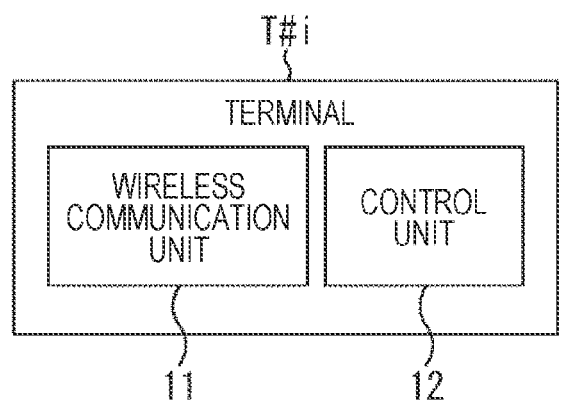
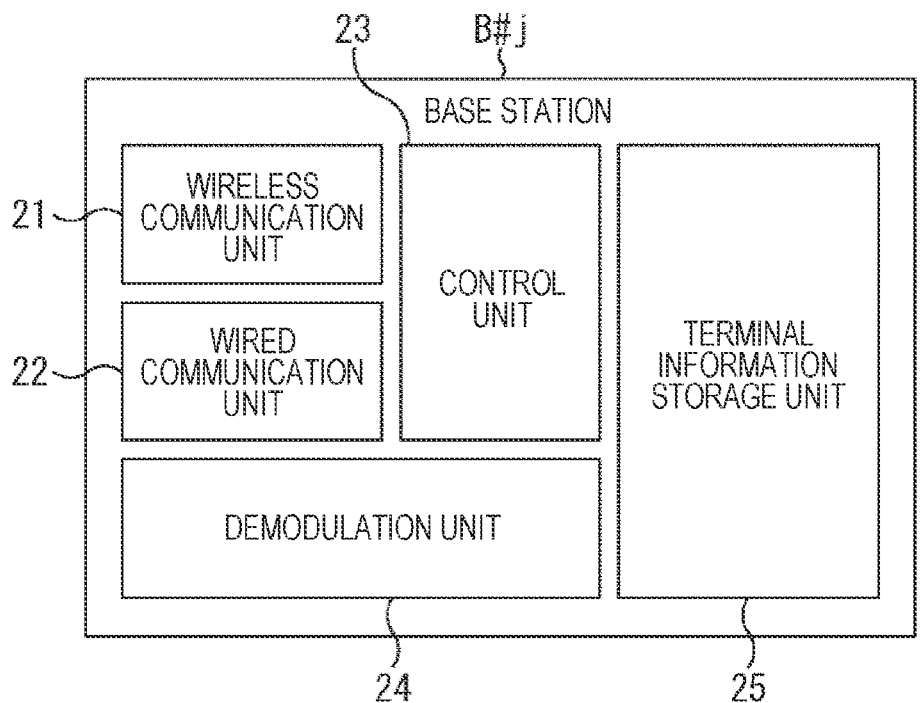

FIG. 8

CONNECTION REQUEST LIST

| TERMINAL ID | BASE STATION B#| |
|---|---|
| | SINR |
| 1 | XXX |
| 2 | XXX |
| 2 | XXX |

DETERMINATION LIST

| TERMINAL ID | BASE STATION B#| |
|---|---|
| | SINR |
| 2 | XXX |
| 5 | XXX |
| 6 | XXX |

CANDIDATE LIST

| TERMINAL ID | BASE STATION B#| | |
|---|---|---|---|
| | SINR | PRIORITY | ... |
| 1 | XXX | 1 | XXX |
| 2 | XXX | 1 | XXX |
| 3 | XXX | 2 | XXX |
| 4 | XXX | 2 | XXX |
| 5 | XXX | 2 | XXX |
| 6 | XXX | 3 | XXX |

FIG. 17

NUMBER OF TERMINALS FOR WHICH PRIORITY OF BASE STATION B#j IS FIRST

NUMBER OF TERMINALS FOR WHICH PRIORITY OF BASE STATION B#j IS SECOND

NUMBER OF TERMINALS FOR WHICH PRIORITY OF BASE STATION B#j IS THIRD

| BASE STATION | 1st | 2nd | 3rd |
|---|---|---|---|
| BASE STATION B1 | 180 | 20 | 100 |
| BASE STATION B2 | 80 | 120 | 100 |
| BASE STATION B3 | 40 | 160 | 100 |

UPPER LIMIT NUMBER OF CHARGED TERMINALS

FIG. 18

PENDING LIST

BASE STATION B#j

| TERMINAL ID | SINR |
|---|---|
| 1 | XXX |
| 3 | XXX |
| 4 | XXX |
| 7 | XXX |

CANDIDATE LIST
BASE STATION B1

| TERMINAL ID | SINR | PRIORITY |
|---|---|---|
| 1 | 3.0dB | 1 |
| 2 | 1.5dB | 1 |
| 3 | -2.0dB | 1 |

DETERMINATION LIST
BASE STATION B1

| TERMINAL ID | SINR |
|---|---|
|  |  |

PENDING LIST
BASE STATION B1

| TERMINAL ID | SINR |
|---|---|
|  |  |

AFTER CHARGED TERMINAL DISTRIBUTION PROCESSING
FOR TERMINAL OF FIRST PRIORITY

CANDIDATE LIST
BASE STATION B1

| TERMINAL ID | SINR | PRIORITY |
|---|---|---|
| 1 | 3.0dB | 1 |
| 2 | 1.5dB | 1 |
| 3 | -2.0dB | 1 |

DETERMINATION LIST
BASE STATION B1

| TERMINAL ID | SINR |
|---|---|
| 1 | 3.0dB |

PENDING LIST
BASE STATION B1

| TERMINAL ID | SINR |
|---|---|
|  |  |

AFTER CHARGED TERMINAL DISTRIBUTION PROCESSING
FOR TERMINAL OF SECOND PRIORITY

CANDIDATE LIST
BASE STATION B1

| TERMINAL ID | SINR | PRIORITY |
|---|---|---|
| 1 | 3.0dB | 1 |
| 2 | 1.5dB | 1 |
| 3 | -2.0dB | 1 |

DETERMINATION LIST
BASE STATION B1

| TERMINAL ID | SINR |
|---|---|
| 1 | 3.0dB |

PENDING LIST
BASE STATION B1

| TERMINAL ID | SINR |
|---|---|
|  |  |

AFTER CHARGED TERMINAL DISTRIBUTION PROCESSING
FOR TERMINAL OF THIRD PRIORITY

CANDIDATE LIST
BASE STATION B1

| TERMINAL ID | SINR | PRIORITY |
|---|---|---|
| 1 | 3.0dB | 1 |
| 2 | 1.5dB | 1 |
| 3 | -2.0dB | 1 |

DETERMINATION LIST
BASE STATION B1

| TERMINAL ID | SINR |
|---|---|
| 1 | 3.0dB |

PENDING LIST
BASE STATION B1

| TERMINAL ID | SINR |
|---|---|
|  |  |

FIG. 26

| CANDIDATE LIST ||||
|---|---|---|---|
| BASE STATION B#j ||||
| TERMINAL ID | SINR | PRIORITY | LOWER ORDER INFORMATION |
| 1 | XXX | 1 | true |
| 2 | XXX | 1 | true |
| 3 | XXX | 2 | false |
| 4 | XXX | 2 | true |
| 5 | XXX | 2 | true |
| 6 | XXX | 3 | true |

FIG. 34

| CANDIDATE LIST ||||| 
|---|---|---|---|---|
| BASE STATION B# |||||
| TERMINAL ID | SINR | PRIORITY | LOWER ORDER INFORMATION | REGISTRABILITY INFORMATION |
| 3 | 1.0dB | 1 | false | |
| 4 | 0.3dB | 1 | true | |
| 2 | -2.9dB | 1 | true | |
| 1 | -3.1dB | 1 | true | |

CANDIDATE LIST

| BASE STATION B1 | | | |
|---|---|---|---|
| TERMINAL ID | SINR | PRIORITY | LOWER ORDER INFORMATION |
| 1 | 3.0dB | 1 | false |
| 2 | 1.5dB | 1 | true |
| 3 | -2.0dB | 1 | true |

DETERMINATION LIST

| BASE STATION B1 | |
|---|---|
| TERMINAL ID | SINR |
| | |
| | |

PENDING LIST

| BASE STATION B1 | |
|---|---|
| TERMINAL ID | SINR |
| | |

S342 TO S354

CANDIDATE LIST

| BASE STATION B1 | | | |
|---|---|---|---|
| TERMINAL ID | SINR | PRIORITY | LOWER ORDER INFORMATION |
| 1 | 3.0dB | 1 | false |
| 2 | 1.5dB | 1 | true |
| 3 | -2.0dB | 1 | true |

DETERMINATION LIST

| BASE STATION B1 | |
|---|---|
| TERMINAL ID | SINR |
| 1 | 3.0dB |
| 2 | 1.5dB |

PENDING LIST

| BASE STATION B1 | |
|---|---|
| TERMINAL ID | SINR |
| | |

S355 TO S358

CANDIDATE LIST

| BASE STATION B1 | | | |
|---|---|---|---|
| TERMINAL ID | SINR | PRIORITY | LOWER ORDER INFORMATION |
| 1 | 3.0dB | 1 | false |
| 2 | 1.5dB | 1 | true |
| 3 | -2.0dB | 1 | true |

DETERMINATION LIST

| BASE STATION B1 | |
|---|---|
| TERMINAL ID | SINR |
| 1 | 3.0dB |
| 2 | 1.5dB |

PENDING LIST

| BASE STATION B1 | |
|---|---|
| TERMINAL ID | SINR |
| | |

CANDIDATE LIST

| BASE STATION B2 | | | |
|---|---|---|---|
| TERMINAL ID | SINR | PRIORITY | LOWER ORDER INFORMATION |
| 4 | 2.0dB | 1 | false |
| 5 | 0.5dB | 1 | false |
| 3 | −3.0dB | 2 | false |

DETERMINATION LIST

| BASE STATION B2 | |
|---|---|
| TERMINAL ID | SINR |
| | |
| | |

PENDING LIST

| BASE STATION B2 | |
|---|---|
| TERMINAL ID | SINR |
| | |

S342 TO S354

CANDIDATE LIST

| BASE STATION B2 | | | |
|---|---|---|---|
| TERMINAL ID | SINR | PRIORITY | LOWER ORDER INFORMATION |
| 4 | 2.0dB | 1 | false |
| 5 | 0.5dB | 1 | false |
| 3 | −3.0dB | 2 | false |

DETERMINATION LIST

| BASE STATION B2 | |
|---|---|
| TERMINAL ID | SINR |
| 4 | 2.0dB |
| 5 | 0.5dB |

PENDING LIST

| BASE STATION B2 | |
|---|---|
| TERMINAL ID | SINR |
| | |

S355 TO S358

CANDIDATE LIST

| BASE STATION B2 | | | |
|---|---|---|---|
| TERMINAL ID | SINR | PRIORITY | LOWER ORDER INFORMATION |
| 4 | 2.0dB | 1 | false |
| 5 | 0.5dB | 1 | false |
| 3 | −3.0dB | 2 | false |

DETERMINATION LIST

| BASE STATION B2 | |
|---|---|
| TERMINAL ID | SINR |
| 4 | 2.0dB |
| 5 | 0.5dB |

PENDING LIST

| BASE STATION B2 | |
|---|---|
| TERMINAL ID | SINR |
| | |

CANDIDATE LIST

| BASE STATION B3 | | | |
|---|---|---|---|
| TERMINAL ID | SINR | PRIORITY | LOWER ORDER INFORMATION |
| 6 | 1.0dB | 1 | false |
| 2 | 0.2dB | 2 | false |

DETERMINATION LIST

| BASE STATION B3 | |
|---|---|
| TERMINAL ID | SINR |
| | |
| | |

PENDING LIST

| BASE STATION B3 | |
|---|---|
| TERMINAL ID | SINR |
| | |
| | |

S342 TO S354

CANDIDATE LIST

| BASE STATION B3 | | | |
|---|---|---|---|
| TERMINAL ID | SINR | PRIORITY | LOWER ORDER INFORMATION |
| 6 | 1.0dB | 1 | false |
| 2 | 0.2dB | 2 | false |

DETERMINATION LIST

| BASE STATION B3 | |
|---|---|
| TERMINAL ID | SINR |
| 6 | 1.0dB |
| | |

PENDING LIST

| BASE STATION B3 | |
|---|---|
| TERMINAL ID | SINR |
| 2 | 0.2dB |
| | |

S355 TO S358

CANDIDATE LIST

| BASE STATION B3 | | | |
|---|---|---|---|
| TERMINAL ID | SINR | PRIORITY | LOWER ORDER INFORMATION |
| 6 | 1.0dB | 1 | false |
| 2 | 0.2dB | 2 | false |

DETERMINATION LIST

| BASE STATION B3 | |
|---|---|
| TERMINAL ID | SINR |
| 6 | 1.0dB |
| 2 | 0.2dB |

PENDING LIST

| BASE STATION B3 | |
|---|---|
| TERMINAL ID | SINR |
| 2 | 0.2dB |
| | |

CANDIDATE LIST

| BASE STATION B1 | | | | |
|---|---|---|---|---|
| TERMINAL ID | SINR | PRIORITY | LOWER ORDER INFORMATION | REGISTRABILITY INFORMATION |
| 1 | 3.0dB | 1 | false | |
| 2 | 1.5dB | 1 | true | |
| 3 | -2.0dB | 1 | true | |

DETERMINATION LIST

| BASE STATION B1 | |
|---|---|
| TERMINAL ID | SINR |
| | |
| | |

PENDING LIST

| BASE STATION B1 | |
|---|---|
| TERMINAL ID | SINR |
| | |
| | |

▽ S511 TO S524

CANDIDATE LIST

| BASE STATION B1 | | | | |
|---|---|---|---|---|
| TERMINAL ID | SINR | PRIORITY | LOWER ORDER INFORMATION | REGISTRABILITY INFORMATION |
| 1 | 3.0dB | 1 | false | false |
| 3 | -2.0dB | 1 | true | false |
| 2 | 1.5dB | 1 | true | true |

DETERMINATION LIST

| BASE STATION B1 | |
|---|---|
| TERMINAL ID | SINR |
| | |
| | |

PENDING LIST

| BASE STATION B1 | |
|---|---|
| TERMINAL ID | SINR |
| | |
| | |

▽ S442 TO S458

CANDIDATE LIST

| BASE STATION B1 | | | | |
|---|---|---|---|---|
| TERMINAL ID | SINR | PRIORITY | LOWER ORDER INFORMATION | REGISTRABILITY INFORMATION |
| 1 | 3.0dB | 1 | false | false |
| 3 | -2.0dB | 1 | true | false |
| 2 | 1.5dB | 1 | true | true |

DETERMINATION LIST

| BASE STATION B1 | |
|---|---|
| TERMINAL ID | SINR |
| 1 | 3.0dB |
| 3 | -2.0dB |

PENDING LIST

| BASE STATION B1 | |
|---|---|
| TERMINAL ID | SINR |
| | |
| | |

CANDIDATE LIST

| BASE STATION B2 | | | | |
|---|---|---|---|---|
| TERMINAL ID | SINR | PRIORITY | LOWER ORDER INFORMATION | REGISTRABILITY INFORMATION |
| 4 | 2.0dB | 1 | false | |
| 5 | 0.5dB | 1 | false | |
| 3 | −3.0dB | 2 | false | |

DETERMINATION LIST

| BASE STATION B2 | |
|---|---|
| TERMINAL ID | SINR |
| | |
| | |

PENDING LIST

| BASE STATION B2 | |
|---|---|
| TERMINAL ID | SINR |
| | |
| | |

S511 TO S524

CANDIDATE LIST

| BASE STATION B2 | | | | |
|---|---|---|---|---|
| TERMINAL ID | SINR | PRIORITY | LOWER ORDER INFORMATION | REGISTRABILITY INFORMATION |
| 4 | 2.0dB | 1 | false | false |
| 5 | 0.5dB | 1 | false | false |
| 3 | −3.0dB | 2 | false | false |

DETERMINATION LIST

| BASE STATION B2 | |
|---|---|
| TERMINAL ID | SINR |
| | |
| | |

PENDING LIST

| BASE STATION B2 | |
|---|---|
| TERMINAL ID | SINR |
| | |
| | |

S442 TO S458

CANDIDATE LIST

| BASE STATION B2 | | | | |
|---|---|---|---|---|
| TERMINAL ID | SINR | PRIORITY | LOWER ORDER INFORMATION | REGISTRABILITY INFORMATION |
| 4 | 2.0dB | 1 | false | false |
| 5 | 0.5dB | 1 | false | false |
| 3 | −3.0dB | 2 | false | false |

DETERMINATION LIST

| BASE STATION B2 | |
|---|---|
| TERMINAL ID | SINR |
| 4 | 2.0dB |
| 5 | 0.5dB |

PENDING LIST

| BASE STATION B2 | |
|---|---|
| TERMINAL ID | SINR |
| | |
| | |

CANDIDATE LIST

| BASE STATION B3 | | | | |
|---|---|---|---|---|
| TERMINAL ID | SINR | PRIORITY | LOWER ORDER INFORMATION | REGISTRABILITY INFORMATION |
| 6 | 1.0dB | 1 | false | |
| 2 | 0.2dB | 2 | false | |

DETERMINATION LIST

| BASE STATION B3 | |
|---|---|
| TERMINAL ID | SINR |
| | |
| | |

PENDING LIST

| BASE STATION B3 | |
|---|---|
| TERMINAL ID | SINR |
| | |
| | |

▽ S511 TO S524 ▽

CANDIDATE LIST

| BASE STATION B3 | | | | |
|---|---|---|---|---|
| TERMINAL ID | SINR | PRIORITY | LOWER ORDER INFORMATION | REGISTRABILITY INFORMATION |
| 6 | 1.0dB | 1 | false | false |
| 2 | 0.2dB | 2 | false | false |

DETERMINATION LIST

| BASE STATION B3 | |
|---|---|
| TERMINAL ID | SINR |
| | |
| | |

PENDING LIST

| BASE STATION B3 | |
|---|---|
| TERMINAL ID | SINR |
| | |
| | |

▽ S442 TO S458 ▽

CANDIDATE LIST

| BASE STATION B3 | | | | |
|---|---|---|---|---|
| TERMINAL ID | SINR | PRIORITY | LOWER ORDER INFORMATION | REGISTRABILITY INFORMATION |
| 6 | 1.0dB | 1 | false | false |
| 2 | 0.2dB | 2 | false | false |

DETERMINATION LIST

| BASE STATION B3 | |
|---|---|
| TERMINAL ID | SINR |
| 6 | 1.0dB |
| 2 | 0.2dB |

PENDING LIST

| BASE STATION B3 | |
|---|---|
| TERMINAL ID | SINR |
| | |
| | |

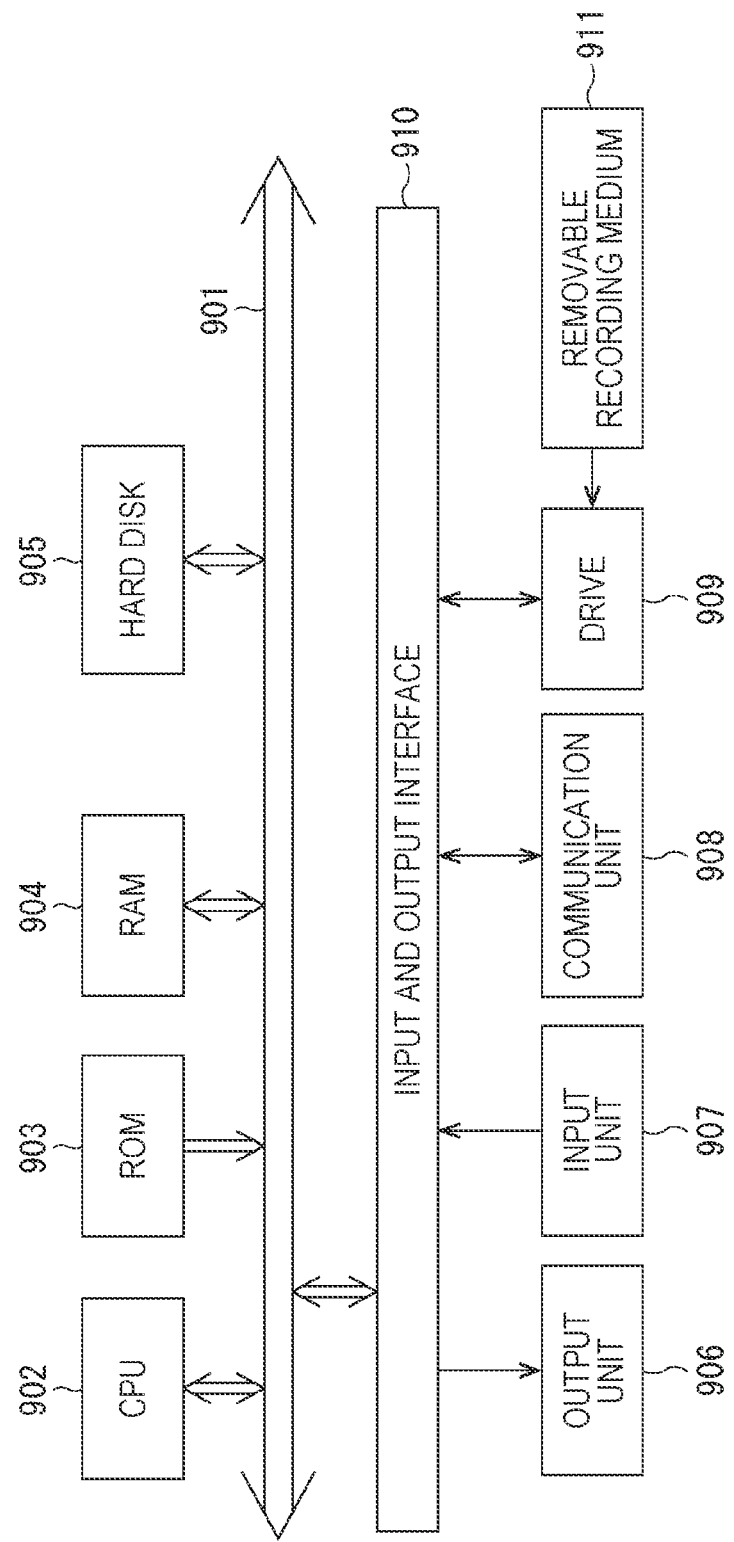

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/032354 filed on Aug. 20, 2019, which claims priority benefit of Japanese Patent Application No. JP 2018-164371 filed in the Japan Patent Office on Sep. 3, 2018. Each of the above-referenced applications is hereby incorporated herein by reference in its entirety.

TECHNICAL FIELD

The present technology relates to an information processing apparatus, an information processing method, and a program, and in particular, to an information processing apparatus, an information processing method, and a program that enable a base station to appropriately determine a terminal in charge of receiving processing, for example.

BACKGROUND ART

For example, in a wireless communication system in which a terminal such as an Internet of Things (IoT) device and a base station perform wireless communication, it is necessary for the base station to know information necessary for demodulation such as a modulation method, a modulation rate, and an encryption key in order to demodulate data transmitted from the terminal.

For example, in a wireless communication system such as long term evolution (LTE), it is premised that a terminal can perform two-way communication. In a wireless communication system in which a terminal can perform two-way communication, signaling is performed between the terminal and the base station before transmitting data, and the signaling causes the base station to recognize when and at what frequency the terminal transmits the data. Then, thereafter, the terminal can demodulate data transmitted from the terminal using the modulation method and modulation rate stored in the data transmitted from the terminal at the time and frequency determined by signaling.

Furthermore, in a wireless communication system, in a case where a terminal is a mobile body, it is necessary to perform a handover for switching the base station as the terminal moves. In the handover, signaling is performed between the terminal and the base station, and the base station that communicates with the terminal is switched to an appropriate base station.

Note that, Patent Document 1 discloses a technology in which a base station allocates resources.

CITATION LIST

Patent Document

Patent Document 1: Japanese Patent Application National Publication (Laid-Open) No. 2017-535173

SUMMARY OF THE INVENTION

Problems to be Solved by the Invention

In a wireless communication system such as Low Power Wide Area (LPWA), which is a promising wireless communication method for the IoT, it is not preferable to perform signaling between a terminal and a base station from the viewpoint of low power consumption and low cost of the terminal.

Furthermore, in a wireless communication system in which only one-way communication from a terminal to a base station is supported, the terminal has no means of knowing the information of the base station, and the terminal has no choice but to transmit data at an arbitrary timing.

As described above, in a wireless communication system that supports only one-way communication, in order for a base station to demodulate data from terminals, all terminals need to be in charge of data receiving processing. In this case, it is necessary for the base station to hold the terminal information of all the terminals in advance, and always execute, for example, data receiving and demodulation as receiving processing for the amount of the held terminal information.

However, it is essentially unnecessary to perform the receiving processing for the terminal existing outside the receivable area where the base station can take charge of the receiving processing, and the receiving processing wastes resources. Furthermore, if the number of terminals in charge is too large, the base station (processing thereof) will overflow.

Accordingly, there is a demand for a technology that allows a base station to appropriately determine a terminal (charged terminal) in charge of receiving processing.

The present technology has been made in view of such circumstances, and is intended to enable a base station to appropriately determine a terminal in charge of receiving processing.

Solutions to Problems

An information processing apparatus or program of the present technology is an information processing apparatus including a charged terminal determination unit that sets priority of a base station in charge of receiving processing of the terminal among base stations that have received a connection request from the terminal for each of a plurality of terminals, and determines a charged terminal in charge of the receiving processing for each of a plurality of base stations according to the priority of the base station, or a program for causing a computer to function as such an information processing apparatus.

An information processing method of the present technology is an information processing method including steps of setting priority of a base station in charge of receiving processing of the terminal among base stations that have received a connection request from the terminal for each of a plurality of terminals, and determining a charged terminal in charge of the receiving processing for each of a plurality of base stations according to the priority of the base station.

In the information processing apparatus, the information processing method, and the program of the present technology, priority of a base station in charge of receiving processing of the terminal among base stations that have received a connection request from the terminal is set for each of the plurality of terminals, and a charged terminal in charge of the receiving processing is determined for each of the plurality of base stations according to the priority of the base station.

Note that the information processing apparatus may be an independent device or an internal block included in one device.

Furthermore, the program can be distributed by transmitting via a transmission medium or by recording on a recording medium.

Effects of the Invention

According to the present technology, a terminal in which a base station is in charge of receiving processing can be appropriately determined.

Note that the effects described herein are not necessarily limited, and any of the effects described in the present disclosure may be applied.

BRIEF DESCRIPTION OF DRAWINGS

FIG. 3 is a block diagram showing a configuration example of a terminal T#i.

FIG. 4 is a block diagram showing a configuration example of a base station B#j.

FIG. 8 is a diagram showing an example of a list used by a charged terminal determination unit 33 of the management server 30 in charged terminal determination processing.

FIG. 17 is a diagram showing an example of the number of terminals T#i for each priority of the base station B#j.

FIG. 18 is a diagram showing an example of a pending list used by the charged terminal determination unit 33 in third charged terminal determination processing.

FIG. 23 is a diagram showing an example of a candidate list, a determination list, and a pending list used in the third charged terminal determination processing.

FIG. 26 is a diagram showing an example of a candidate list of the base station B#j used in fourth charged terminal determination processing.

FIG. 34 is a diagram showing an example of a candidate list of the base station B#j used in fifth charged terminal determination processing.

FIG. 41 is a diagram showing an example of a candidate list, a determination list, and a pending list used in the fourth charged terminal determination processing.

FIG. 42 is a diagram showing an example of a candidate list, a determination list, and a pending list used in the fourth charged terminal determination processing.

FIG. 43 is a diagram showing an example of a candidate list, a determination list, and a pending list used in the fourth charged terminal determination processing.

FIG. 44 is a diagram showing an example of a candidate list, a determination list, and a pending list used in the fifth charged terminal determination processing.

FIG. 45 is a diagram showing an example of a candidate list, a determination list, and a pending list used in the fifth charged terminal determination processing.

FIG. 46 is a diagram showing an example of a candidate list, a determination list, and a pending list used in the fifth charged terminal determination processing.

FIG. 47 is a block diagram showing a configuration example of a computer according to an embodiment to which the present technology is applied.

MODE FOR CARRYING OUT THE INVENTION

<Wireless Communication System to which the Present Technology can be Applied>

Figure 1:
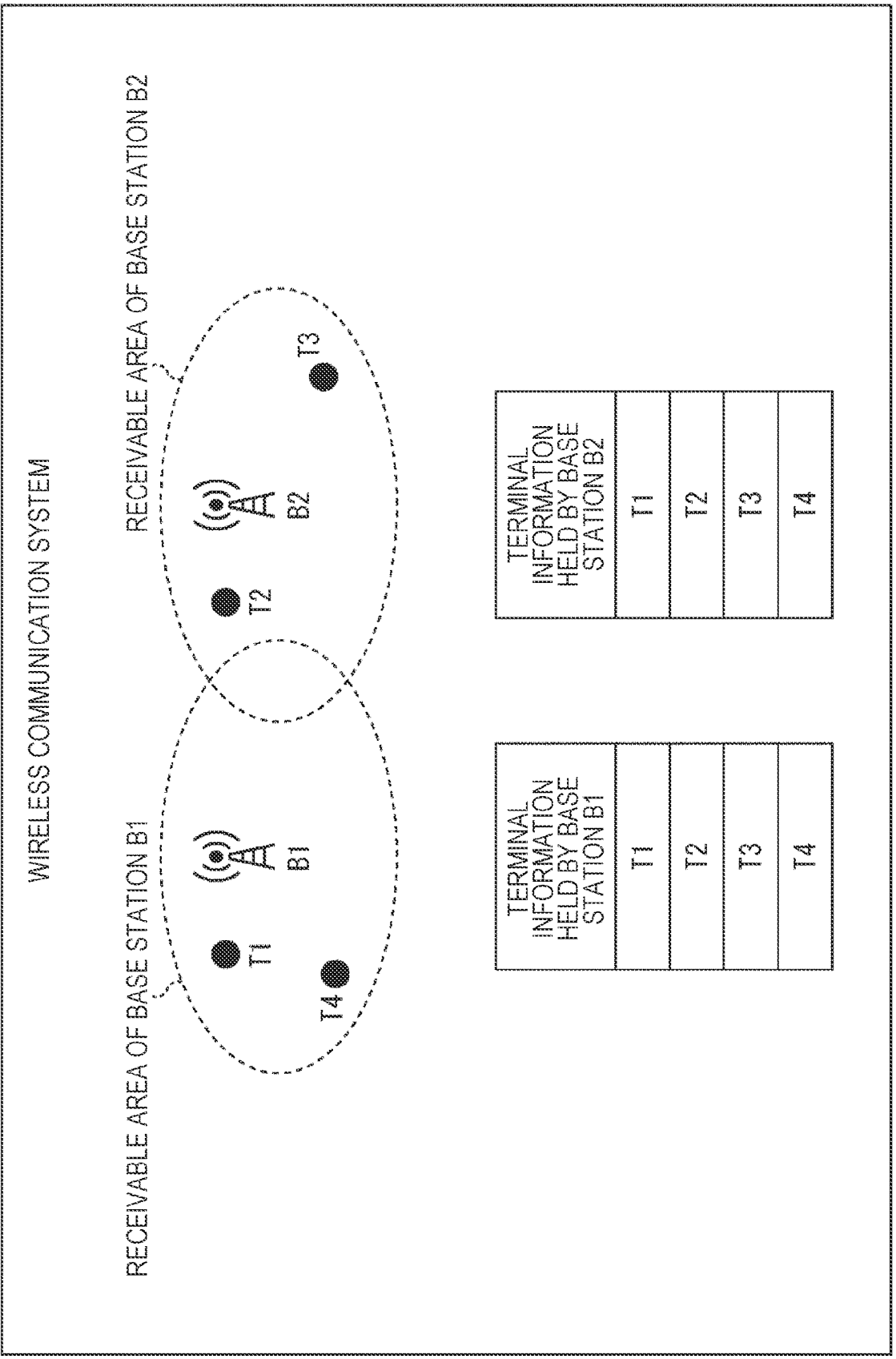
FIG. 1 is a diagram for explaining an outline of a wireless communication system to which the present technology can be applied.

FIG. 1 is a diagram for explaining an outline of a wireless communication system to which the present technology can be applied.

In FIG. 1, the wireless communication system has two base stations B1 and B2, and four terminals T1, T2, T3, and T4.

In FIG. 1, the base stations B1 and B2 both hold all the terminal information of the terminals T1 to T4, and all the terminals T1 to T4 are the terminals in charge of the receiving processing.

That is, both base stations B1 and B2 always perform receiving processing for all terminals T1 to T4 that hold terminal information.

In FIG. 1, the terminals T1 and T4 among the terminals T1 to T4 exist in a receivable area of the base station B1 (receivable area in which the base station B1 can take charge of receiving processing), and the terminals T2 and T3 do not exist. Furthermore, in the receivable area of the base station B2, the terminals T2 and T3 among the terminals T1 to T4 exist, and the terminals T1 and T4 do not exist.

Therefore, the base station B1 does not need to perform receiving processing for the terminals T2 and T3 existing outside the receivable area of the base station B1, and performing receiving processing for the terminals T2 and T3 consumes resources wastefully.

As similar to this, the base station B2 does not need to perform receiving processing for the terminals T1 and T4 existing outside the receivable area of the base station B2, and performing receiving processing for the terminals T1 and T4 consumes resources wastefully.

Furthermore, in each of the base stations B1 and B2, if all the terminals included in the wireless communication system are the charged terminals, the base stations B1 and B2 overflow in some cases as the number of terminals increases.

Therefore, in the present technology, a plurality of base stations can cooperate to appropriately determine the terminal in charge for each base station, thereby improving the resource utilization efficiency of the base station and achieving high capacity.

Note that the present technology can be applied to both wireless communication systems that support two-way communication between terminals and base stations and wireless communication systems that support only one-way communication from terminals to base stations. The present technology is particularly useful for wireless communication systems in which only one-way communication from a terminal to a base station is supported.

<Wireless Communication System to which the Present Technology is Applied>

Figure 2:
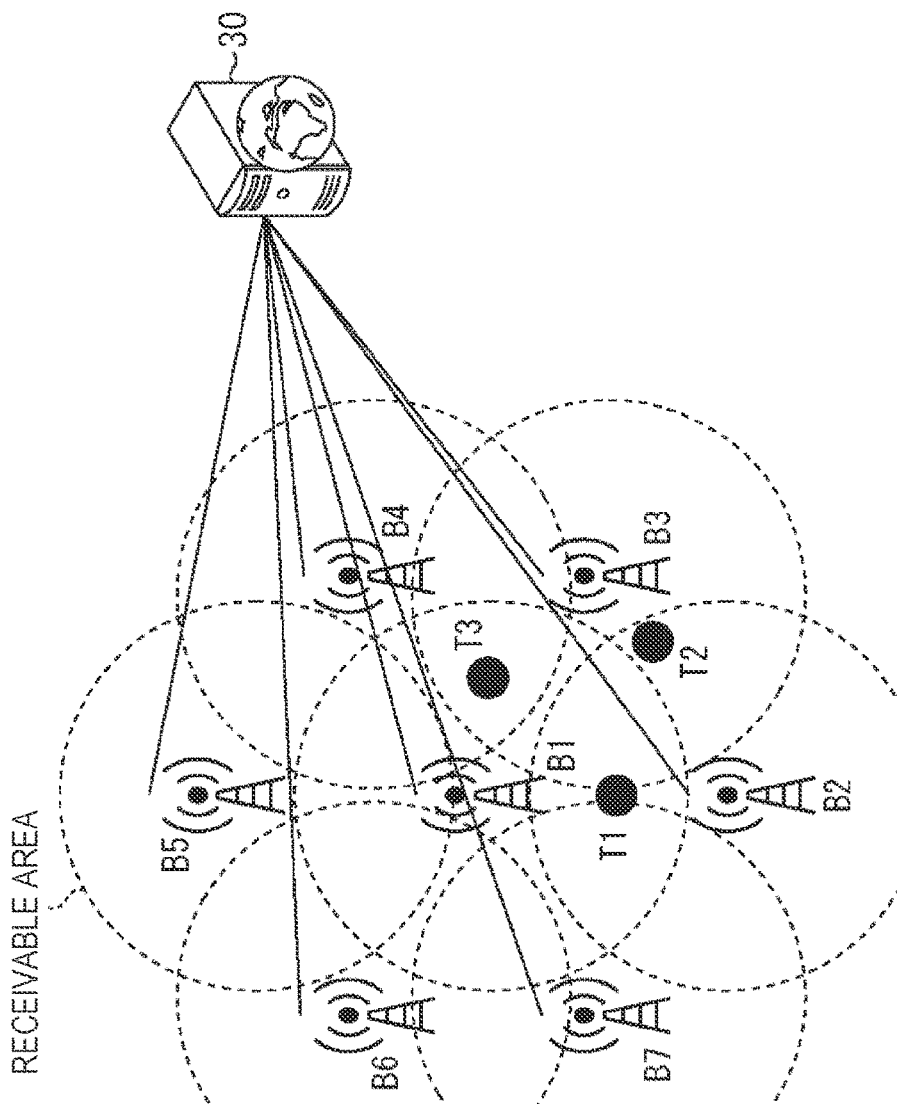
FIG. 2 is a diagram showing a configuration example of an embodiment of a wireless communication system to which the present technology is applied.

FIG. 2 is a diagram showing a configuration example of an embodiment of a wireless communication system to which the present technology is applied.

In FIG. 2, the wireless communication system has seven base stations B1 to B7, three terminals T1 to T3, and a management server 30.

Note that the number of base stations B#j and the number of terminals T#i included in the wireless communication system are not particularly limited, and any number of one or more or any number of two or more can be adopted.

Furthermore, here, it is assumed that only one-way communication from the terminal T#i to the base station B#j is performed between the terminal T#i and the base station B#j.

The terminal T#i is a transmitter that wirelessly transmits data to the base station B#j at an arbitrary timing. Furthermore, the terminal T#i wirelessly transmits a connection request frame requesting a connection to the base station B#j on a regular or irregular basis. The connection request frame transmitted by the terminal T#i contains identification information that identifies the terminal T#i.

The base station B#j performs receiving processing of data (frames) wirelessly transmitted from the terminal T#i, that is, reception and demodulation of the data. Furthermore, the base station B#j receives the connection request frame transmitted from the terminal T#i, and registers the terminal T#i for which the connection request frame has been received, in the connection request list in which the terminal T#i for which the connection request frame has been received is registered. Then, the base station B#j transmits the connection request list in which the terminal T#i is registered to the management server 30.

The management server 30 receives the connection request list transmitted from the base station B#j, and uses the connection list to perform charged terminal determination processing for determining the charged terminal for which the base station B#j is in charge of the receiving processing. In the charged terminal determination processing, the management server 30 registers the charged terminal of the base station B#j in the determination list in which the charged terminal for which the base station B#j is in charge of the receiving processing. Then, the management server 30 transmits the determination list of the base station B#j to the base station B#j.

The base station B#j performs data receiving processing only for the terminals registered in the determination list of the base station B#j from the management server 30.

Therefore, it is possible to improve the resource usage efficiency of the base station B#j and achieve high capacity as compared with the case where the base station B#j performs the receiving processing of all the terminals T#i. Furthermore, it is possible to prevent overflow by having the base station B#j take charge of a large number of terminals T#i.

<Configuration Example of Terminal T#i>

FIG. 3 is a block diagram showing a configuration example of a terminal T#i of FIG. 2.

In FIG. 3, the terminal T#i has a wireless communication unit 11 and a control unit 12.

The wireless communication unit 11 wirelessly transmits data and a connection request frame in a predetermined frame format.

The control unit 12 generates data (frames) to be transmitted to the communication unit 11 and a connection request frame. Moreover, the control unit 12 causes the communication unit 11 to transmit data and a connection request frame.

<Configuration Example of Base Station B#j>

FIG. 4 is a block diagram showing a configuration example of a base station B#j of FIG. 2.

In FIG. 4, the base station B#j has a wireless communication unit 21, a wired communication unit 22, a control unit 23, a demodulation unit 24, and a terminal information storage unit 25.

The wireless communication unit 21 wirelessly transmits and receives a frame having a predetermined frame format. Note that, in the present embodiment, the wireless communication unit 21 is only required to at least function as an interface with the terminal T#i. Therefore, the wireless communication unit 21 need only be able to receive at least the frames (data frames and connection request frames) transmitted from the terminal T#i.

The wired communication unit 22 transmits and receives a frame having a predetermined frame format by wire. Note that, in the present embodiment, the wired communication unit 22 functions as an interface with the management server 30. Communication between the base station B#j and the management server 30 can be performed wirelessly as well as by wire. In a case where the communication between the base station B#j and the management server 30 is performed wirelessly, the wireless communication unit 21 performs the communication with the management server 30. In this case, since the wired communication unit 22 is not used, the base station B#j can be configured without the wired communication unit 22.

The control unit 23 causes the wireless communication unit 21 and the wired communication unit 22 to transmit and receive frames. Furthermore, the control unit 23 generates a connection request list in which the terminal T#i for which the connection request frame has been received is registered according to the connection request frame from the terminal T#i received by the wireless communication unit 21, and causes the wireless communication unit 21 or the wired communication unit 22 to transmit the connection request list to the management server 30.

The demodulation unit 24 acquires (reads) terminal information from the terminal information storage unit 25, and uses the terminal information to demodulate the data received by the wireless communication unit 21 from the terminal T#i. Furthermore, the demodulation unit 24 demodulates the connection request frame received by the wireless communication unit 21 from the terminal T#i by using connection request common information stored in the terminal information storage unit 25.

The terminal information storage unit 25 is a database in which at least terminal information necessary for demodulating the frame transmitted by the terminal (charged terminal) T#i of which the base station B#j is in charge is stored (held). For example, the terminal information of the terminal T#i of which the base station B#j is in charge can be provided from the management server 30 to the base station B#j. Note that the terminal information storage unit 25 can store terminal information of all terminals T#i included in the communication system of FIG. 2 in advance.

The terminal information storage unit 25 also stores connection request common information that is necessary for demodulating the connection request frame. At the terminal T#i, the connection request frame is modulated so that the connection request frame can be demodulated by a predetermined demodulation method as connection request common information.

<Configuration Example of Management Server 30>

Figure 5:
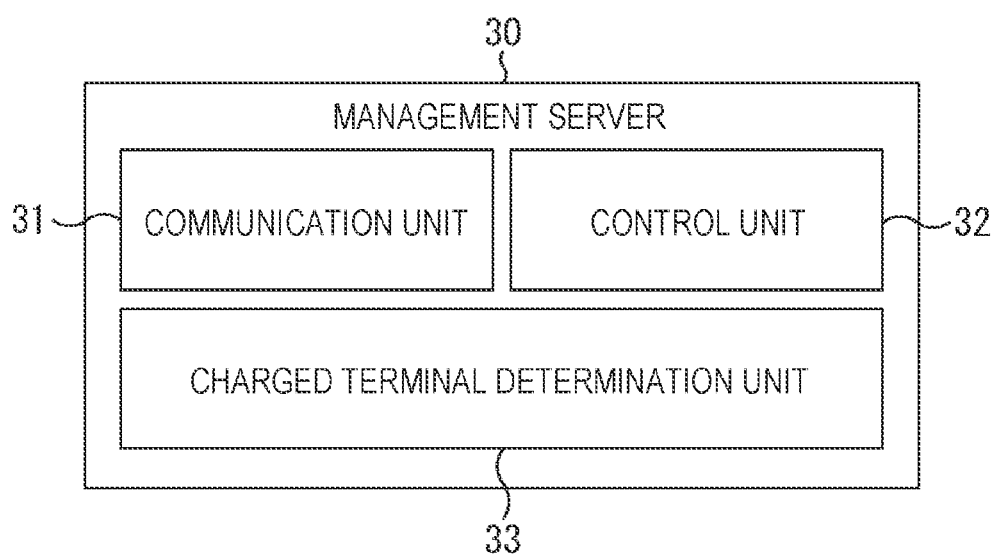
FIG. 5 is a block diagram showing a configuration example of a management server 30.

FIG. 5 is a block diagram showing a configuration example of a management server 30 of FIG. 2.

In FIG. 5, the management server 30 has a communication unit 31, a control unit 32, and a charged terminal determination unit 33.

The communication unit 31 transmits and receives a frame having a predetermined frame format to and from the base station B#j by wire or wirelessly.

The control unit 32 causes the communication unit 31 to perform communication with the base station B#j.

The charged terminal determination unit 33 performs charged terminal determination processing for determining the charged terminal for each base station B#j by using the connection request list received by the communication unit 31 from the base station B#j.

According to the charged terminal determination processing, a determination list in which the terminal T#i of which the base station B#j is in charge (of receiving processing) is registered is generated for each base station B#j. This determination list is transmitted from the communication unit 31 to each base station B#j. The base station B#j performs data receiving processing only for the terminals registered in the determination list of the base station B#j from the management server 30.

<Overview of Processing of Wireless Communication System>

Figure 6:
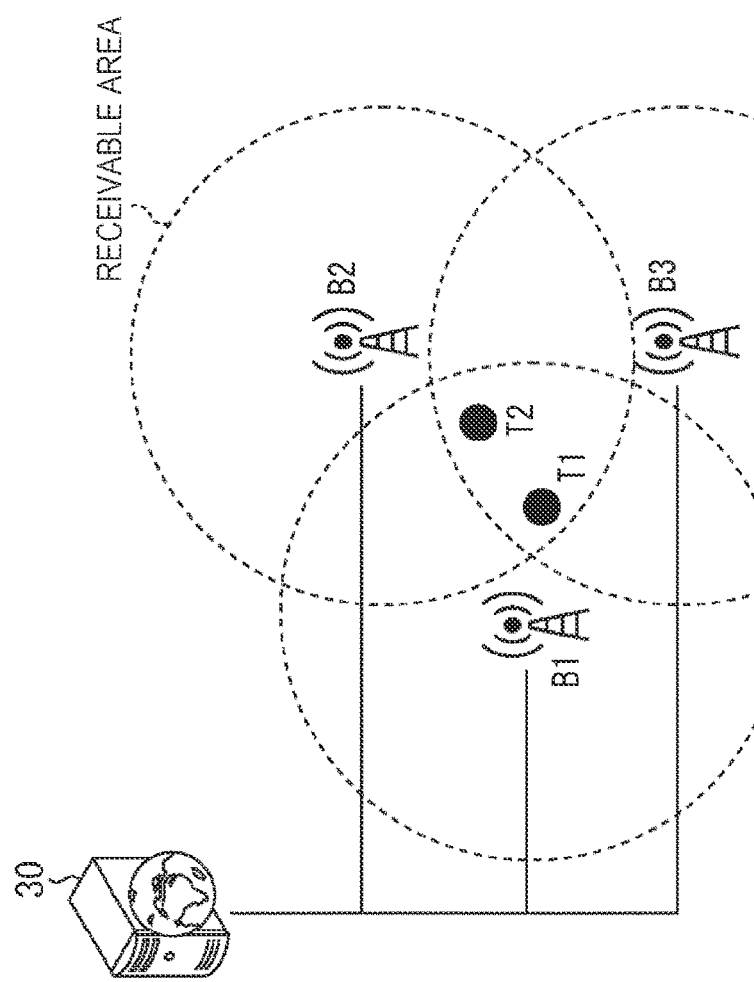
FIG. 6 is a diagram showing a configuration example of a wireless communication system having three base stations B1 to B3 and two terminals T1 and T2.

FIG. 6 is a diagram showing a configuration example in a case where the wireless communication system of FIG. 2 has three base stations B1 to B3 and two terminals T1 and T2.

In FIG. 6, the terminals T1 and T2 both exist in an area where the receivable area of the base station B1, the receivable area of the base station B2, and the receivable area of the base station B3 overlap. Therefore, any of the base stations B1 to B3 can be in charge of the terminals T1 and T2 (receiving processing thereof).

In a case where the data transmitted from the terminal T#i can be received by a plurality of base stations B#j, from the viewpoint of improving the resource utilization efficiency of the base station B#j, it is desirable that the base station B#j, which is easy to receive normally (highly likely to receive normally) the data from the terminal T#i, is in charge of the terminal T#i.

In FIG. 6, for example, since the terminal T1 is the closest to the base station B1 among the base stations B1 to B3, it is desirable that the base station B1 is in charge of the terminal T1. Furthermore, for example, since the terminal T2 is the closest to the base station B2 among the base stations B1 to B3, it is desirable that the base station B2 is in charge of the terminal T2.

Therefore, in the present technology, the priority of the base station B#j that is in charge of the receiving processing of the terminal T#i among the base stations B#j that have received the connection request frame from the terminal T#i is set with respect to the terminal T#i, and the terminal T#i of which the base station B#j is in charge is determined, so that the base station B#j that is easy to receive normally the data from the terminal T#i is in charge of the corresponding terminal T#i as much as possible, for example.

Here, the priority of the base station is set with respect to the terminal T#i. The priority of a base station is the degree that each base station should preferentially take charge of a terminal of interest, in one or more base stations that have received a connection request frame from the terminal of interest, in a case where one terminal is the terminal of interest.

Note that the priority can be expressed by any value. In the present embodiment, for convenience of explanation, the priority represented by a natural number is adopted as the priority. The priority of the base station represents the order in which each base station should preferentially take charge of the terminal of interest, in one or more base stations that have received the connection request frame from the terminal of interest.

Figure 7:
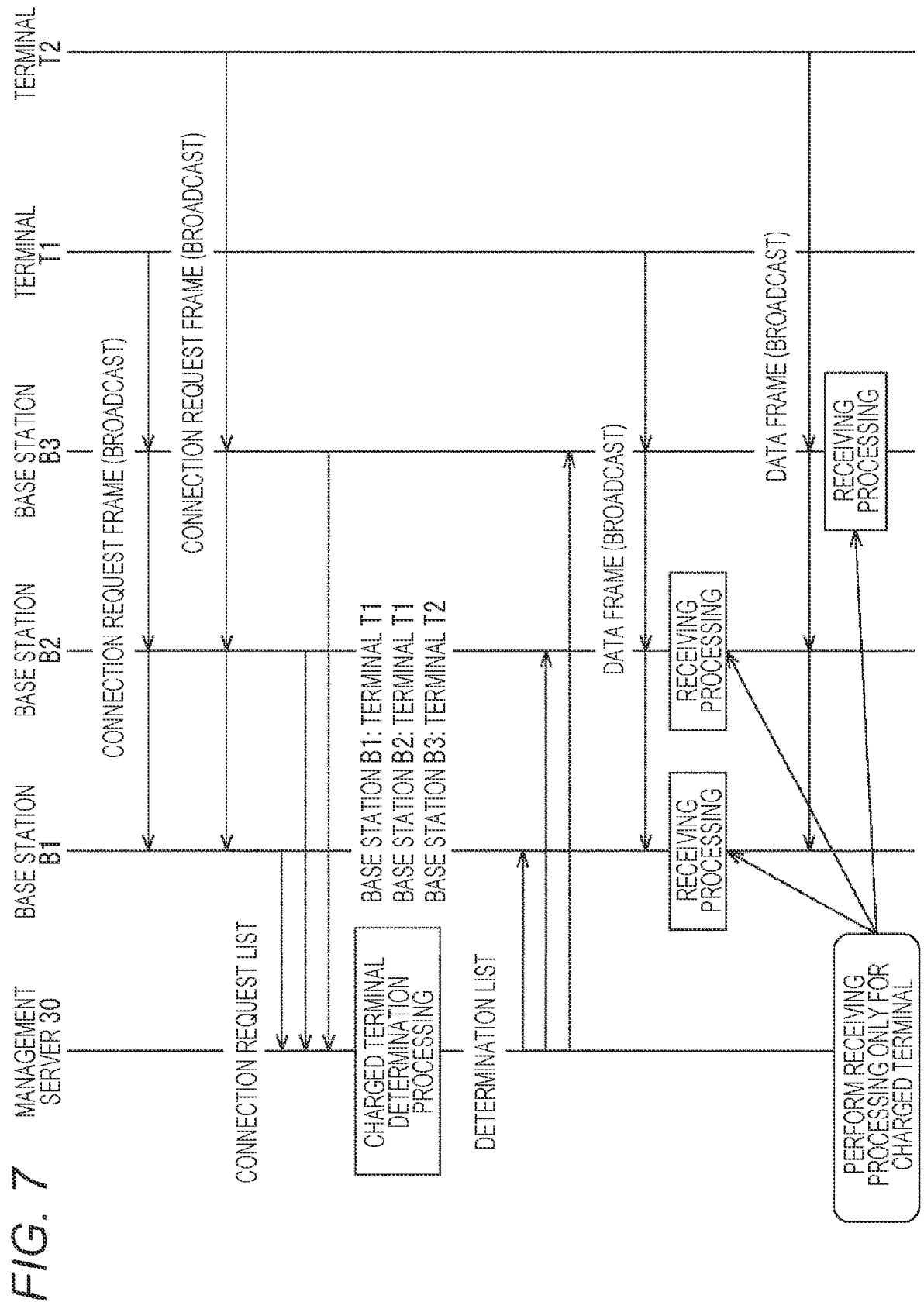
FIG. 7 is a diagram for explaining an outline of processing of a wireless communication system.

FIG. 7 is a diagram for explaining an outline of processing of a wireless communication system of FIG. 6.

The terminals T1 and T2 periodically broadcast connection request frames. The connection request frame transmitted by the terminal T#i is received by the base station B#j having a receivable area including the terminal T#i.

In FIG. 7, the connection request frames transmitted by the terminals T1 and T2 are received by the base stations B1 to B3.

The base station B#j demodulates the connection request frame from the terminal T#i, and identifies the terminal T#i that has transmitted the connection request frame from the demodulation result. Note that the connection request frame is generated and transmitted in common modulation method, encryption key, and the like with all terminals T#i, so that any base station B#j can demodulate the connection request frame.

The base station B#j generates a connection request list by registering the terminal T#i that has received the connection request frame in the connection request list, and transmits the connection request list to the management server 30. The connection request list is generated and transmitted to the management server 30 on a regular basis.

The management server 30 receives the connection request list from the base station B#j, and uses the connection request list to perform the charged terminal determination processing for determining the charged terminal for each base station B#j. Then, the management server 30 transmits the determination list in which the charged terminal is registered, which is acquired by the charged terminal determination processing, to each base station B#j.

The base station B#j receives the determination list of the base station B#j from the management server 30, acquires the terminal information of the terminal T#i only for the terminal T#i registered in the determination list from the terminal information storage unit 25 (FIG. 4), and performs data receiving processing.

In FIG. 7, in the charged terminal determination processing, it is determined that the base station B1 is in charge of the terminal T1, the base station B2 is in charge of the terminal T1, and the base station B3 is in charge of the terminal T2. Therefore, the base stations B1 and B2 subsequently perform the receiving processing of data from the terminal T1 of the terminals T1 and T2 that transmit data (frames) by broadcasting, and the base station B3 performs receiving processing of data from the terminal T2.

Here, the management server 30 can transmit the terminal information of the terminal T#i registered in the determination list at the same time when transmitting the determination list of the base station B#j. The base station B#j can receive the terminal information of the terminal T#i registered in the determination list, which is transmitted together with the determination list of the base station B#j, and register the terminal information in the terminal information storage unit 25 (FIG. 4).

Note that, as described above, the terminal information storage unit 25 can store the terminal information of all the terminals T#i included in the wireless communication system in advance. In this case, the base station B#j can activate only the terminal information of the terminal T#i registered in the determination list of the base station B#j among the terminal information stored in the terminal information storage unit 25, and use the terminal information for receiving processing.

<List Used in Charged Terminal Determination Processing>

FIG. 8 is a diagram showing an example of a list used by a charged terminal determination unit 33 of the management server 30 in charged terminal determination processing of FIG. 5.

In the charged terminal determination processing, a connection request list, a determination list, and a candidate list are used.

The connection request list is a list for each base station B#j in which the terminal T#i for which the base station B#j has received the connection request frame is registered. The connection request list is generated and transmitted to the management server 30 by the base station B#j.

In the connection request list of the base station B#j, for example, a terminal identification (ID) as identification information for identifying the terminal T#i for which the base station B#j has received the connection request frame, and priority index, which is the index of the priority of the base station B#j set for the terminal T#i, are registered.

As the priority index, signal-to-interference noise ratio (SINR) when the base station B#j receives the connection request frame can be used. It is predicted that the higher the SINR when the base station B#j receives the connection request frame from the terminal T#i, the higher the possibility of the base station B#j normally receiving the data from the terminal T#i. Therefore, in the charged terminal determination processing, the priority of each base station in the base stations B#j that have received the connection request frame of the terminal T#i can be set according to the SINR as the priority index. That is, as the priority of each base station in the base stations B#j that have received the connection request frame of the terminal T#i, the descending order of the SINR can be set for the terminal T#i.

In this case, for example, if the base stations that have received the connection request frame of the terminal T#i are the base stations B1 and B2, and the SINR when the base station B1 receives the connection request frame is higher than the SINR when the base station B2 receives the connection request frame, the first order is set as the priority of the base station B1 and the second order is set as the priority of the base station B2 for the terminal T#i.

Note that, as the priority index, in addition to the SINR, for example, the distance between the terminal T#i and the base station B#j that has received the connection request frame of the terminal T#i (hereinafter, also referred to as the distance between the terminal and the base station) can be adopted.

It is predicted that the closer (smaller) the distance between the base station and the terminal with the terminal T#i, the higher the possibility of the base station B#j normally receiving the data from the terminal T#i. Therefore, in a case where the distance between the terminal and the base station is adopted as the priority index, in the charged terminal determination processing, the priority of each base station in the base stations B#j that have received the connection request frame of the terminal T#i can be set for the terminal T#i according to the distance between the terminal and the base station as the priority index. That is, as the priority of each base station in the base stations B#j that have received the connection request frame of the terminal T#i, the order of the distance between the terminal and the base station being closer can be set for the terminal T#i.

In a case where the distance between the terminal and the base station between the terminal T#i and the base station B#j is adopted as the priority index, the terminal T#i can include, for example, the Global Positioning System (GPS) coordinates of the terminal T#i in the connection request frame. In this case, the base station B#j that has received the connection request frame from the terminal T#i can use the GPS coordinates of the terminal T#i included in the connection request frame to determine the distance between the terminal and the base station with the terminal T#i.

The determination list is a list for each base station B#j in which the terminal T#i of which the base station B#j takes charge (terminal that is the charged terminal of the base station B#j) is registered. The determination list is generated and held by the charged terminal determination processing.

In the determination list of the base station B#j, for example, the terminal ID as the identification information for identifying the terminal T#i of which the base station B#j takes charge and the SINR as the priority index are registered.

Note that the number of terminals T#i (terminal ID thereof) that can be registered in the determination list of the base station B#j is limited to the number of possible terminals which is the number of terminals T#i (receiving processing thereof) that the base station B#j can take charge of. That is, the size of the determination list of base station B#j (the number of fields in which terminals T#i can be registered in the determination list) is equal to the number of possible terminals of the base station B#j.

The candidate list is a list for each base station B#j in which the terminal T#i, which is a candidate for the terminal of which the base station B#j takes charge, is registered.

The terminal ID and the registration order index are registered in the candidate list of the base station B#j. The registration order index is an index for determining the registration order in which the terminal T#i identified by the terminal ID is registered in the determination list of the base station B#j, that is, the priority for the terminal T#i being the charged terminal of the base station. In FIG. 8, as the registration order index, the priority of the base station B#j set for the terminal (terminal identified by the terminal ID) T#i of the terminal ID and the SINR when the base station B#j receives the connection request frame of the terminal T#i, and the like are registered. Note that, as the registration order index, for example, the distance between the terminal and the base station and the like can be registered.

In the charged terminal determination processing, the terminals T#i (terminal ID and the like thereof) registered in the candidate list are sorted according to the registration order index. That is, the terminals T#i registered in the candidate list are sorted according to at least the priority of the base station B#j set for the terminal T#i as a registration order index. In FIG. 8, the terminals T#i registered in the candidate list are sorted in ascending order of priority of the base station B#j set for the terminal T#i. The terminals T#i registered in the candidate list of the base station B#j after sorting are preferentially registered in the determination list of the base station B#j in the order of registration. Therefore, the terminal T#i registered at the top of the candidate list of the base station B#j after sorting is preferentially determined as the charged terminal of the base station B#j.

The charged terminal determination processing can be performed using the connection request list, the determination list, and the candidate list as described above.

There are various variations in the charged terminal determination processing. Hereinafter, the first to fifth charged terminal determination processing will be described.

Note that, in the charged terminal determination processing, since the charged terminal is determined for each base station B#j, the charged terminal determination unit 33 (FIG. 5) of the management server 30 should perform the processing to be performed for one base station B#j (hereinafter, also referred to as unit processing) for the number of all base stations included in the wireless communication system. For example, in the charged terminal determination unit 33, the unit processing can be repeated for the number of base stations included in the wireless communication system, or can be performed in parallel for (equal to or less than) the number of base stations included in the wireless communication system.

In the following, it is assumed that, in the charged terminal determination unit 33, the unit processing is repeated for the number of base stations included in the wireless communication system. Furthermore, in the following, it is assumed that, the management server 30 has already received the connection request list from all the base stations included in the wireless communication system, and the charged terminal determination unit 33 is in a state of being able to acquire the connection request list of each base station B#j immediately and use the connection request list.

<First Charged Terminal Determination Processing>

Figure 9:
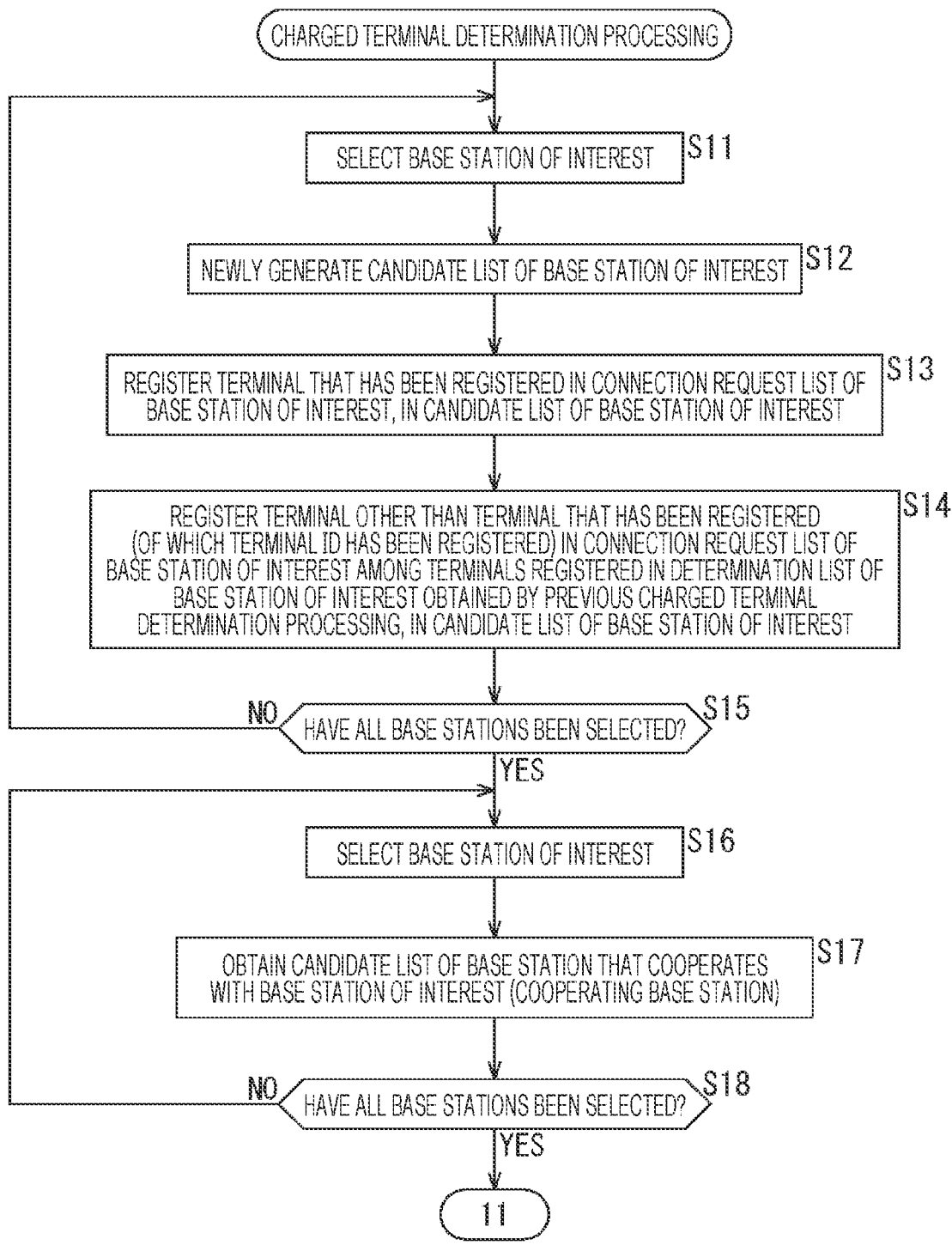
FIG. 9 is a flowchart for explaining first charged terminal determination processing.

FIG. 9 is a flowchart for explaining first charged terminal determination processing.

Figure 10:
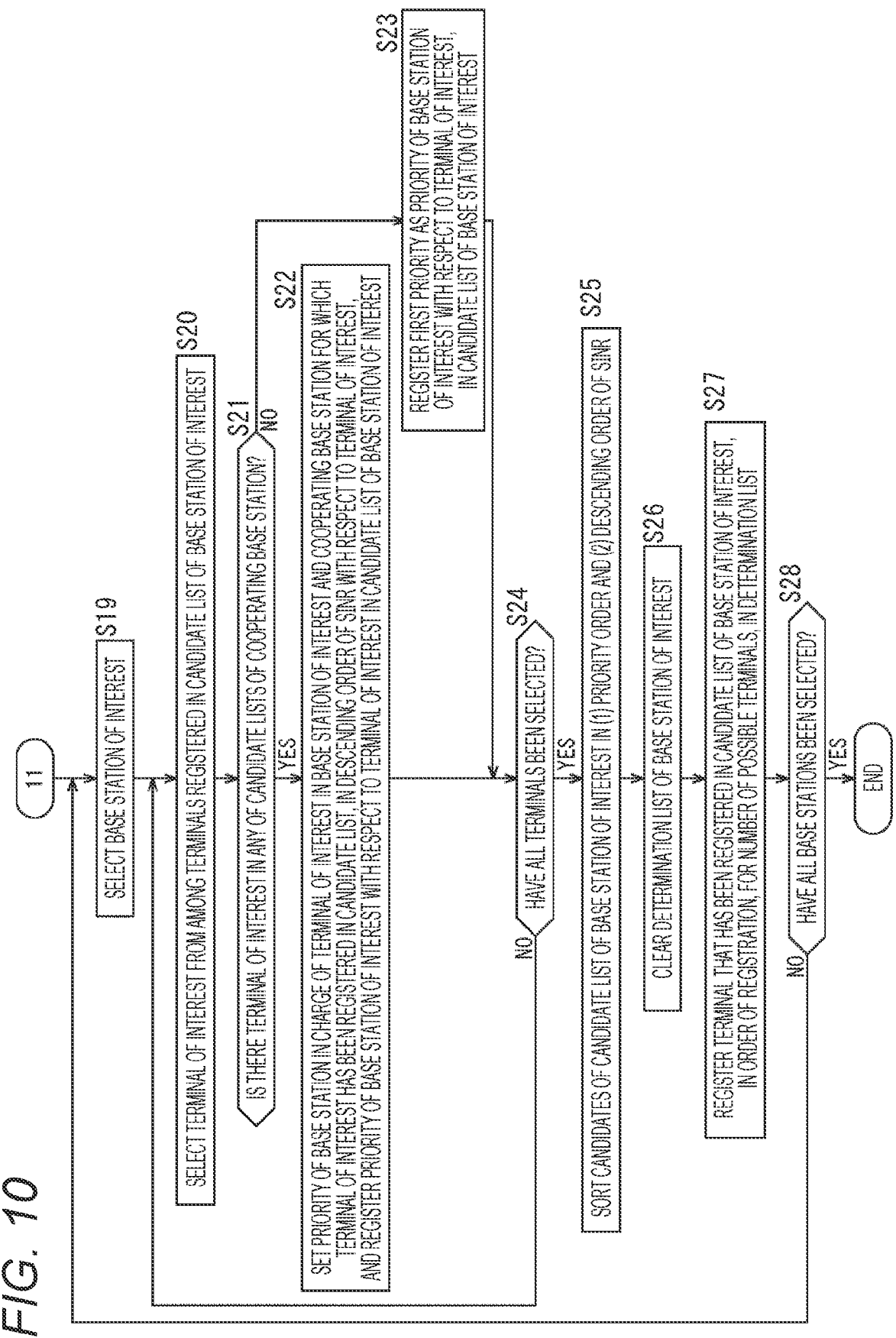
FIG. 10 is a flowchart for explaining first charged terminal determination processing.

FIG. 10 is a flowchart following FIG. 9.

In step S11 of FIG. 9, the charged terminal determination unit 33 selects one base station that has not been selected as the base station of interest from the base stations included in the wireless communication system as the base station of interest, and the process proceeds to step S12.

In step S12, the charged terminal determination unit 33 newly generates a candidate list of the base station of interest, and the process proceeds to step S13.

In step S13, the charged terminal determination unit 33 registers the terminal registered in the connection request list (FIG. 8) of the base station of interest in the candidate list of the base station of interest (FIG. 8) generated in step S12, and the process proceeds to step S14.

Note that, when the terminal registered in the connection request list of the base station of interest is registered in the candidate list of the base station of interest, the terminal ID of the terminal registered in the connection request list and the SINR as the priority index are registered in the candidate list.

In step S14, the charged terminal determination unit 33 registers a terminal other than the terminal registered in the connection request list of the base station of interest among the terminals registered in the determination list (FIG. 8) of the base station of interest acquired in the previous charged terminal determination processing in the candidate list of the base station of interest, and the process proceeds to step S15.

Note that, when the terminal registered in the determination list of the base station of interest is registered in the candidate list of the base station of interest, the terminal ID of the terminal registered in the determination list and the SINR as the priority index are registered in the candidate list.

In step S15, the charged terminal determination unit 33 determines whether or not all the base stations included in the wireless communication system have been selected as the base stations of interest. In a case where it is determined in step S15 that all the base stations included in the wireless communication system have not yet been selected as the base stations of interest, the process returns to step S11. In step S11, the base station of interest is newly selected, and the similar processing is repeated thereafter.

Furthermore, in step S15, in a case where it is determined that all the base stations included in the wireless communication system have been selected as the base stations of interest, selection of all the base stations included in the wireless communication system as the base stations of interest is reset, and the process proceeds to step S16.

In step S16, the charged terminal determination unit 33 selects one base station that has not been selected as the base station of interest from the base stations included in the wireless communication system as the base station of interest, and the process proceeds to step S17.

In step S17, the charged terminal determination unit 33 acquires (reads) a candidate list of the cooperating base station, which is a base station that cooperates with the base station of interest, and the process proceeds to step S18.

Here, the cooperating base station (the base station to be the cooperating base station) that cooperates with the base station of interest can be set in advance in the management server 30, for example. In the charged terminal determination processing, the charged terminal of the base station of interest is determined in consideration of the cooperating base station that cooperates with the base station of interest. Therefore, from the viewpoint of determining the charged terminal of the base station of interest, it is desirable that all the base stations other than the base station of interest among the base stations included in the wireless communication system are set as the cooperating base stations that cooperate with the base station of interest. However, as the number of cooperating base stations that cooperate with the base station of interest increases, the amount of processing for determining the charged terminal increases, so that the base station that serves as the cooperating base station that cooperates with the base station of interest can be set according to the capacity of the management server 30.

In step S18, the charged terminal determination unit 33 determines whether or not all the base stations included in the wireless communication system have been selected as the base stations of interest. In a case where it is determined in step S18 that all the base stations included in the wireless communication system have not yet been selected as the base stations of interest, the process returns to step S16. In step S16, the base station of interest is newly selected, and the similar processing is repeated thereafter.

Furthermore, in step S18, in a case where it is determined that all the base stations included in the wireless communication system have been selected as the base stations of interest, selection of all the base stations included in the wireless communication system as the base stations of interest is reset, and the process proceeds to step S19 of FIG. 10.

In step S19, the charged terminal determination unit 33 selects one base station that has not been selected as the base station of interest from the base stations included in the wireless communication system as the base station of interest, and the process proceeds to step S20.

In step S20, the charged terminal determination unit 33 selects, for example, the terminal having the highest registration order that is not selected as the terminal of interest from the terminals registered in the candidate list of the base station of interest as the terminal of interest, and the process proceeds to step S21.

In step S21, the charged terminal determination unit 33 determines whether or not the terminal of interest exists (has been registered) in any of the candidate lists of the cooperating base stations that cooperate with the base station of interest acquired in step S17 of FIG. 9.

In a case where it is determined in step S21 that the terminal of interest exists in any of the candidate lists of the cooperating base stations that cooperate with the base station of interest, the process proceeds to step S22.

In step S22, the charged terminal determination unit 33 sets the priority of the base station of interest with respect to the terminal of interest, and registers the priority in the candidate list of the base station of interest, and the process proceeds to step S24.

That is, in step S22, the charged terminal determination unit 33 sets the priority of the base station in charge of the terminal of interest in the base station of interest and the cooperating base station in which the terminal of interest is registered in the candidate list, with respect to the terminal of interest, in descending order of the SINR as the priority index.

For example, in a case where the base station of interest is the base station B1 and the cooperating base stations are the base stations B2 and B3, the SINR when the connection request frame from the terminal of interest is received by the base station B#j (hereinafter, also referred to as the SINR of the terminal of interest in the base station B#j) is higher in the order of the base stations B1, B2, and B3, the first order is set as the priority of the base station B1, the second order is set as the priority of the base station B2, and the third order is set as the priority of the base station B3 with respect to the terminal of interest.

Thereafter, the charged terminal determination unit 33 registers the priority of the base station of interest with respect to the terminal of interest in the candidate list of the base station of interest in a form of associating with the terminal ID of the terminal of interest, and the process proceeds from step S22 to step S24.

On the other hand, in step S21, in a case where it is determined that the terminal of interest does not exist in any of the candidate lists of the cooperating base stations that cooperate with the base station of interest, that is, the base station that has received the connection request frame of the terminal of interest is only the base station of interest, the process proceeds to step S23.

In step S23, the charged terminal determination unit 33 sets the first order as the priority of the base station of interest with respect to the terminal of interest, registers the priority in the candidate list of the base station of interest in a form of associating with the terminal ID of the terminal of interest, and the process proceeds to step S24.

In step S24, the charged terminal determination unit 33 determines whether or not all the terminals registered in the candidate list of the base station of interest have been selected as the terminals of interest, and in a case where it is determined that all the terminals are not selected as the terminals of interest, the process returns to step S20. In step S20, the terminal of interest is newly selected, and the similar processing is repeated thereafter.

Furthermore, in step S24, in a case where it is determined that all the terminals registered in the candidate list of the base station of interest are selected as the terminals of interest, selection of all the terminals registered in the candidate list of the base station of interest as the terminals of interest is reset, and the process proceeds to step S25.

In step S25, the charged terminal determination unit 33 sorts the terminals registered in the candidate list of the base station of interest in the order of the priority of the base station and the SINR according to the priority of the base station and the SINR as the registration order index, and process proceeds to step S26.

That is, the charged terminal determination unit 33 sorts the terminals registered in the candidate list of the base station of interest in descending order of priority of the base station. Moreover, the charged terminal determination unit 33 sorts the terminals having the same base station priority among the terminals registered in the candidate list sorted in descending order of base station priority, in descending order of the SINR.

In step S26, the charged terminal determination unit 33 clears the determination list of the base station of interest, and the process proceeds to step S27.

In step S27, the charged terminal determination unit 33 registers the terminals registered in the candidate list of the base station of interest in the order of registration as the number of possible terminals of the base station of interest as the charged terminals of the base station of interest in the determination list of the base station of interest, and the process proceeds to step S28. Note that the registration order does not mean the temporal order in which the terminals are registered in the candidate list, but the positional order in which the terminals are actually registered in the candidate list.

In step S28, the charged terminal determination unit 33 determines whether or not all the base stations included in the wireless communication system have been selected as the base stations of interest, and in a case where it is determined that all base stations are not selected as the base stations of interest, the process returns to step S19. In step S19, the base station of interest is newly selected, and the similar processing is repeated thereafter.

Furthermore, in step S28, in a case where it is determined that all the base stations constituting the wireless communication system have been selected as the base stations of interest, selection of all the base stations constituting the wireless communication system as the base stations of interest is reset, and the first charged terminal determination processing ends.

As described above, in the first charged terminal determination processing, the priority of a base station in charge of (receiving processing of) the terminal among base stations that have received a connection request frame from the terminal is set for each of the plurality of terminals, and a charged terminal is determined for each of the plurality of base stations according to the priority of the base station.

Figure 11:
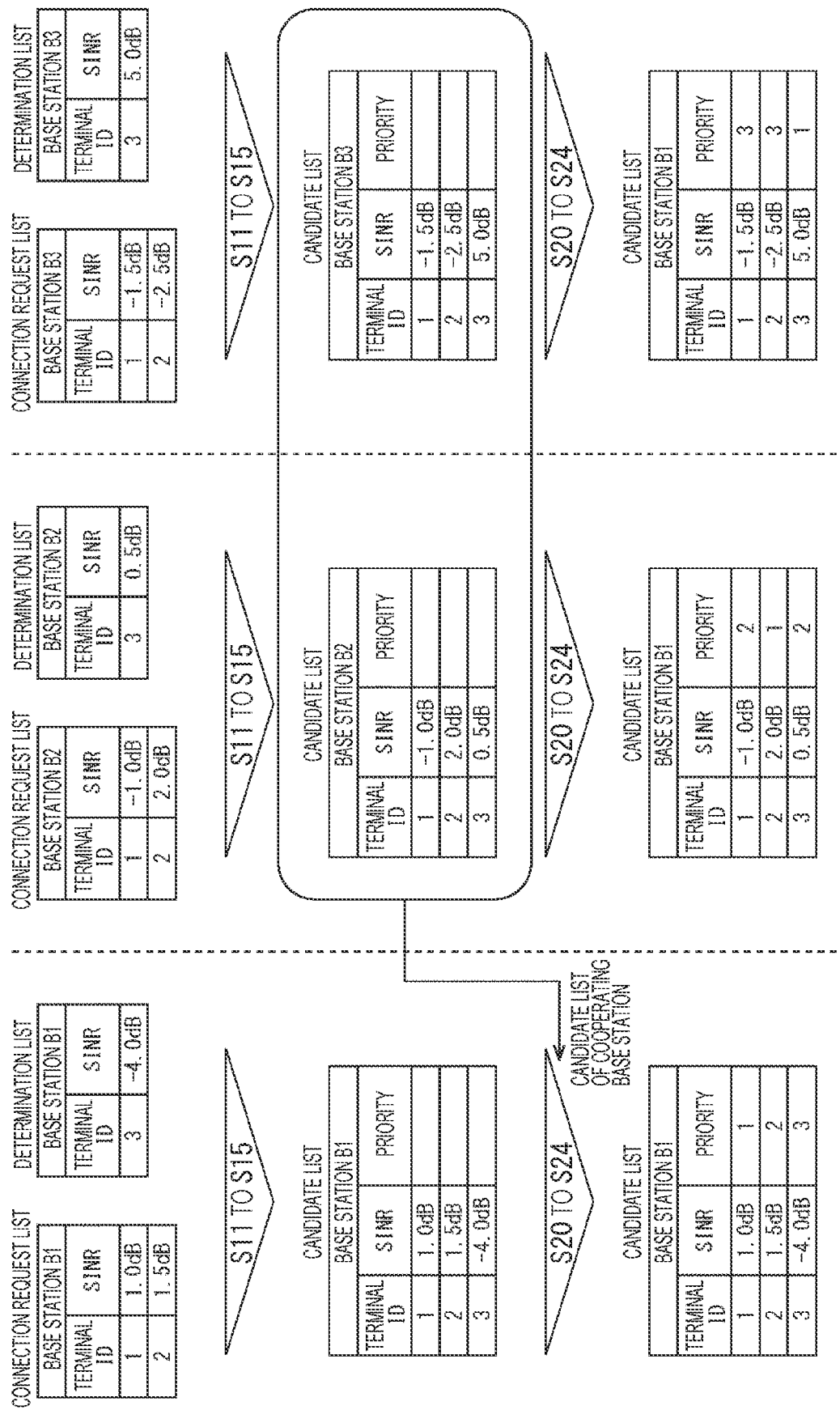
FIG. 11 is a diagram showing an example of a connection request list, a determination list, and a candidate list used in the first charged terminal determination processing.
Figure 12:
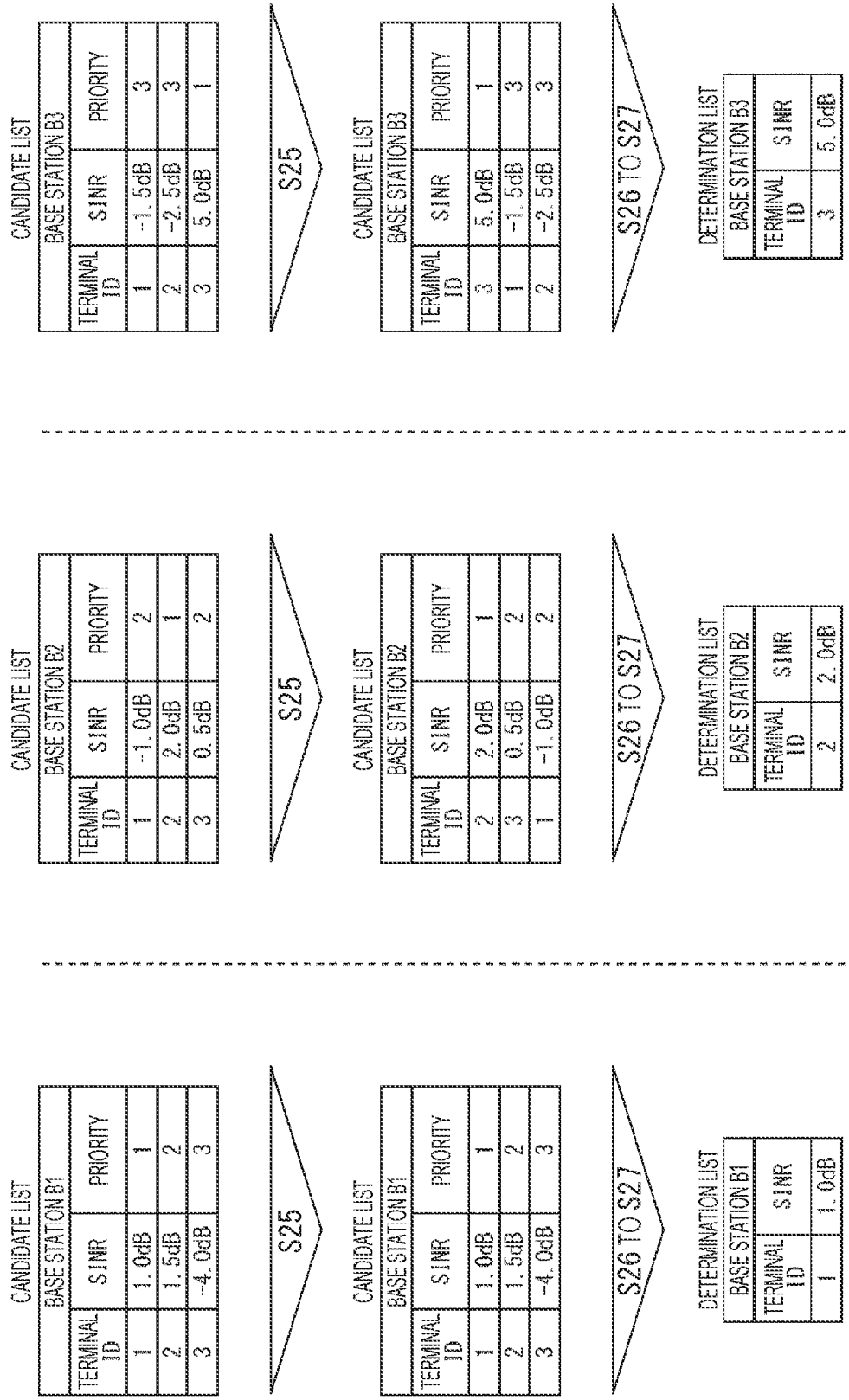
FIG. 12 is a diagram showing an example of a connection request list, a determination list, and a candidate list used in the first charged terminal determination processing.

FIGS. 11 and 12 are diagrams showing an example of a connection request list, a determination list, and a candidate list used in the first charged terminal determination processing.

Note that FIG. 12 is a diagram following FIG. 11.

Furthermore, in the following, i is adopted as the terminal ID of the terminal T#i in the drawing.

In FIGS. 11 and 12, three base stations B1, B2, and B3 exist as base stations B#j, and three terminals T1, T2, and T3 exist as terminals T#i.

The terminals T1 and T2 are registered in all the connection request lists of the base stations B1 to B3, and in all the determination lists of base stations B1 to B3 acquired in the previous first charged terminal determination processing, the terminal T3 is registered. Therefore, the connection request frames transmitted by the terminals T1 and T2 are received by the base stations B1 to B3.

Here, it is assumed that the numbers of possible terminals of the base stations B1 to B3 are all one.

Now, in the base station B#j without cooperation among the base stations B1 to B3, processing of determining the terminals T#i of the number of possible terminals as the charged terminals of the base station B#j in descending order of the SINR when the base station B#j receives a connection request frame (hereinafter, also referred to as simple processing) is performed.

According to the connection request list and the determination list in FIG. 11, the terminal T#i having the highest SINR in the base station B1 is the terminal T2 having the SINR of 1.5 dB, and the terminal T#i having the highest SINR in the base station B2 is the terminal T2 having the SINR of 2.0 dB, and the terminal T#i having the highest SINR in the base station B3 is the terminal T3 having the SINR of 5.0 dB.

In this case, in the simple processing, the charged terminal of the base station B1 is the terminal T2, the charged terminal of the base station B2 is the terminal T2, and the charged terminal of the base station B3 is the terminal T3. Therefore, the terminal T1 is not the charged terminal for any of the base stations B1 to B3.

On the other hand, according to the first charged terminal determination processing, processing of steps S11 to S15 is performed, and thereby, the terminals T1 to T3 are registered in the candidate list of the base stations B1 to B3 as shown in FIG. 11.

The SINRs of the terminals T1 registered in the candidate list of the base stations B1 to B3 in the base stations B1 to B3 are 1.0 dB, −1.0 dB, and −1.5 dB, respectively, so that the priorities of the base stations B1 to B3 with respect to the terminal T1 are set as first order, second order and third order, respectively.

The SINRs of the terminals T2 registered in the candidate list of the base stations B1 to B3 in the base stations B1 to B3 are 1.5 dB, 2.0 dB, and −2.5 dB, respectively, so that the priorities of the base stations B1 to B3 with respect to the terminal T2 are set as second order, first order and third order, respectively.

The SINRs of the terminals T3 registered in the candidate list of the base stations B1 to B3 in the base stations B1 to B3 are −4.0 dB, 0.5 dB, and 5.0 dB, respectively, so that the priorities of the base stations B1 to B3 with respect to the terminal T3 are set as third order, second order, and first order, respectively.

By performing the processing of steps S20 to S24 of the first charged terminal determination processing, the priority of the base station B#j with respect to the terminal T#i is set as described above, and as shown in FIG. 11, the priority is registered in the candidate list of the base station B#j.

The candidate list of the base station B#j is sorted according to the priority and the SINR of the base stations by performing the processing of step S25 of the first charged terminal determination processing, and the sorted candidate list of the base station B#j is as shown in FIG. 12.

That is, in the candidate list of the base station B1, the terminals T1 to T3 are registered in that order. In the candidate list of the base station B2, the terminals T1 to T3 are registered in the order of the terminals T2, T3, and T1. In the candidate list of the base station B3, the terminals T1 to T3 are registered in the order of the terminals T3, T1, and T2.

Then, by performing the processing of steps S26 and S27 of the first charged terminal determination processing, the terminal T1 registered at the top in the candidate list of the base station B1 is determined as the charged terminal, and is registered in the determination list of the base station B1. The terminal T2 registered at the top in the candidate list of the base station B2 is determined as the charged terminal, and is registered in the determination list of the base station B2. The terminal T3 registered at the top in the candidate list of the base station B3 is determined as the charged terminal, and is registered in the determination list of the base station B3.

As described above, according to the first charged terminal determination processing, the terminal T#i that is the charged terminal is distributed to the base stations B1 to B3, and it is possible to prevent a certain terminal T#i from not being a charged terminal in any of the base stations B1 to B3.

<Second Charged Terminal Determination Processing>

Figure 13:
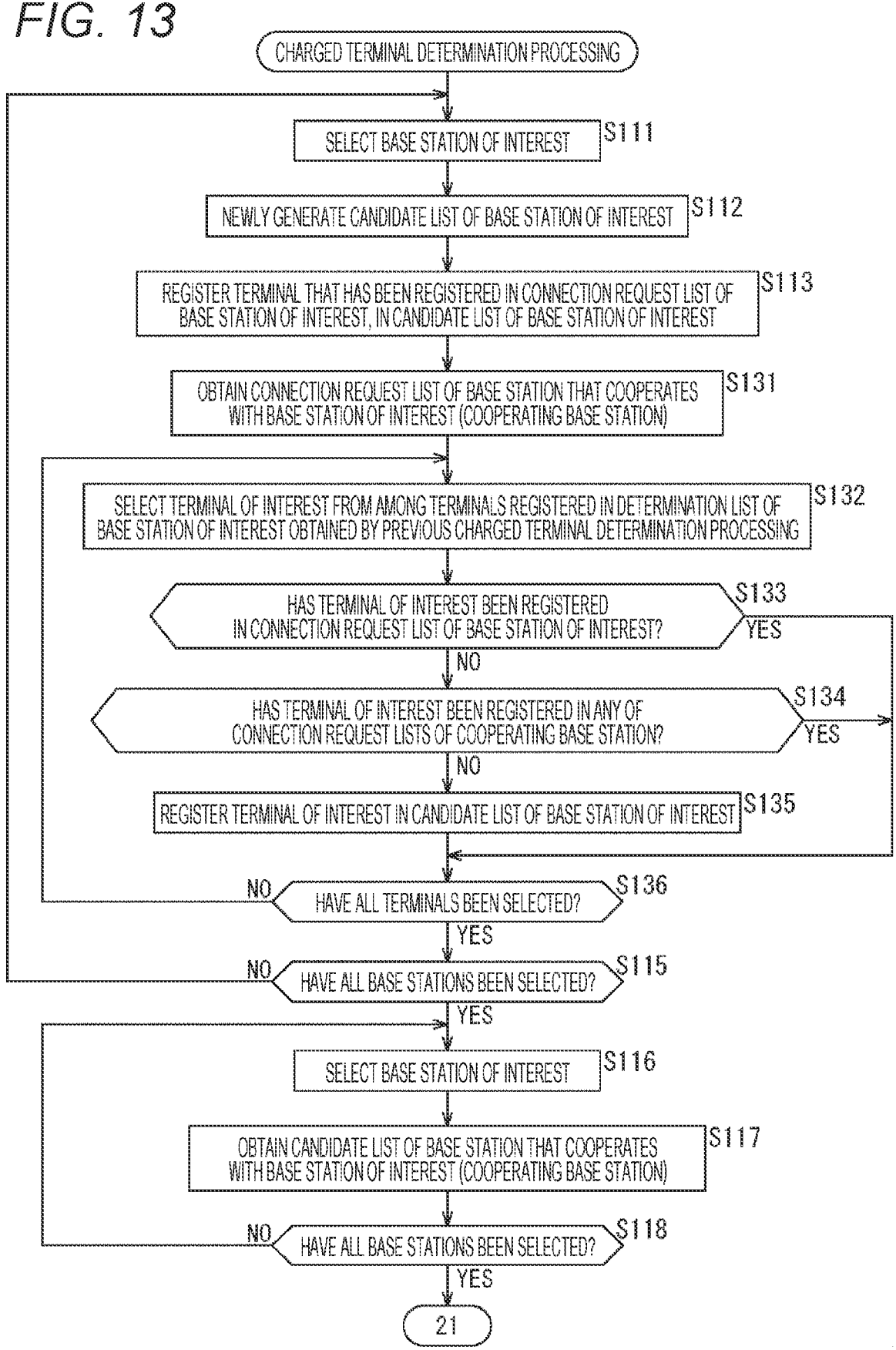
FIG. 13 is a flowchart for explaining second charged terminal determination processing.

FIG. 13 is a flowchart for explaining second charged terminal determination processing.

Figure 14:
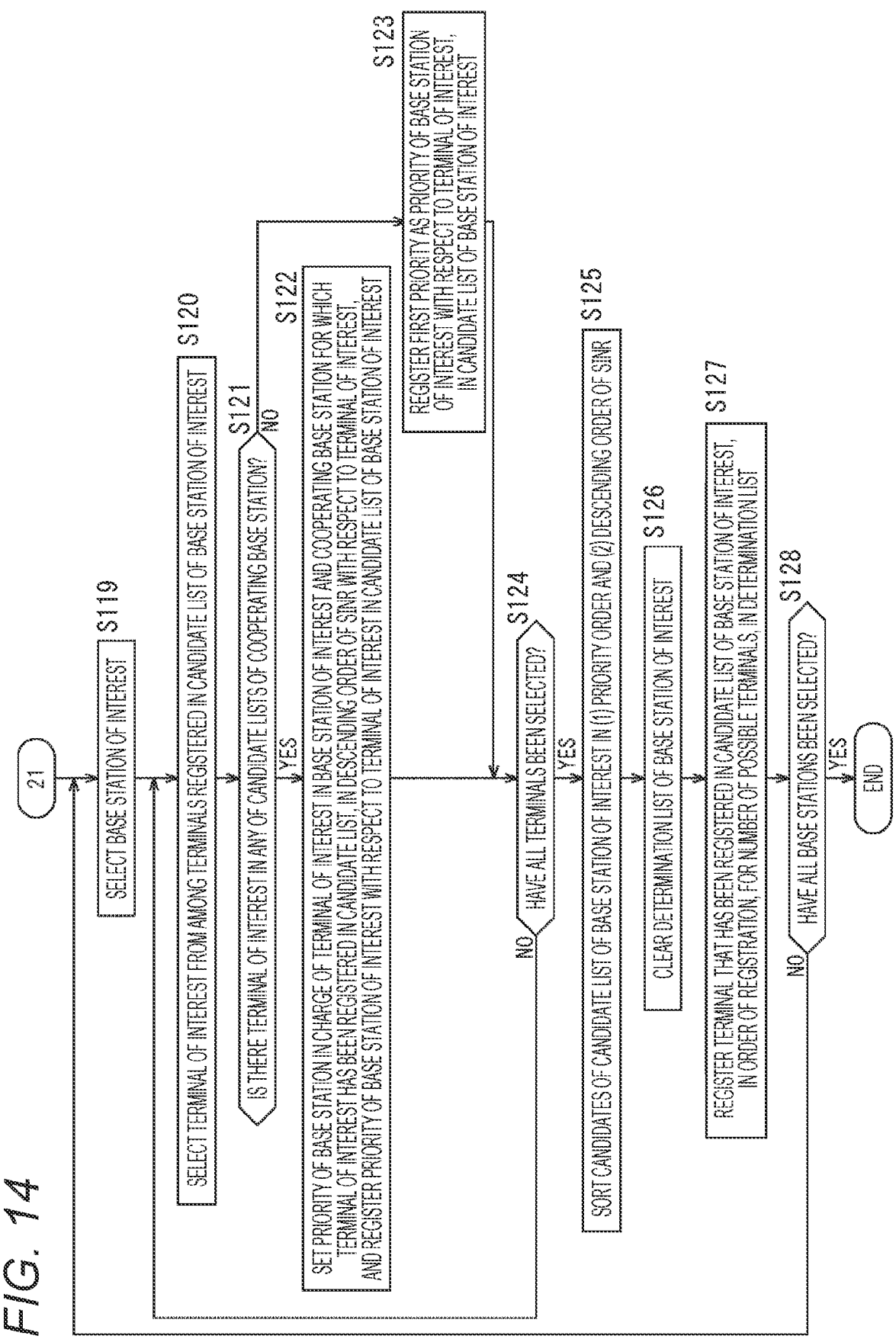
FIG. 14 is a flowchart for explaining second charged terminal determination processing.

FIG. 14 is a flowchart following FIG. 13.

In the first charged terminal determination processing, in a case where the terminal T#i located in the receivable area of a certain base station B#j moves and is now located outside the receivable area of the base station B#j, the terminal T#i located outside the receivable area of the base station B#j may remain in the determination list of the base station B#j.

Therefore, in the second charged terminal determination processing, instead of a part of the first charged terminal determination processing, out-of-area terminal avoidance processing is performed to avoid determining the terminal T#i that has moved out of the receivable area of the base station B#j as the charged terminal of the base station B#j.

In the out-of-area terminal avoidance processing, the terminal T#i for which the connection request frame is not received by the base station B#j and the connection request frame is received by another base station B#j' is avoided from being determined as the charged terminal of the base station B#j. Therefore, determining the terminal T#i that has moved out of the receivable area of the base station B#j as the charged terminal of the base station B#j is avoided.

In the second charged terminal determination processing, in steps S111 to S113, the similar processing to that in steps S11 to S13 of the first charged terminal determination processing (FIGS. 9 and 10) is performed.

Then, after step S113, the processing of steps S131 to S136 as the out-of-area terminal avoidance processing is performed instead of step S14 of the first charged terminal determination processing.

That is, in the out-of-area terminal avoidance processing, in step S131, the charged terminal determination unit 33 acquires the connection request list (connection request list transmitted by the cooperating base station to the management server 30) of the cooperating base station that cooperates with the base station of interest, and the process proceeds to step S132.

In step S132, the charged terminal determination unit 33 selects one terminal that has not yet selected as the terminal of interest among the terminals registered in the determination list (FIG. 8) of the base station of interest acquired in the previous charged terminal determination processing, as the terminal of interest, and the process proceeds to step S133.

In step S133, the charged terminal determination unit 33 determines whether or not the terminal of interest has been registered in the connection request list of the base station of interest.

Furthermore, in a case where it is determined in step S133 that the terminal of interest has not been registered in the connection request list of the base station of interest, the process proceeds to step S134.

In step S134, the charged terminal determination unit 33 determines whether or not the terminal of interest is registered in the connection request list of any of the cooperating base stations.

In a case where it is determined in step S134 that the terminal of interest has not been registered in the connection request list of any of the cooperating base stations, the process proceeds to step S135.

In step S135, the charged terminal determination unit 33 registers the terminal of interest in the candidate list of the base station of interest, and the process proceeds to step S136.

Therefore, in a case where the terminals registered in the determination list of the base station of interest acquired in the previous charged terminal determination processing has not been registered in the connection request list of the base station of interest, and has not been registered in the connection request list of any of the cooperating base stations, it is assumed that the terminal may exist in the receivable area of the base station of interest and is registered in the candidate list of the base station of interest.

On the other hand, in a case where it is determined in step S133 that the terminal of interest has been registered in the connection request list of the base station of interest, the process skips steps S134 and S135 and proceeds to step S136.

That is, in a case where the terminal of interest has been registered in the connection request list of the base station of interest, the terminal of interest has been registered in the candidate list of the base station of interest in the already performed step S113, so that, in order to avoid duplicate registration, step S135 for registering the terminal of interest in the candidate list of the base station of interest is skipped.

Furthermore, in a case where it is determined in step S134 that the terminal of interest has been registered in the connection request list of any of the cooperating base stations, the process skips step S135 and proceeds to step S136.

That is, in a case where the terminal registered in the determination list of the base station of interest acquired in the previous charged terminal determination processing has not been registered in the connection request list of the base station of interest, but has been registered in the connection request list of any of the cooperating base stations, the terminal is within the receivable area of the cooperating base station, but has moved out of the receivable area of the base station of interest. In this case, step S135 for registering the terminal of interest in the candidate list of the base station of interest is skipped so that the terminal that has moved out of the receivable area of the base station of interest does not become the charged terminal of the base station of interest.

In step S136, the charged terminal determination unit 33 determines whether or not all the terminals registered in the determination list of the base station of interest acquired in the previous charged terminal determination processing have been selected as the terminals of interest, and in a case where all the terminals are not selected as the terminals of interest, the process returns to step S132. In step S132, the terminal of interest is newly selected, and the similar processing is repeated thereafter.

Furthermore, in step S136, in a case where it is determined that all the terminals registered in the determination list of the base station of interest acquired in the previous charged terminal determination processing are selected as the terminals of interest, selection of all the terminals registered in the determination list of the base station of interest as the terminals of interest is reset, and the process proceeds to step S115.

In steps S115 to S128, the similar processing to that in steps S15 to S28 of the first charged terminal determination processing is performed.

Figure 15:
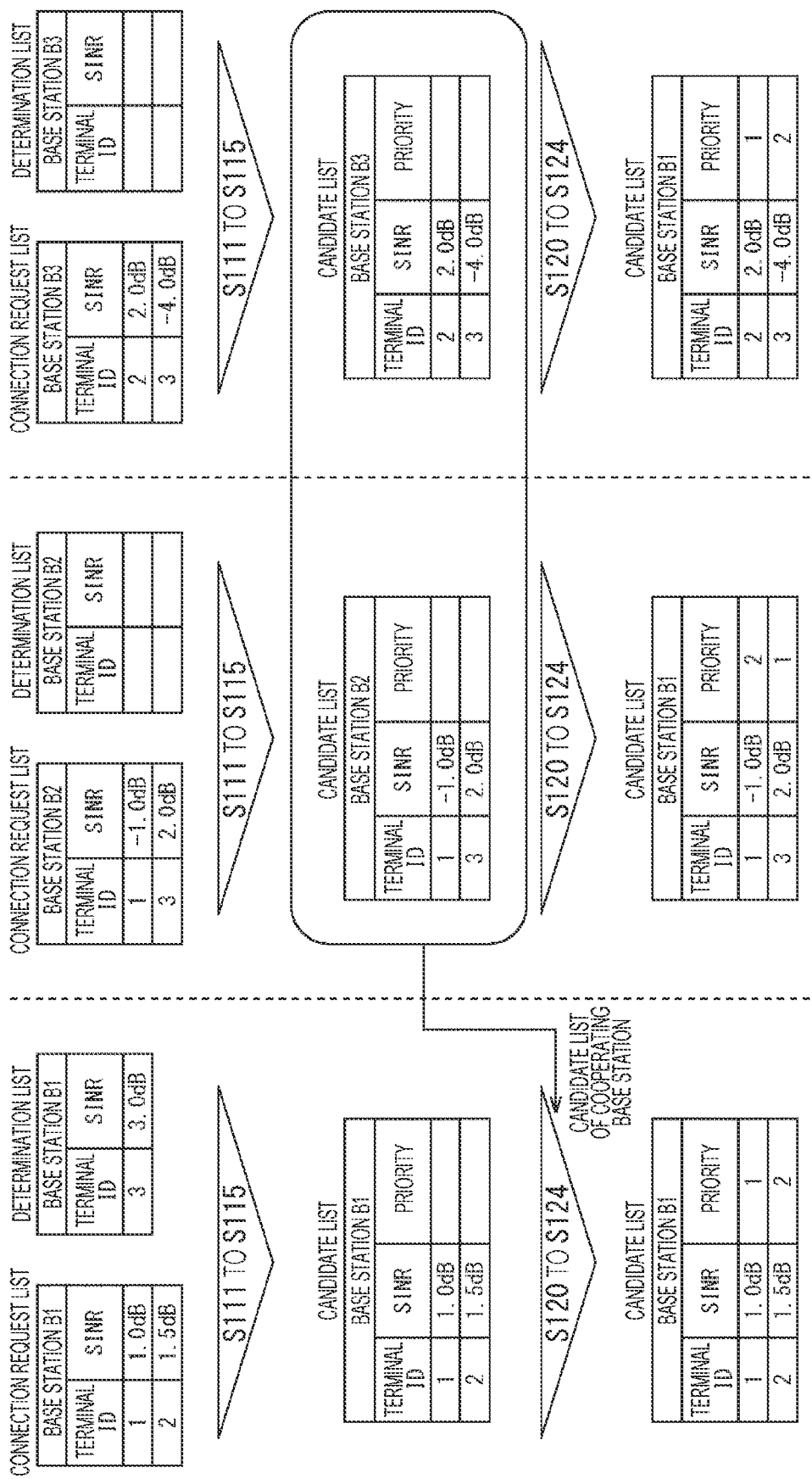
FIG. 15 is a diagram showing an example of a connection request list, a determination list, and a candidate list used in the second charged terminal determination processing.
Figure 16:
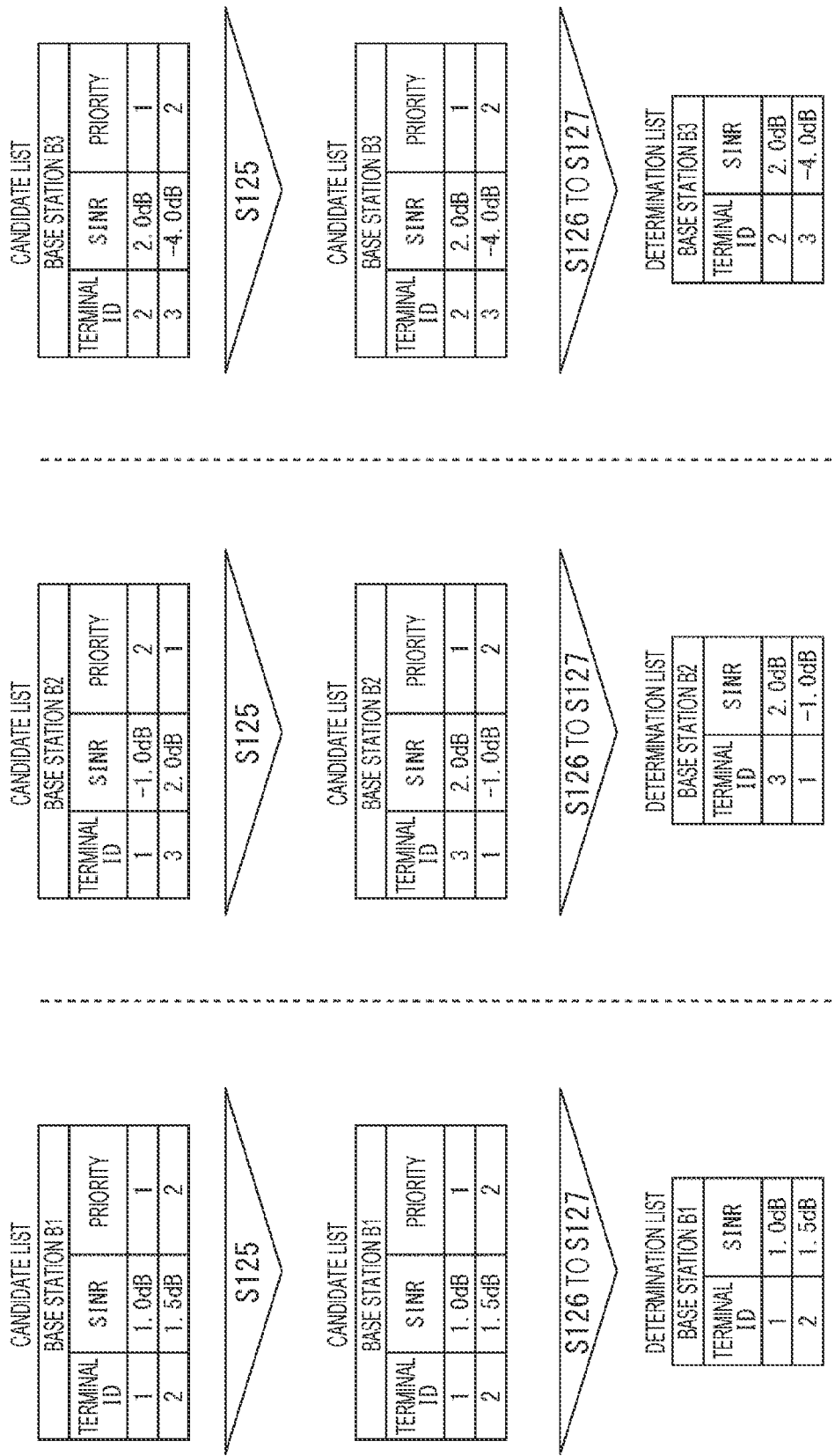
FIG. 16 is a diagram showing an example of a connection request list, a determination list, and a candidate list used in the second charged terminal determination processing.

FIGS. 15 and 16 are diagrams showing an example of a connection request list, a determination list, and a candidate list used in the second charged terminal determination processing.

Note that FIG. 16 is a diagram following FIG. 15.

In FIGS. 15 and 16, three base stations B1, B2, and B3 exist as base stations B#j, and three terminals T1, T2, and T3 exist as terminals T#i.

The terminals T1 and T2 are registered in the connection request list of the base station B1, and in the determination list of the base station B1 acquired in the previous second charged terminal determination processing, the terminal T3 is registered. The terminals T1 and T3 are registered in the connection request list of the base station B2, and in the determination list of the base station B2 acquired in the previous second charged terminal determination processing, registration has not been performed. The terminals T2 and T3 are registered in the connection request list of the base station B3, and in the determination list of the base station B3 acquired in the previous second charged terminal determination processing, registration has not been performed.

Here, it is assumed that the numbers of possible terminals of the base stations B1 to B3 are all two.

In FIGS. 15 and 16, the terminal T3 has been in the receivable area of the base station B1 at the time of the previous second charged terminal determination processing, but has moved to the outside the receivable area of the base station B1 and within the receivable area of the base stations B2 and B3 at the time of this time second charged terminal determination processing.

Therefore, the terminal T3 has been registered in the determination list of the base station B1 acquired in the previous second charged terminal determination processing. Furthermore, the terminal T3 has not been registered in the connection request list of the base station B1 used for this time second charged terminal determination processing, but has been registered in the connection request lists of the base stations B2 and B3.

In this case, according to the second charged terminal determination processing, the processing of steps S111 to S115 including steps S131 to S136 as the out-of-area terminal avoidance processing is performed, so that the terminal T#i is registered in the candidate lists of the base stations B1 to B3 as shown in FIG. 15.

That is, the terminals T1 and T2 are registered in the candidate list of the base station B1, the terminals T1 and T3 are registered in the candidate list of the base station B2, and the terminals T2 and T3 are registered in the candidate list of the base station B3.

Here, the terminal T3 registered in the determination list of the base station B1 that has moved out of the receivable area of the base station B1 has not been registered in the connection request list of the base station B1 and has been registered in the connection request lists of the base stations B2 and B3 as base stations other than the base station B1 (another base station), and therefore, the terminal T3 is not registered in the candidate list of the base station B1.

As described above, the terminal T3 that has moved out of the receivable area of the base station B1 is not registered in the candidate list of the base station B1, and is not registered in the determination list of the base station B1 as the charged terminal of the base station B1 thereafter.

Therefore, the terminal T3 that has moved out of the receivable area of the base station B1 continues to remain in the determination list of the base station B1, and therefore, it is possible to prevent the base station B1 from performing the receiving processing of the terminal T3 outside the receivable area to consume resource wastefully.

In FIGS. 15 and 16, the terminal T1 is registered in the candidate lists of the base stations B1 and B2, and the SINRs of the terminal T1 in the base stations B1 and B2 are 1.0 dB and −1.0 dB, respectively, so that the priorities of the base stations B1 and B2 with respect to the terminal T1 are set as first order and second order, respectively.

The terminal T2 is registered in the candidate lists of the base stations B1 and B3, and the SINRs of the terminal T2 in the base stations B1 and B3 are 1.5 dB and 2.0 dB, respectively, so that the priorities of the base stations B1 and B3 with respect to the terminal T2 are set as second order and first order, respectively.

The terminal T3 is registered in the candidate lists of the base stations B2 and B3, and the SINRs of the terminal T3 in the base stations B2 and B3 are 2.0 dB and −4.0 dB, respectively, so that the priorities of the base stations B2 and B3 with respect to the terminal T3 are set as first order and second order, respectively.

By performing the processing of steps S120 to S124 of the second charged terminal determination processing, the priority of the base station B#j with respect to the terminal T#i is set as described above, and as shown in FIG. 15, the priority is registered in the candidate list of the base station B#j.

The candidate list of the base station B#j is sorted according to the priority and the SINR of the base stations by performing the processing of step S125 of the second charged terminal determination processing, and the sorted candidate list of the base station B#j is as shown in FIG. 16.

That is, in the candidate list of the base station B1, the terminals T1 and T2 are registered in that order. In the candidate list of the base station B2, the terminals T1 and T3 are registered in the order of the terminals T3 and T1. In the candidate list of the base station B3, the terminals T2 and T3 are registered in that order.

Then, by performing the processing of steps S126 and S127 of the second charged terminal determination processing, the terminals T1 and T2 registered up to the second in the candidate list of the base station B1 are determined as the charged terminals, and are registered in the determination list of the base station B1. The terminals T3 and T1 registered up to the second in the candidate list of the base station B2 are determined as the charged terminals, and are registered in the determination list of the base station B2. The terminals T2 and T3 registered up to the second in the candidate list of the base station B3 are determined as the charged terminals, and are registered in the determination list of the base station B3.

<Third Charged Terminal Determination Processing>

FIG. 17 is a diagram showing an example of the number of terminals T#i for each priority of the base station B#j.

In a case where the charged terminal (the terminal to be the charged terminal) of each base station is determined in the first and second charged terminal determination processing, in one base station B#j and another base station B#j', the number of terminals T#i with the same priority of the base station is biased in some cases.

For example, due to the difference in the height of the receiving antenna between the base station B#j and the (another) base station B#j', the influence of shadowing, and the like, one of the base stations B#j and B#j' is easier to receive normally the connection request frame (for example, the connection request frame is more likely to be received with a high SINR) than the another base station. In this case, terminals of a high priority of one base station are concentrated on the one base station.

For example, now, it is assumed that, in a state where with 300 terminals T1 to T300 located in an area where the receivable areas of each of the three base stations B1 to B3 overlap, the first or second charged terminal determination processing is performed, and for each of the base stations B1 to B3, the number of terminals T#i for each priority of the base station B#j shown in FIG. 17 has been acquired.

In FIG. 17, the number of terminals T#i (number of terminals) having the first priority of base station B1 is 180, the number of terminals having the second priority is 20, and the number of terminals having the third priority is 100. Furthermore, the number of terminals having the first priority of the base station B2 is 80, the number of terminals having the second priority is 120, and the number of terminals having the third priority is 100. Moreover, the number of terminals having the first priority of the base station B3 is 40, the number of terminals having the second priority is 160, and the number of terminals having the third priority is 100.

In FIG. 17, for example, the base station B1 among the base stations B1 to B3 is located higher than the base stations B2 and B3, and therefore, the base station B1 among the base stations B1 to B3 is particularly easy to receive the connection request frame normally, and therefore, the terminal T#i having the priority (of base station B1) of the first order is biased (concentrated) to the base station B1.

Assuming that the numbers of possible terminals of the base stations B1 to B3 are all 100, for example, both the base stations B2 and B3 can have all the terminals having the priority of the base station of the first order and a part of the terminal having the priority of the base station of the second order as the charged terminals.

That is, in the base station B2, all 80 terminals having the priority of the base station B2 of the first order, and 20 terminals of which registration order in the candidate list of the base station B2 among 120 terminals having the priority of the base station B2 of the second order can be the charged terminals. In the base station B3, all 40 terminals having the priority of the base station B3 of the first order, and 60 terminals of which registration order in the candidate list of the base station B3 among 160 terminals having the priority of the base station B3 of the second order can be the charged terminals.

On the other hand, in the base station B1, since the number of terminals having the first priority of the base station B1 is concentrated to be 180, the upper 100 terminals of the registration order in the candidate list of the base station B1 among 180 terminals can be the charged terminals. However, in the base station B1, among the 180 terminals having the first priority of the base station B1, 80 terminals exceeding 100, which is the number of possible terminals, cannot be charged terminals.

Therefore, in order for all 300 terminals to be in charge of any of the base stations B1 to B3, it is necessary for the lower 80 terminals of the registration order in the candidate list of the base station B1 among 180 terminals having the first priority of the base station B1 to be the upper 20 terminals of the registration order in the candidate list of the base station B2 among 120 terminals having the second priority of the base station B2, or be the upper 60 terminals of the registration order in the candidate list of the base station B3 among 160 terminals having the second priority of the base station B3.

However, the lower 80 terminals of the registration order in the candidate list of the base station B1 among 180 terminals having the first priority of the base station B1 are not always to be the upper 20 terminals of the registration order in the candidate list of the base station B2 among 120 terminals having the second priority of the base station B2, or be the upper 60 terminals of the registration order in the candidate list of the base station B3 among 160 terminals having the second priority of the base station B3. As a result, there may be a terminal that does not serve as a charged terminal for any of the base stations B1 to B3, even though the priority of the base station B1 is the first order.

Therefore, in the third charged terminal determination processing, for each priority of the base station of interest, more specifically, in descending order of priority of the base station of interest, terminals that have not been determined to be the charged terminals of other base stations are preferentially determined to be the charged terminals of the base station of interest, and in a case where there is a vacancy for the charged terminal of the base station of interest, the terminal determined to be the charged terminal of another base station among the terminals of which priority of the base station of interest has been set is determined as the charged terminal of the base station of interest, for the number of the vacancy, and thereby, even if the number of terminals with high priority of the base station of interest is biased, the terminals with the same priority of the base station are registered in the determination list in an appropriate order, and therefore, the charged terminal distribution processing for distributing the charged terminals to each base station is performed.

The third charged terminal determination processing is performed using the connection request list, the determination list, the candidate list, and the pending list described in FIG. 8.

FIG. 18 is a diagram showing an example of a pending list used by the charged terminal determination unit 33 in the third charged terminal determination processing.

The pending list is a list for each base station B#j in which the terminal T#i for which registration of the base station B#j in the determination list is suspended is registered. The pending list is generated in the third charged terminal determination processing. In the third charged terminal determination processing, in a case where there is a vacancy in the determination list of the base station B#j, that is, in a case where the number of charged terminals of the base station B#j has a margin (surplus) to the number of possible terminals of the base station B#j, the terminals that have been registered in the pending list of the base station B#j is registered in the determination list of the base station B#j.

In the pending list of the base station B#j, the terminal T#i is registered in a form that maintains the context of the registration order of terminal T#i in the candidate list of the base station B#j after sorting according to the registration order index.

As similar to the determination list, in the pending list of the base station B#j, for example, the terminal ID as the identification information for identifying the terminal T#i of which the base station B#j takes charge and the SINR as the priority index are registered.

Figure 19:
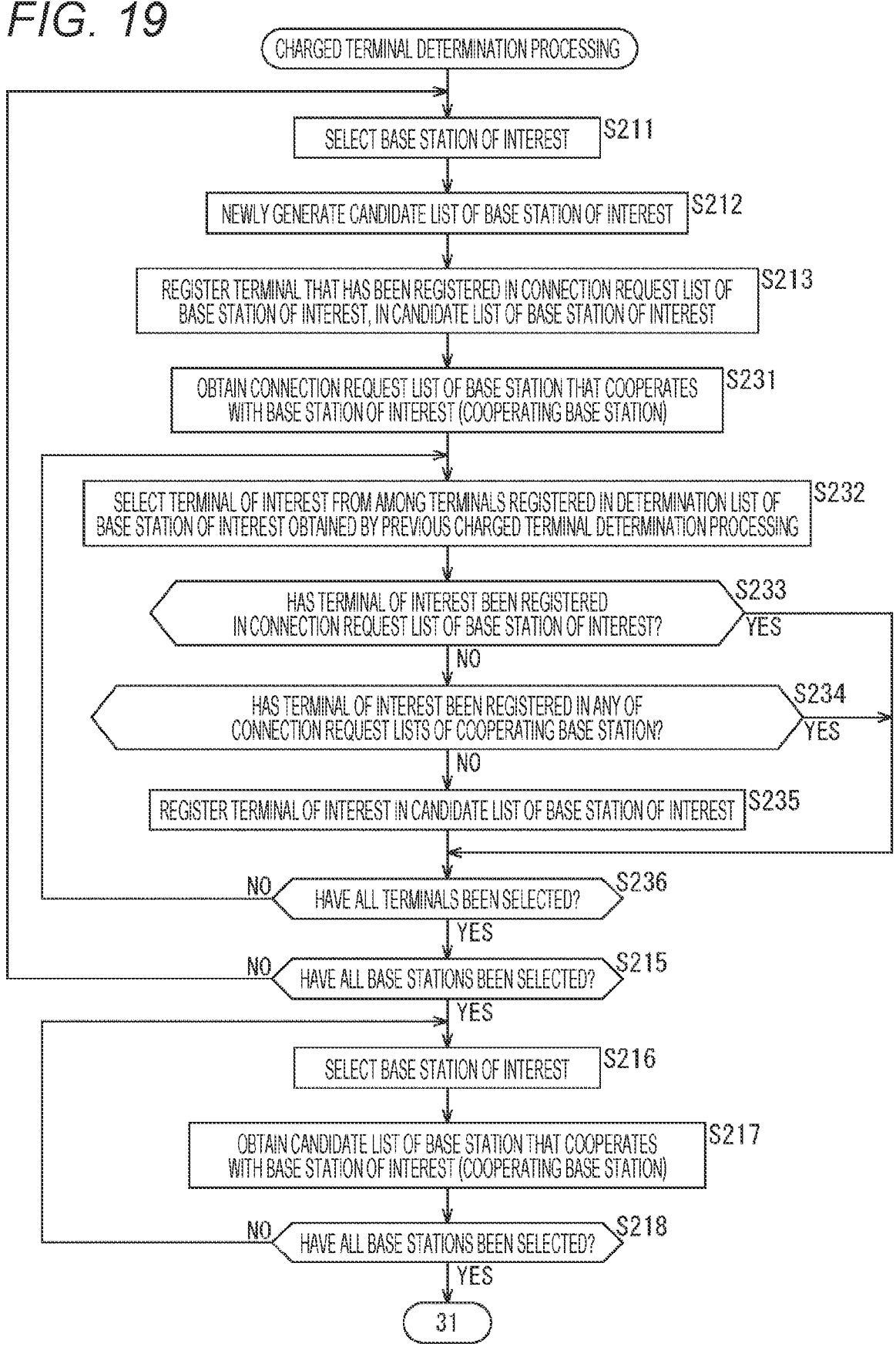
FIG. 19 is a flowchart for explaining third charged terminal determination processing.

FIG. 19 is a flowchart for explaining third charged terminal determination processing.

Figure 20:
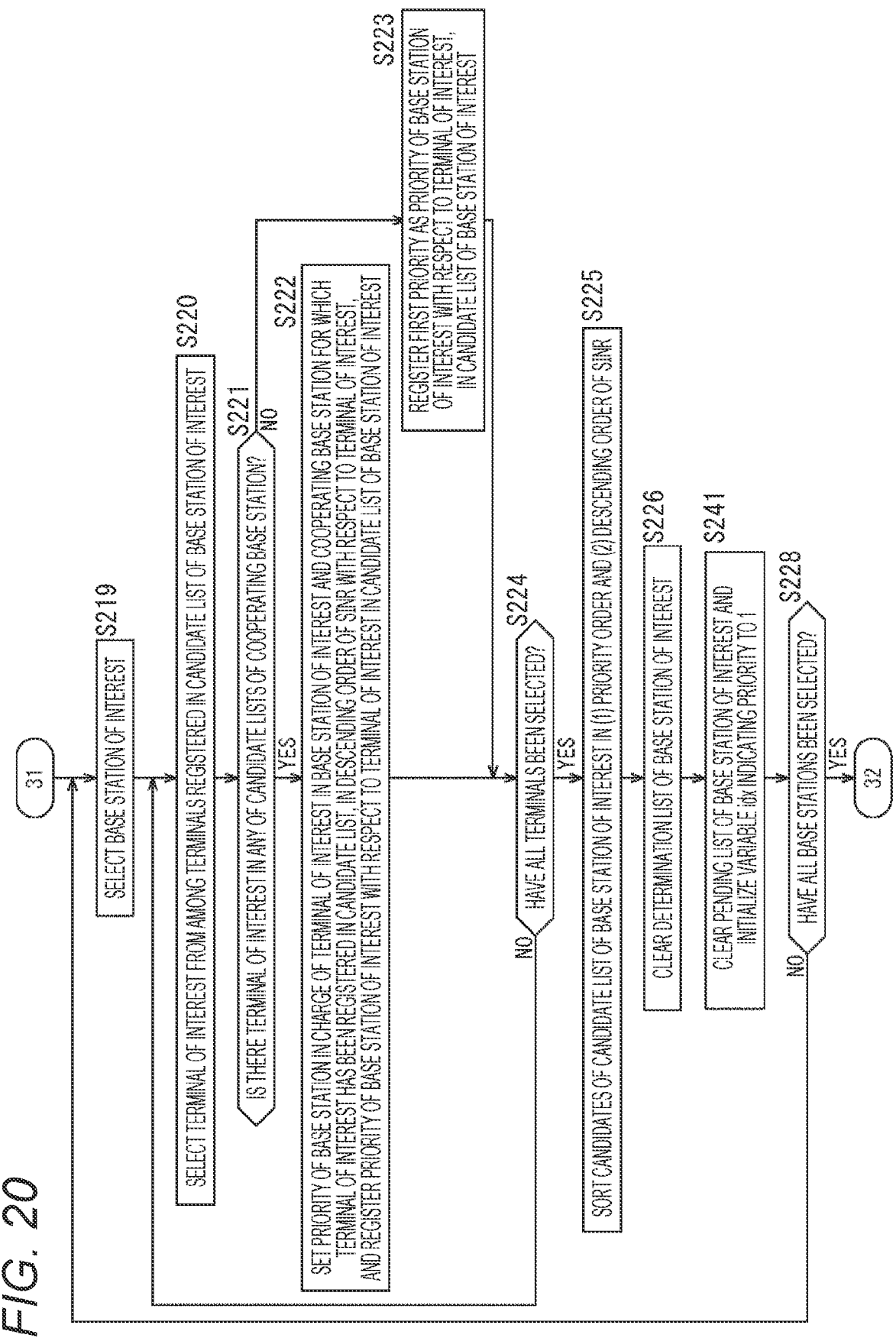
FIG. 20 is a flowchart for explaining third charged terminal determination processing.
Figure 21:
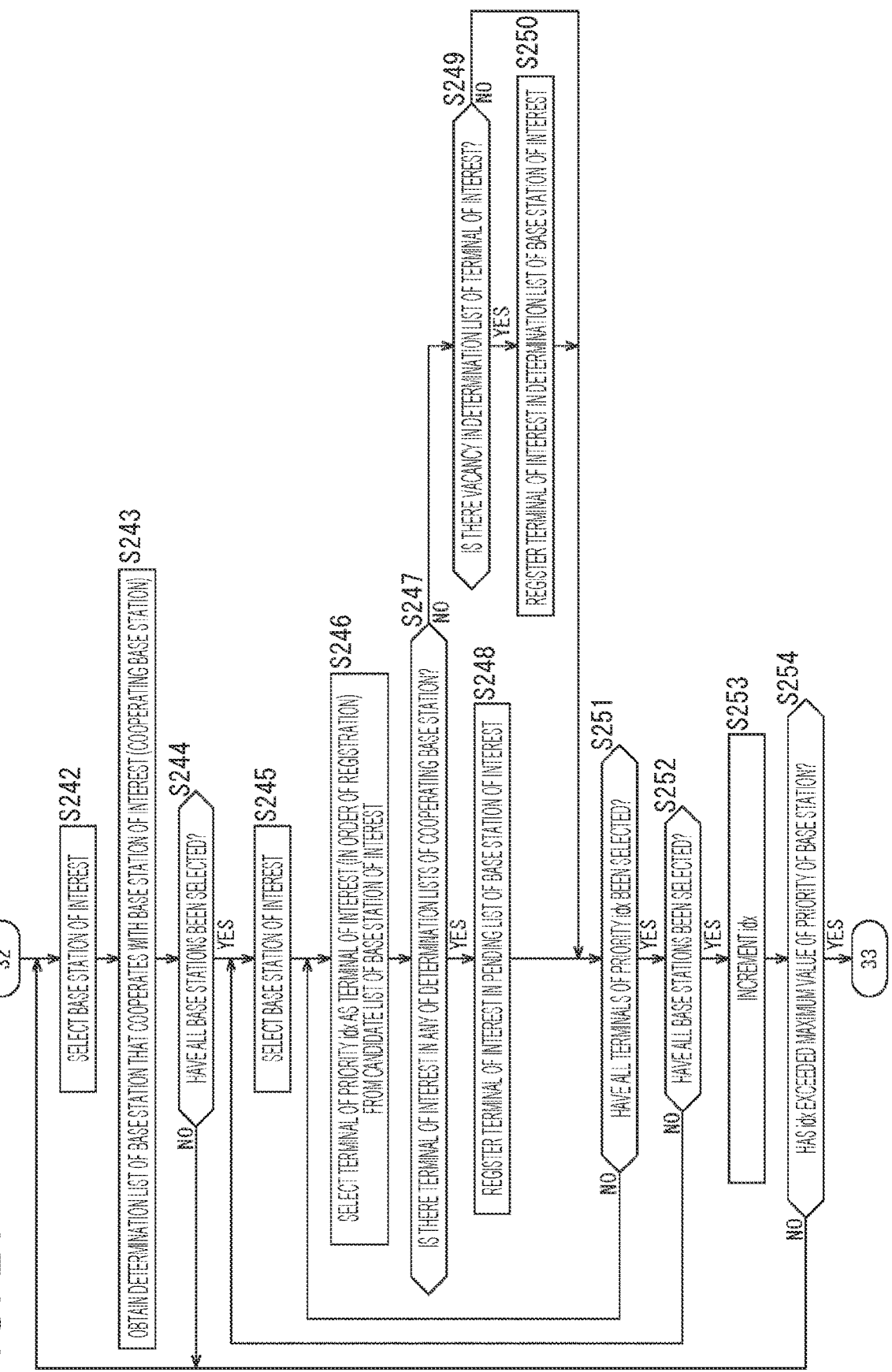
FIG. 21 is a flowchart for explaining third charged terminal determination processing.
Figure 22:
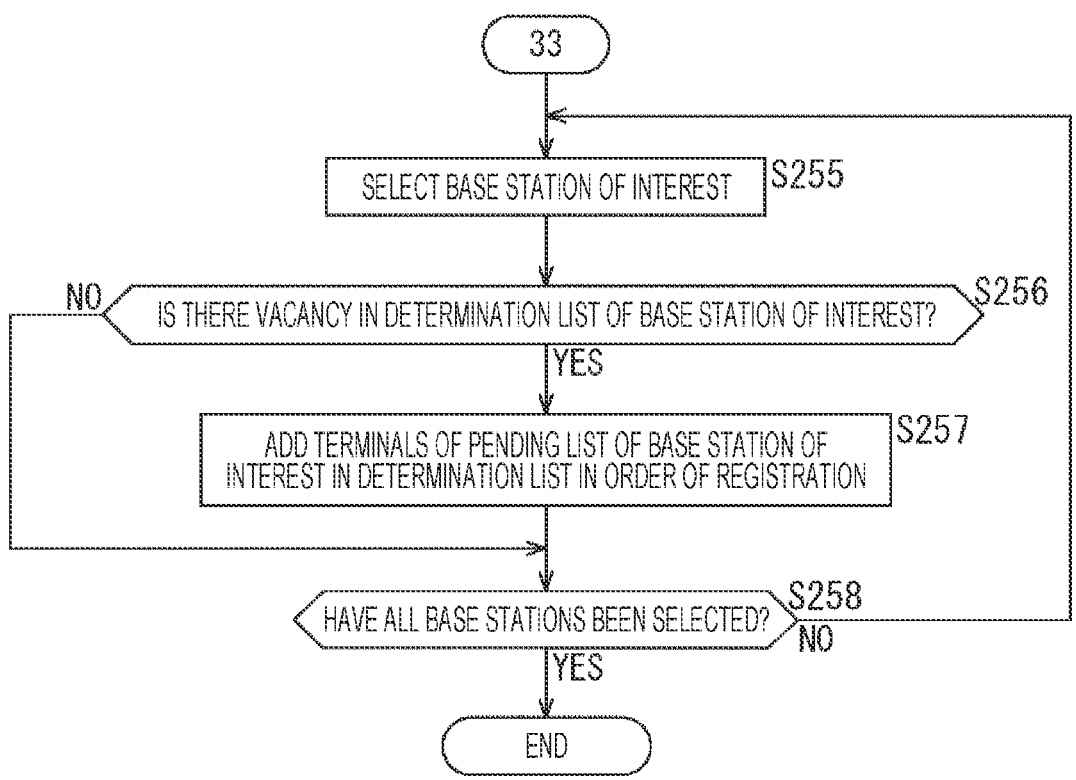
FIG. 22 is a flowchart for explaining third charged terminal determination processing.

FIG. 20 is a flowchart following FIG. 19. FIG. 21 is a flowchart following FIG. 20. FIG. 22 is a flowchart following FIG. 21.

In the third charged terminal determination processing, in addition to the second charged terminal determination processing, the charged terminal distribution processing is performed.

In the charged terminal distribution processing, as described above, the terminals that have not been determined as the charged terminals of the other base stations are determined as the charged terminals of the base station of interest in descending order of priority of the base station of interest. Then, in a case where there is vacancy for the charged terminal of the base station of interest, the terminal that has been determined as the charged terminal of another base station among the terminals of which priority of the base station of interest has been set is determined as the charged terminal of the base station of interest for the number of the vacancy. Therefore, even if the number of terminals of a high priority of the base station of interest is biased, the charged terminals are distributed to each base station, and it is possible to suppress the occurrence of terminals that are not charged terminals of any of the base stations.

In the third charged terminal determination processing, in steps S211 to S226 of FIGS. 19 and 20, the similar processing to that in steps S111 to S126 of the second charged terminal determination processing (FIGS. 13 and 14) is performed.

Then, after step S226 in FIG. 20, the process proceeds to step S241, and the charged terminal determination unit 33 clears the pending list of the base station of interest. Moreover, the charged terminal determination unit 33 initializes the variable idx representing the priority of the base station to 1, and the process proceeds from step S241 to step S228.

In step S228, the similar processing to that in step S128 of the second charged terminal determination processing is performed.

Then, in step S228, in a case where it is determined that all the base stations included in the wireless communication system have been selected as the base stations of interest, selection of all the base stations included in the wireless communication system as the base stations of interest is reset, and the process proceeds to step S242 of FIG. 21.

In step S242 and subsequent steps, steps S242 to S258 are performed as the charged terminal distribution processing.

That is, in the charged terminal distribution processing, in step S242, the charged terminal determination unit 33 selects one base station that has not been selected as the base station of interest from the base stations included in the wireless communication system as the base station of interest, and the process proceeds to step S243.

In step S243, the charged terminal determination unit 33 acquires a determination list of the cooperating base station that cooperates with the base station of interest, and the process proceeds to step S244.

In step S244, the charged terminal determination unit 33 determines whether or not all the base stations included in the wireless communication system have been selected as the base stations of interest, and in a case where it is determined that all base stations are not selected as the base stations of interest, the process returns to step S242. In step S242, the base station of interest is newly selected, and the similar processing is repeated thereafter.

Furthermore, in step S244, in a case where it is determined that all the base stations included in the wireless communication system have been selected as the base stations of interest, selection of all the base stations included in the wireless communication system as the base stations of interest is reset, and the process proceeds to step S245.

In step S245, the charged terminal determination unit 33 selects one base station that has not been selected as the base station of interest from the base stations included in the wireless communication system as the base station of interest, and the process proceeds to step S246.

In step S246, the charged terminal determination unit 33 selects the terminal that has the priority of the base station of interest of idx, has not been selected as the terminal of interest, and of which registration order is the highest as the terminal of interest from the candidate list of the base station of interest after being sorted in step S225, and the process proceeds to step S247.

In step S247, the charged terminal determination unit 33 determines whether or not the terminal of interest has been registered (exists) in the determination list of any of the cooperating base stations acquired in step S243.

In a case where it is determined in step S247 that the terminal of interest has been registered in the determination list of any of the cooperating base stations, the process proceeds to step S248. In step S248, the charged terminal determination unit 33 registers the terminal of interest in the pending list of the base station of interest, and the process proceeds to step S251.

Therefore, in a case where the terminal of interest is already the charged terminal of any of the cooperating base stations, determination of the terminal of interest as the charged terminal of the base station of interest, that is, registration in the determination list of the base station of interest is suspended, and the terminal of interest is registered in the pending list of the base station of interest. In a case where a terminal is already registered in the pending list, the terminal of interest in the pending list is registered immediately after (the position) of the already registered terminal.

Here, the terminals of interest are selected in the registration order from the candidate list of the base stations of interest after being sorted in step S225. Then, as described above, the terminal of interest is registered to the pending list immediately after the terminal already registered. Therefore, the terminals are registered in the pending list of the base station of interest in a form that maintains the context of the registration order of the terminals in the candidate list of the base stations of interest after being sorted according to the registration order index.

On the other hand, in a case where it is determined in step S247 that the terminal of interest has not registered in the determination list of any of the cooperating base stations, the process proceeds to step S249.

In step S249, the charged terminal determination unit 33 determines whether or not there is a vacancy in the determination list of the base station of interest, and in a case where it is determined that there is no vacancy, the process skips step S250 and proceeds to step S251.

Furthermore, in a case where it is determined in step S249 that there is a vacancy in the determination list of the base station of interest, the process proceeds to step S250. In step S250, the charged terminal determination unit 33 determines the terminal of interest as the charged terminal of the base station of interest by registering the terminal of interest in the determination list of the base station of interest, and the process proceeds to step S251.

Therefore, in a case where the terminal of interest is not a charged terminal of any of the cooperating base stations, there is a possibility that the terminal of interest would not be a charged terminal of any of the cooperating base stations, so that if the number of charged terminals of the base station of interest has a margin to the number of possible terminals of the base station of interest, the terminal of interest is registered in the determination list of the base station of interest to be determined as the charged terminal of the base station of interest. In a case where a terminal is already registered in the determination list, the terminal of interest is registered in the determination list immediately after the already registered terminal.

In step S251, the charged terminal determination unit 33 determines from the candidate list of the base station of interest whether or not all the terminals having the priority of the base station of interest idx have been selected as the terminals of interest, and in a case where it is determined that all the terminals have not been selected, the process returns to step S246. In step S246, the terminal of interest is newly selected, and the similar processing is repeated thereafter.

Furthermore, in step S251, in a case where it is determined from the candidate list of the base station of interest that all the terminals having the priority of the base station of interest idx have been selected as the terminals of interest, the process proceeds to step S252.

In step S252, the charged terminal determination unit 33 determines whether or not all the base stations included in the wireless communication system have been selected as the base stations of interest, and in a case where it is determined that all base stations are not selected as the base stations of interest, the process returns to step S244. In step S244, the base station of interest is newly selected, and the similar processing is repeated thereafter.

Furthermore, in step S252, in a case where it is determined that all the base stations included in the wireless communication system have been selected as the base stations of interest, selection of all the base stations included in the wireless communication system as the base stations of interest is reset, and the process proceeds to step S253.

In step S253, the charged terminal determination unit 33 increments the variable idx by 1, and the process proceeds to step S254.

In step S254, the charged terminal determination unit 33 determines whether or not the variable idx has exceeded the maximum value of the priority of the base station, and in a case where it is determined that the variable idx has not exceed, the process returns to step S242, and the similar processing is repeated thereafter.

Furthermore, in a case where it is determined in step S254 that idx has exceeded the maximum priority of the base station, the process proceeds to step S255 of FIG. 22.

In step S255, the charged terminal determination unit 33 selects one base station that has not been selected as the base station of interest from the base stations included in the wireless communication system as the base station of interest, and the process proceeds to step S256.

In step S256, the charged terminal determination unit 33 determines whether or not there is a vacancy in the determination list of the base station of interest, and in a case where it is determined that there is no vacancy, the process skips step S257 and proceeds to step S258.

Furthermore, in a case where it is determined in step S256 that there is a vacancy in the determination list of the base station of interest, the process proceeds to step S257. In step S257, the charged terminal determination unit 33 registers (adds) the terminals registered in the pending list of the base station of interest as the charged terminals of the base station of interest in the determination list of the base station of interest in the registration order until the determination list of the base station of interest is full, and the process proceeds to step S258.

Therefore, if there is vacancy in the determination list of the base station of interest after a terminal that has been registered in the candidate list of the base station of interest and is not a charged terminal of any of the cooperating base stations is registered in the determination list of the base station of interest, the terminal registered in the pending list of the base station of interest, that is, the terminal that has been registered in the candidate list of the base station of interest, the terminal already being a charged terminal of the cooperating base station, is added to the determination list of the base station of interest for the number of the vacancy.

From the above, the terminals that has been registered in the candidate list of the base station of interest and is already a charged terminal of the cooperating base station can also be a charged terminal of the base station of interest only in a case where there is a vacancy in the determination list of the base station of interest. As a result, there is redundancy that one terminal serves as charged terminal of a plurality of bases of interest.

In step S258, the charged terminal determination unit 33 determines whether or not all the base stations included in the wireless communication system have been selected as the base stations of interest, and in a case where it is determined that all base stations are not selected as the base stations of interest, the process returns to step S255. In step S255, the base station of interest is newly selected, and the similar processing is repeated thereafter.

Furthermore, in step S258, in a case where it is determined that all the base stations constituting the wireless communication system have been selected as the base stations of interest, selection of all the base stations constituting the wireless communication system as the base stations of interest is reset, and the third charged terminal determination processing ends.

Figure 24:
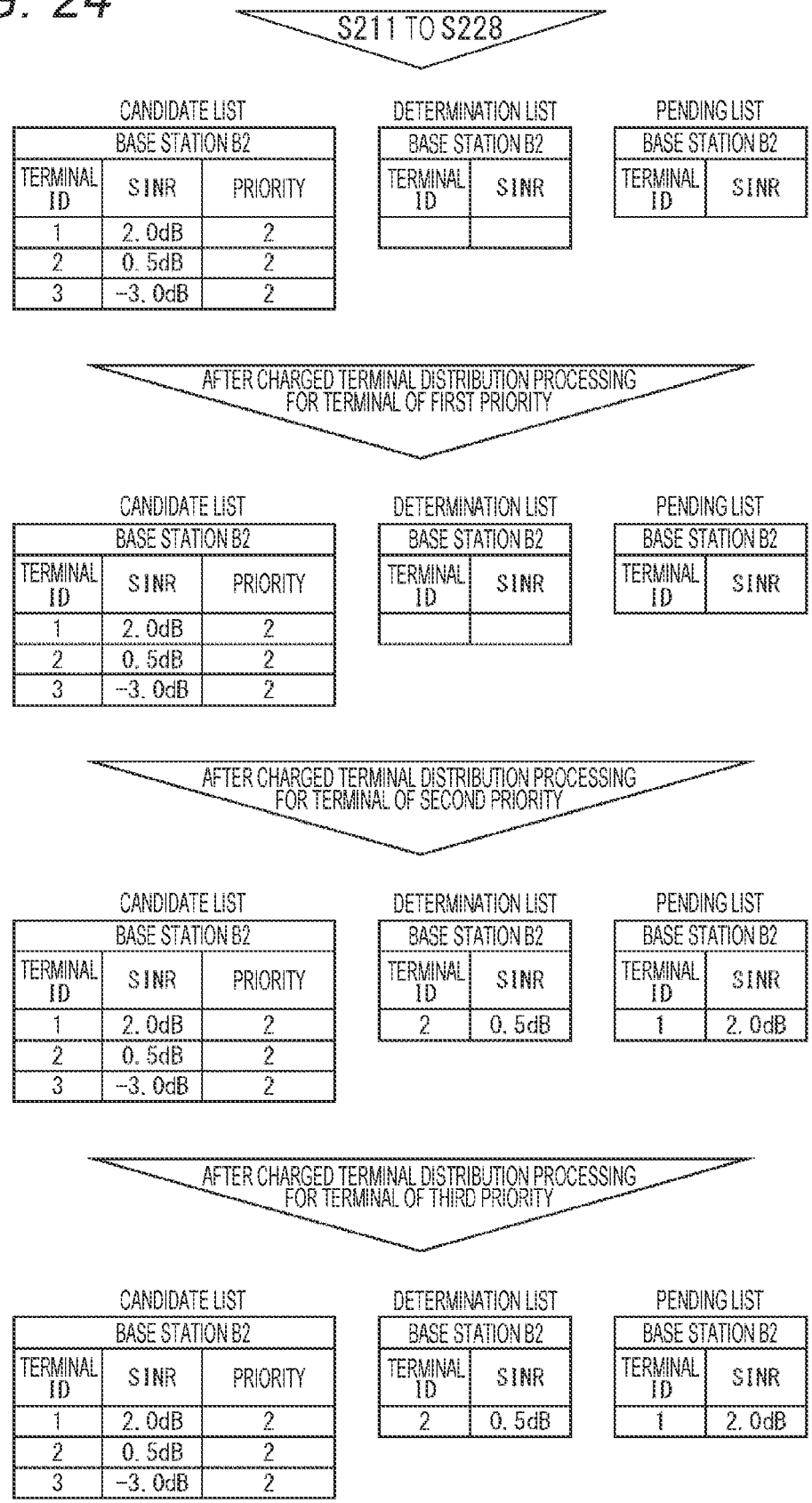
FIG. 24 is a diagram showing an example of a candidate list, a determination list, and a pending list used in the third charged terminal determination processing.
Figure 25:
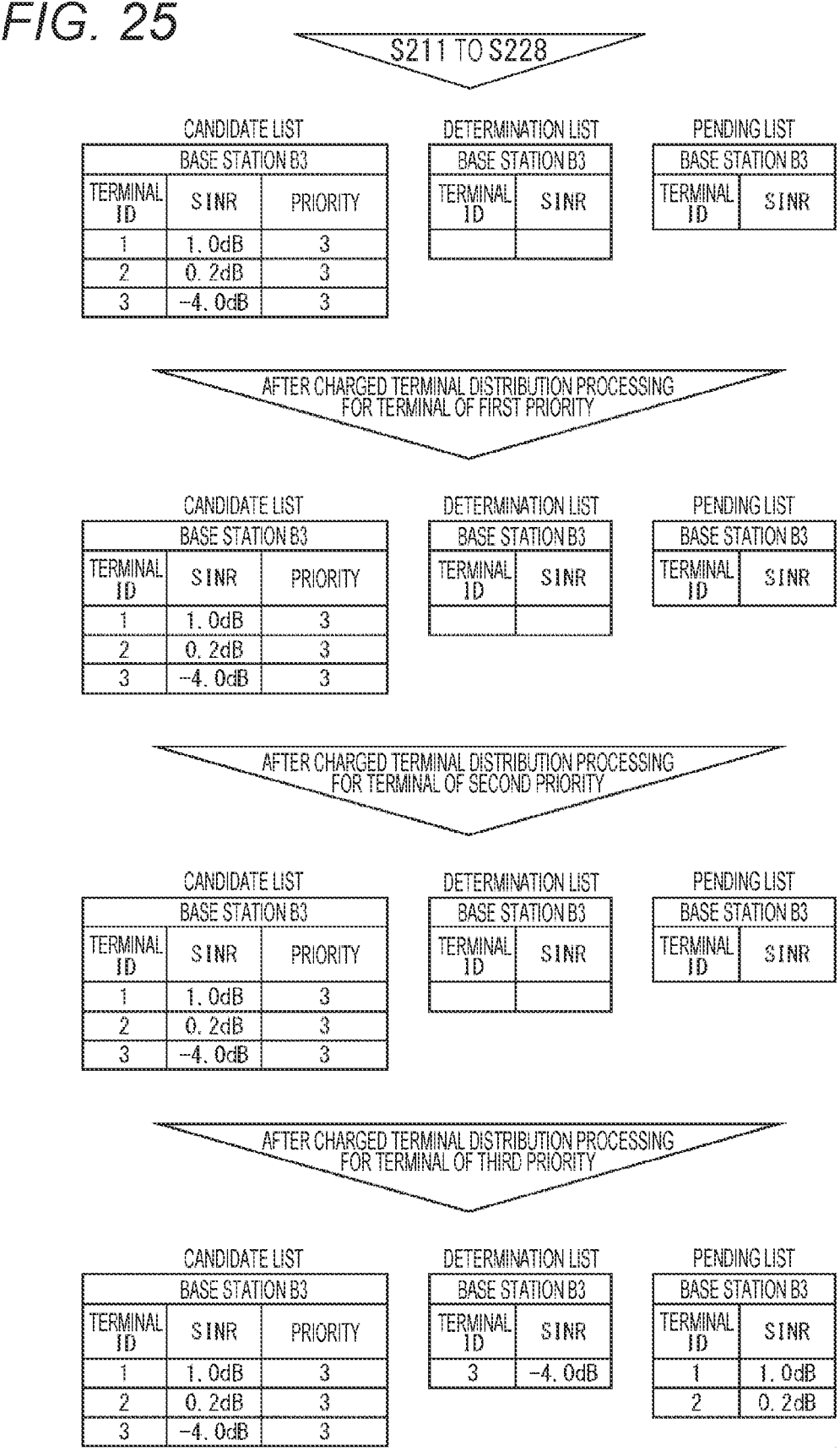
FIG. 25 is a diagram showing an example of a candidate list, a determination list, and a pending list used in the third charged terminal determination processing.

FIGS. 23, 24, and 25 are diagrams showing examples of a candidate list, a determination list, and a pending list used in the third charged terminal determination processing.

In FIGS. 23 to 25, three base stations B1, B2, and B3 exist as base stations B#j, and three terminals T1, T2, and T3 exist as terminals T#i.

FIG. 23 shows a candidate list, a determination list, and a pending list of the base station B1, FIG. 24 shows a candidate list, a determination list, and a pending list of the base station B2, and FIG. 25 shows a candidate list, a determination list, and a pending list of the base station B3.

Here, it is assumed that the numbers of possible terminals of the base stations B1 to B3 are all one.

Now, it is assumed that, by performing the processing of steps S211 to S228 (including step S241) of the third charged terminal determination processing, the candidate lists of the base stations B1 to B3 as shown in FIGS. 23 to 25 (the sorted candidate list of steps S225) are acquired.

Terminals T1 to T3 have been registered in the candidate lists of the base stations B1 to B3 of FIGS. 23 to 25.

Furthermore, in the candidate list of the base station B1, as the priority of the base station B1, the first priority is set for all of the terminals T1 to T3. In the candidate list of the base station B2, as the priority of the base station B2, the second priority is set for all of the terminals T1 to T3. In the candidate list of the base station B3, as the priority of the base station B3, the third priority is set for all of the terminals T1 to T3.

Therefore, the base stations B1 to B3 are likely to normally receive the connection request frames from the terminals T1 to T3 in that order.

Moreover, in the candidate list of the base stations B1 to B3 of FIGS. 23 to 25, the registration order of the terminals T1 to T3 is in the order of the terminals T1 to T3.

In this case, for example, in the first and second charged terminal determination processing, for the base station B1, the terminal T1 having the highest registration order in the candidate list of the base station B1 is determined as the charged terminal. As similar to this, for base station B2, the terminal T1 having the highest registration order in the candidate list of base station B2 is determined as the charged terminal, and for base station B3, the terminal T1 having the highest registration order in the candidate list of the base station B3 is determined as the charged terminal.

Therefore, in all of the base stations B1 to B3, the terminal T1 is the charged terminal, and the terminals T2 and T3 are not charged terminals of any of the base stations B1 to B3.

On the other hand, according to the third charged terminal determination processing, the processing of steps S242 to S258 as the charged terminal distribution processing is performed, so that the terminals T1 to T3 are charged terminals of the base stations B1 to B3, respectively, as shown in FIGS. 23 to 25.

That is, in the charged terminal distribution processing, first, processing is performed for the terminal whose priority idx of the base station is the first priority, that is, in FIGS. 23 to 25, the terminals T1 to T3 of which priority of the base station B1 in the candidate list of the base station B1 (FIG. 23) is the first priority.

In this case, among the terminals T1 to T3 of which priority idx of the base station B1 is the first priority, the terminal T1 having the highest registration order in the candidate list of the base station B1 has not been registered in the determination list of the base stations B2 and B3 (FIGS. 24 and 25) as the cooperating base stations, and is not a charged terminal of the base stations B2 and B3. Therefore, as shown in FIG. 23, the terminal T1 is registered in the determination list of the base station B1 as the charged terminal of the base station B1. Since the number of possible terminals of the base station B1 is one, the remaining terminals T2 and T3 registered in the candidate list of the base station B1 are not registered in the determination list of the base station B1.

Thereafter, in the charged terminal distribution processing, processing is performed for the terminal whose priority idx of the base station is the second priority, that is, in FIGS. 23 to 25, the terminals T1 to T3 of which priority of the base station B2 in the candidate list of the base station B2 (FIG. 24) is the second priority.

In this case, among the terminals T1 to T3 of which priority idx of the base station B2 is the second priority, the terminal T1 of the highest registration order in the candidate list of the base station B2 is registered in the determination list of the base station B1 (FIG. 23) as the cooperating base station, and is the charged terminal of the base station B1. Therefore, the terminal T1 is suspended from being registered in the determination list of the base station B2, and is registered in the pending list of the base station B2 as shown in FIG. 24.

Among the terminals T1 to T3 of which priority idx of the base station B2 is the second priority, the terminal T2 of the registration order subsequent to the terminal T1 in the candidate list of the base station B2 has not been registered in the determination lists of the base stations B1 and B3 (FIGS. 23 and 25) as the cooperating base stations, and is not a charged terminal of the base stations B1 and B3. Therefore, as shown in FIG. 24, the terminal T2 is registered in the determination list of the base station B2 as the charged terminal of the base station B2. Since the number of possible terminals of the base station B2 is one, the remaining terminal T3 registered in the candidate list of the base station B2 is not registered in the determination list of the base station B2.

Thereafter, in the charged terminal distribution processing, processing is performed for the terminal whose priority idx of the base station is the third priority, that is, in FIGS. 23 to 25, the terminals T1 to T3 of which priority of the base station B3 in the candidate list of the base station B3 (FIG. 25) is the third priority.

In this case, among the terminals T1 to T3 of which priority idx of the base station B3 is the third priority, the terminal T1 of the highest registration order in the candidate list of the base station B3 is registered in the determination list of the base station B1 (FIG. 23) as the cooperating base station, and is the charged terminal of the base station B1. Therefore, the terminal T1 is suspended from being registered in the determination list of the base station B3, and is registered in the pending list of the base station B3 as shown in FIG. 25.

Among the terminals T1 to T3 of which priority idx of the base station B3 is the third priority, the terminal T2 of the registration order subsequent to the terminal T1 in the candidate list of the base station B3 is registered in the determination list of the base station B2 (FIG. 24) as the cooperating base station, and is the charged terminal of the base station B2. Therefore, the terminal T2 is suspended from being registered in the determination list of the base station B3, and is registered in the pending list of the base station B3 as shown in FIG. 25.

Among the terminals T1 to T3 of which priority idx of the base station B3 is the third priority, the terminal T3 of the lowest registration order in the candidate list of the base station B3 has not been registered in the determination list of the base stations B1 and B2 (FIGS. 23 and 24) as the cooperating base stations, and is not a charged terminal of the base stations B1 and B2. Therefore, as shown in FIG. 25, the terminal T3 is registered in the determination list of the base station B3 as the charged terminal of the base station B3.

As described above, according to the third charged terminal determination processing, in the charged terminal distribution processing, even with the terminal T#i of the upper registration order in the candidate list of the base station B#j, if the terminal T#i is a charged terminal of another base station (cooperating base station) B#j', determination of the terminal T#i as the charged terminal of the base station B#j (registration in the determination list) is suspended, and the terminal T#i' of the lower registration order is preferentially determined as the charged terminal of the base station B#j.

Therefore, even if the number of terminals T#i of the same priority of the base station is biased toward a specific base station B#j, the charged terminals are distributed to each base station, and it is possible to suppress the occurrence of terminals that are not charged terminals of any of the base stations.

<Fourth Charged Terminal Determination Processing>

FIG. 26 is a diagram showing an example of a candidate list of the base station B#j used in fourth charged terminal determination processing.

Here, in the actual environment, the number of base stations that receive connection request frames is biased in some cases in one terminal T#i and another terminal T#i' by being affected by various influences such as the position of the terminal T#i, the arrangement of the base station B#j, the antenna height of the base station B#j, and shadowing. For example, in some cases, the connection request frame of one terminal T#i' is received by many base stations, and the connection request frame of another terminal T#i is received by only a small number of base stations such as one.

In this case, a high priority is set as the priority of the base stations for the terminals for which the number of base stations that have received the connection request frame is small. For example, for the terminal T#i for which the number of base stations that have received the connection request frame is one, the first priority is set as the priority of the base station B#j that has received the connection request frame.

However, the first priority which is the priority of the base station B#j with respect to the terminal T#i whose connection request frame has been received only by the base station B#j is also the lowest in the base stations that have received the connection request frame of the terminal T#i.

Then, the terminal T#i of which connection request frame has been received only by the base station B#j is not determined as the charged terminal of the base station B#j unless having the upper registration order in the candidate list of the base station B#j equal to or less than the number of possible terminals of the base station B#j, and would not be a charged terminal of any of the base stations.

Therefore, in the fourth charged terminal determination processing, lowest order terminal priority processing of, for the terminal T#i of which priority of the base station B#j is the lowest, raising the registration order of the base station B#j in the determination list, that is, raising the registration order of the base station B#j in the candidate list to preferentially determine the terminal T#i of the lowest priority of the base station B#j as the charged terminal of the base station B#j is performed.

According to the lowest order terminal priority processing, it is possible to prevent a terminal having a small number of base stations that have received the connection request frame from not becoming a charged terminal of any of the base stations.

FIG. 26 shows a candidate list of the base station B#j used in the fourth charged terminal determination processing in which the lowest order terminal priority processing is performed.

In the candidate list of the base station B#j in FIG. 26, in addition to the priority of base station B#j registered in the candidate list in FIG. 8 and the SINR, lower order information is registered as a registration order index.

The lower order information indicates whether or not there is other base station for which lower priority than the priority of the base station B#j is set (hereinafter, lower order base station), with respect to the terminal T#i for which the priority of the base station B#j has been set. If there is a lower order base station, the lower order information is set to true, and if there is no lower order base station, the lower order information is set to false.

Note that, in a case where there is no lower order base station, the priority of the base station B#j with respect to the terminal T#i is the lowest among the base stations that have received the connection request frame from the terminal T#i.

Figure 27:
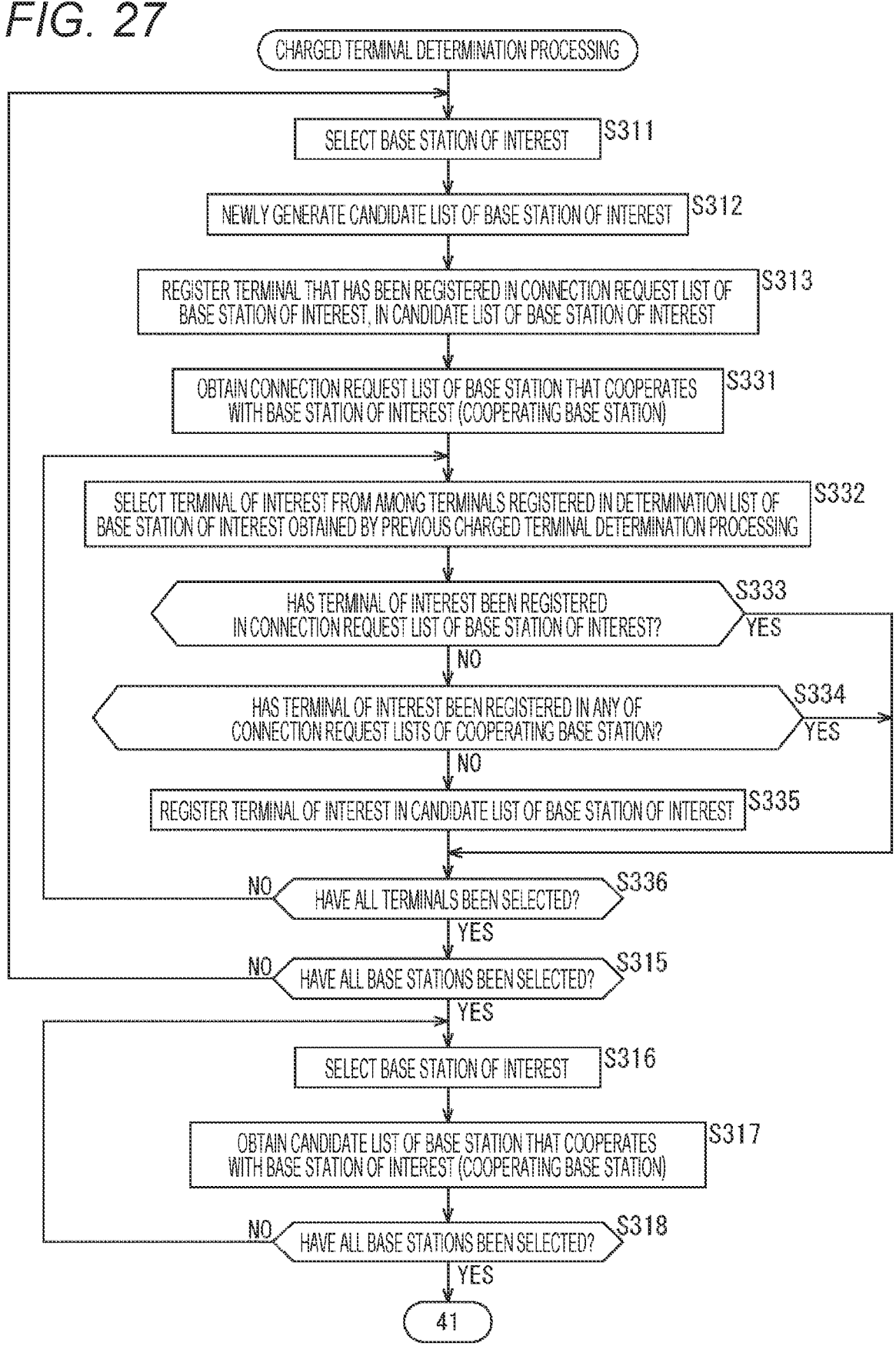
FIG. 27 is a flowchart for explaining fourth charged terminal determination processing.

FIG. 27 is a flowchart for explaining fourth charged terminal determination processing.

Figure 28:
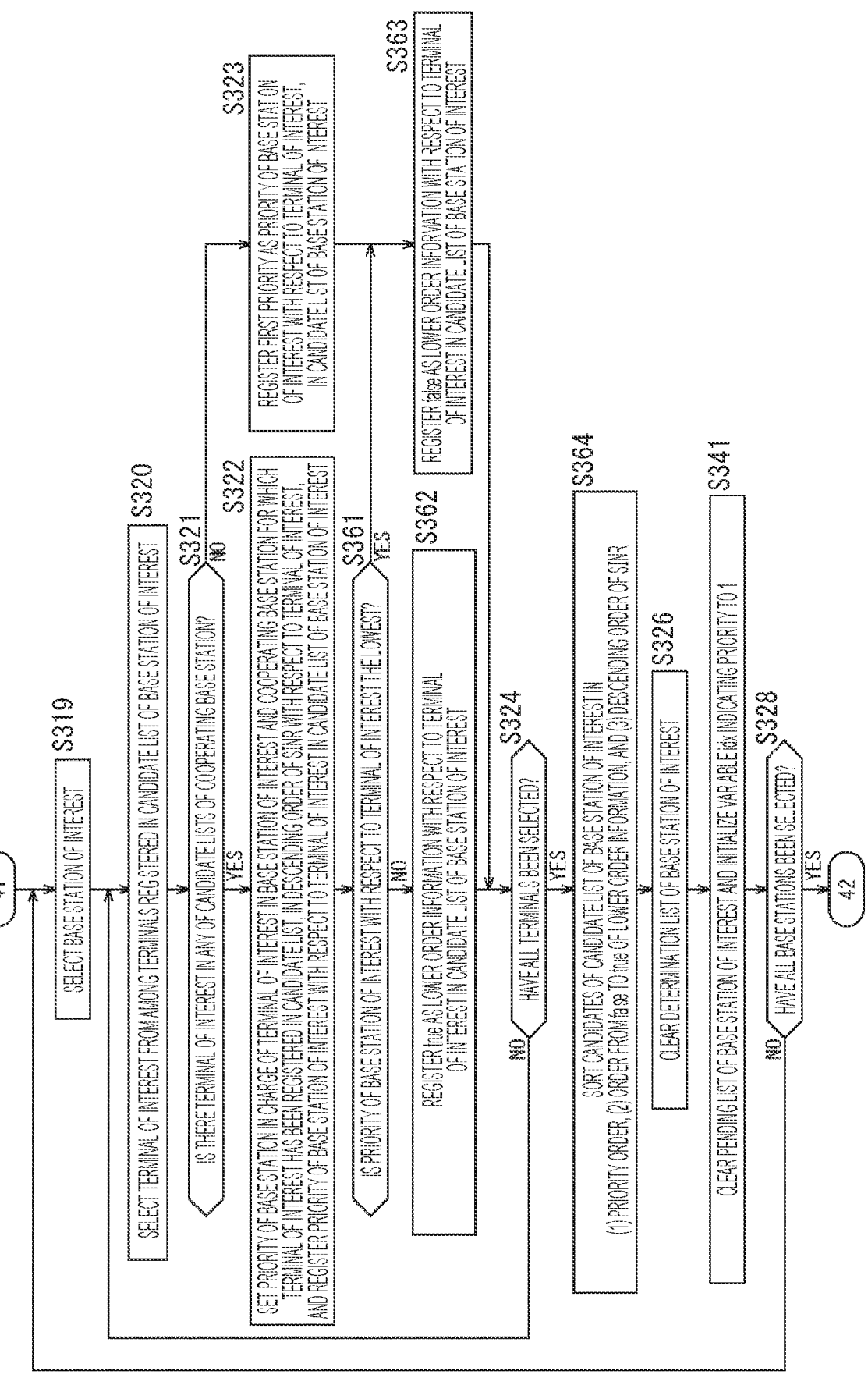
FIG. 28 is a flowchart for explaining fourth charged terminal determination processing.
Figure 29:
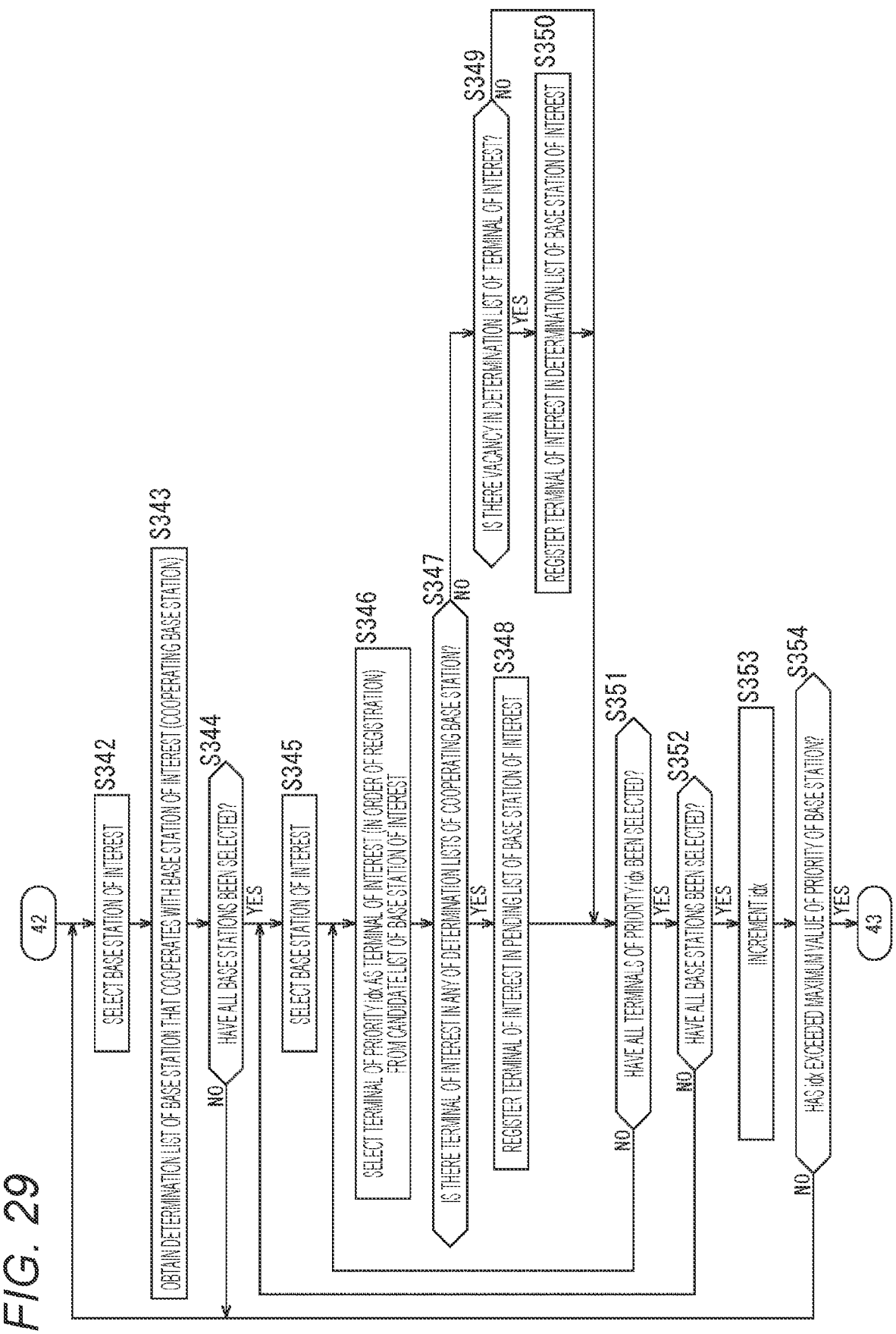
FIG. 29 is a flowchart for explaining fourth charged terminal determination processing.
Figure 30:
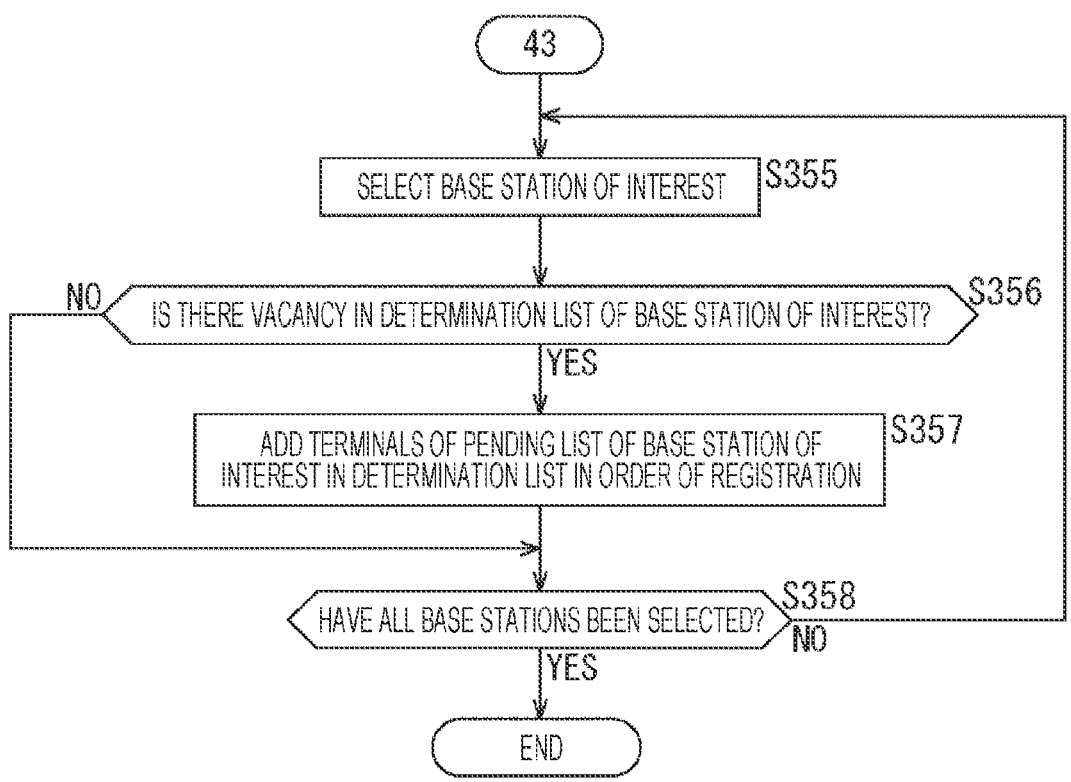
FIG. 30 is a flowchart for explaining fourth charged terminal determination processing.

FIG. 28 is a flowchart following FIG. 27. FIG. 29 is a flowchart following FIG. 28. FIG. 30 is a flowchart following FIG. 29.

In the fourth charged terminal determination processing, in addition to the third charged terminal determination processing, the lowest order terminal priority processing is performed.

In the fourth charged terminal determination processing, in steps S311 to S323 of FIGS. 27 and 28, the similar processing to that in steps S211 to S223 of the third charged terminal determination processing (FIGS. 19 and 20) is performed.

Then, steps S361 to S364 as the lowest order terminal priority processing are performed.

That is, in step S322 of FIG. 28, in a case where the priority of the base station of interest with respect to the terminal of interest is registered in the candidate list of the base station of interest, the process proceeds to step S361.

In step S361, the charged terminal determination unit 33 determines whether or not the priority of the base station of interest with respect to the terminal of interest is the lowest among the priorities of each base station set with respect to the terminal of interest.

In step S361, in a case where it is determined that the priority of the base station of interest with respect to the terminal of interest is not the lowest, that is, in a case where there is another base station (lower order base station) for which priority lower than the priority of the base station of interest is set (registered) in the candidate list with respect to the terminal of interest, the process proceeds to step S362.

In step S362, the charged terminal determination unit 33 registers (sets) true for the lower order information with respect to the terminal of interest in the candidate list of the base station of interest, and the process proceeds to step S324.

Furthermore, in step S361, in a case where it is determined that the priority of the base station of interest with respect to the terminal of interest is the lowest, that is, in a case where there is no lower order base station of the base station of interest, the process proceeds to step S363.

In step S363, the charged terminal determination unit 33 registers false for the lower order information with respect to the terminal of interest in the candidate list of the base station of interest, and the process proceeds to step S324.

On the other hand, in step S323 of FIG. 28, in a case where the first priority as the priority of the base station of interest with respect to the terminal of interest is registered in the candidate list of the base station of interest, the process proceeds to step S363.

In step S363, as described above, false is registered for the lower order information with respect to the terminal of interest in the candidate list of the base station of interest, and the process proceeds to step S324.

In step S324, as similar to the step S224 of FIG. 20, whether or not all the terminals registered in the candidate list of the base station of interest have been selected as the terminals of interest is determined, and in a case where all the terminals are not selected as the terminals of interest, the process returns to step S320.

Furthermore, in step S324, in a case where it is determined that all the terminals registered in the candidate list of the base station of interest are selected as the terminals of interest, selection of all the terminals registered in the candidate list of the base station of interest as the terminals of interest is reset, and the process proceeds to step S364.

In step S364, the charged terminal determination unit 33 sorts the terminals registered in the candidate list (FIG. 26) of the base station of interest in the order of the priority of the base station, the lower order information, and the SINR according to the priority of the base station, the lower order information, and the SINR as the registration order index, and process proceeds to step S326.

That is, the charged terminal determination unit 33 sorts the terminals registered in the candidate list of the base station of interest in (descending) order of priority of the base station. Moreover, the charged terminal determination unit 33 sorts the terminals having the same base station priority among the terminals registered in the candidate list sorted in the order of the priority of the base station, in the order of the lower order information from false to true. Then, the charged terminal determination unit 33 sorts, in (descending) order of the SINR, the terminals having the same priority of the base station and the same lower order information among the terminals registered in the candidate list sorted in the order of the priority of the base station and sorted in lower order information.

In steps S326, S341, and S328, the similar processing to that in steps S226, S241, and S228 of FIG. 20 of the third charged terminal determination processing is performed, and the process proceeds to step S342 of FIG. 29.

In step S342 of FIG. 29 to step S358 of FIG. 30, the similar processing to that of step S242 of FIG. 21 to step S258 of FIG. 22 of the third charged terminal determination processing is performed, and the fourth charged terminal determination processing ends.

Figure 31:
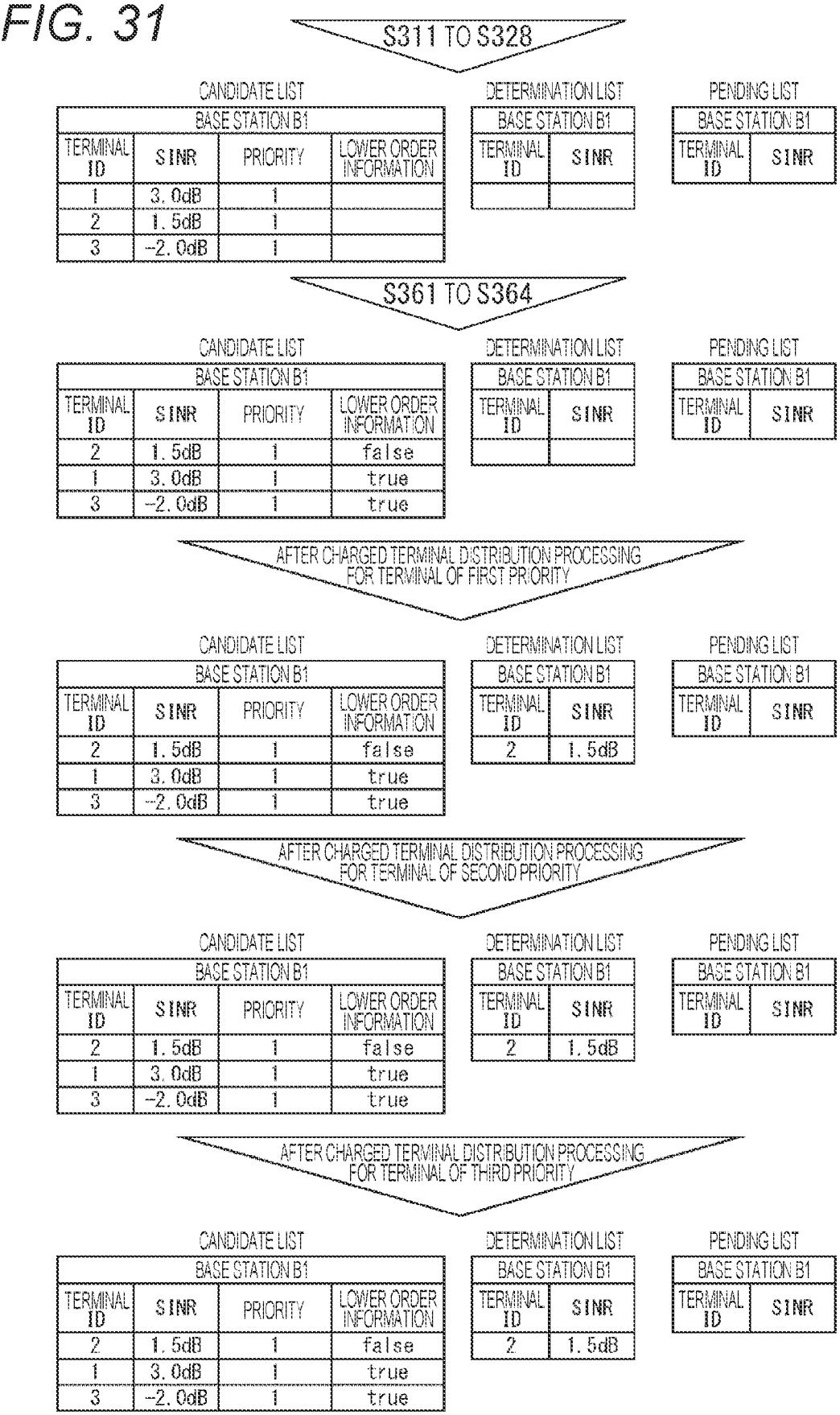
FIG. 31 is a diagram showing an example of a candidate list, a determination list, and a pending list used in the fourth charged terminal determination processing.
Figure 32:
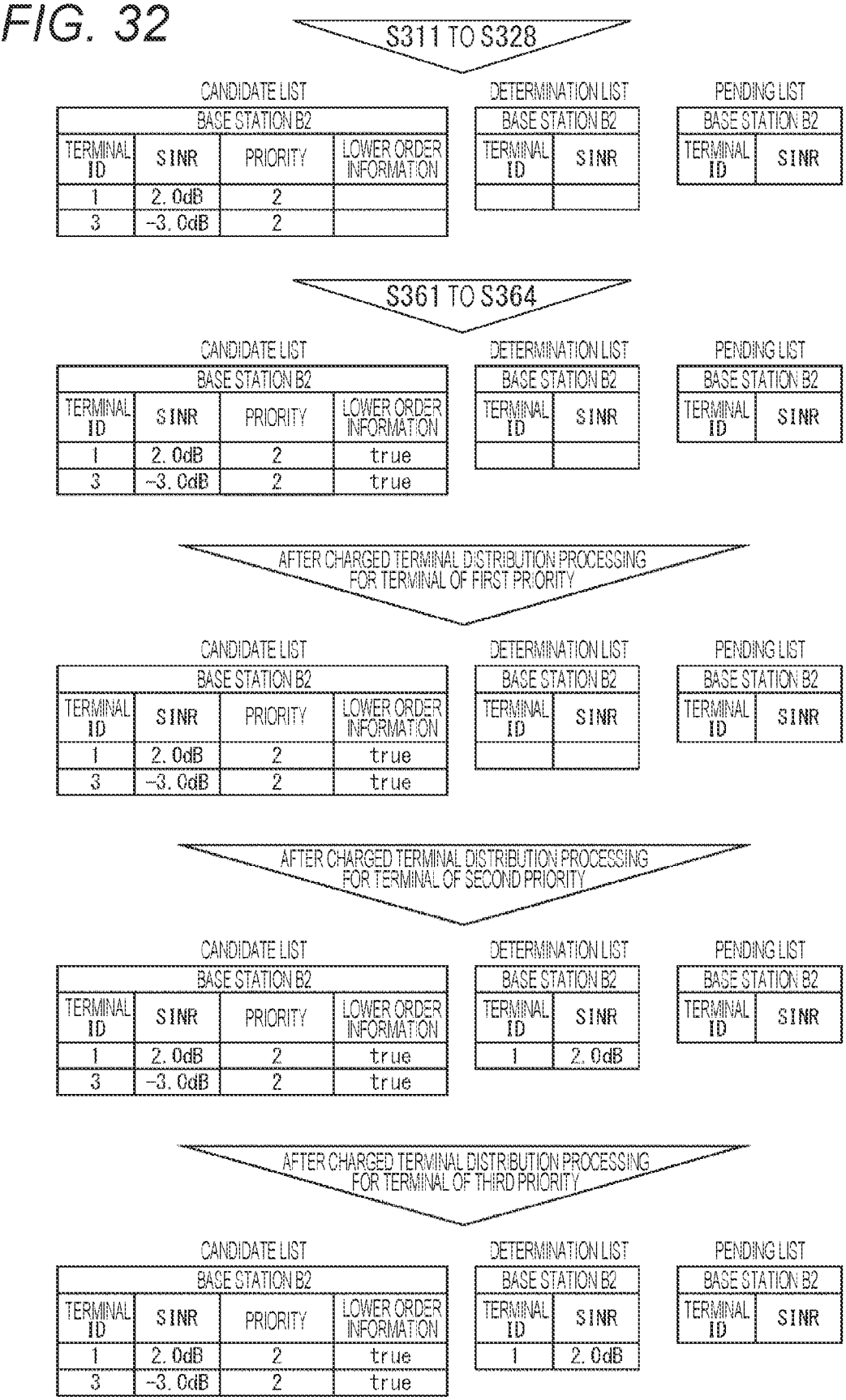
FIG. 32 is a diagram showing an example of a candidate list, a determination list, and a pending list used in the fourth charged terminal determination processing.
Figure 33:
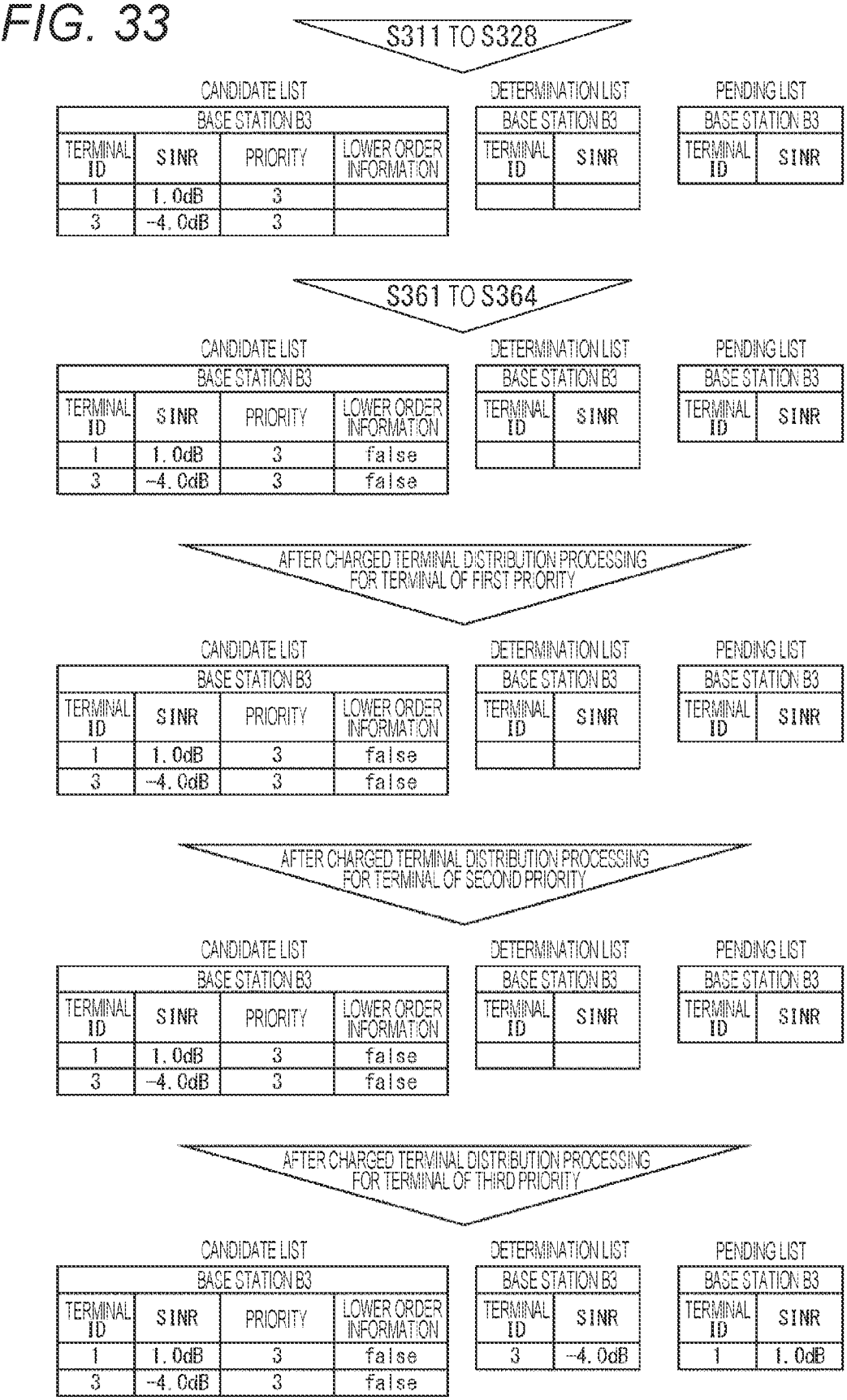
FIG. 33 is a diagram showing an example of a candidate list, a determination list, and a pending list used in the fourth charged terminal determination processing.

FIGS. 31, 32, and 33 are diagrams showing examples of a candidate list, a determination list, and a pending list used in the fourth charged terminal determination processing.

In FIGS. 31 to 33, three base stations B1, B2, and B3 exist as base stations B#j, and three terminals T1, T2, and T3 exist as terminals T#i.

FIG. 31 shows a candidate list, a determination list, and a pending list of the base station B1, FIG. 32 shows a candidate list, a determination list, and a pending list of the base station B2, and FIG. 33 shows a candidate list, a determination list, and a pending list of the base station B3.

Here, it is assumed that the numbers of possible terminals of the base stations B1 to B3 are all one.

Now, it is assumed that, by performing the processing of steps S311 to S328 of the fourth charged terminal determination processing (FIGS. 27 to 30) and the processing of steps S361 to S364 as the lowest order terminal priority processing, the candidate lists of the base stations B1 to B3 as shown in FIGS. 31 to 33 (the sorted candidate list of steps S364) are acquired.

In FIGS. 31 to 33, the connection request frames of the terminals T1 and T3 are received by all of the base stations B1 to B3, and the connection request frame of the terminal T2 is received only by the base station B1 among the base stations B1 to B3. Therefore, all terminals T1 to T3 have registered in the candidate list of the base station B1 (FIG. 31). Furthermore, in the candidate lists of the base stations B2 and B3 (FIGS. 32 and 33), the terminals T1 and T3 among the terminals T1 to T3 have been registered, and terminal T2 has not registered.

Furthermore, in the candidate list of the base station B1, as the priority of the base station B1 (FIG. 31), the first priority is set for all of the terminals T1 to T3. In the candidate list of the base station B2 (FIG. 32), as the priority of the base station B2, the second priority is set for all of the terminals T1 and T3. In the candidate list of the base station B3 (FIG. 33), as the priority of the base station B3, the third priority is set for all of the terminals T1 and T3.

Moreover, in the candidate list of the base station B1 (after being sorted in step S364) of FIG. 31, the registration order of the terminals T1 to T3 is in the order of the terminals T2, T1, and T3. In both of the candidate lists of the base stations B2 and B3 of FIGS. 32 and 33, the registration order of the terminals T1 and T3 is in the order of the terminals T1 and T3.

Here, in the candidate list of the base station B1 in FIG. 31, the SINR for the terminals T1 to T3 is 3.0 dB, 1.5 dB, and −2.0 dB. Therefore, in the third charged terminal determination processing in which the lowest order terminal priority processing is not performed, the registration order of the candidate list of the base station B1 is the order of the terminals T1, T2, and T3 which is descending order of the SINR. In this case, only the terminal T1 of the highest registration order in the candidate list of the base station B1 is determined as the charged terminal of the base station B1.

Then, since the terminal T2 has not been registered in the candidate list of the base stations B2 and B3, the terminal T2 is not a charged terminal of any of the base stations B1 to B3.

On the other hand, according to the fourth charged terminal determination processing, the processing of steps S361 to S364 as the lowest order terminal priority processing is performed, so that the terminals T1, T2, and T3 become charged terminals T1, T2, and T3 of the base stations B2, B1, and B3, respectively, as shown in FIGS. 31 to 33.

According to the lowest order terminal priority processing, the candidate lists of the base stations B1 to B3 are sorted according to the priority of the base station, the SINR, and the lower order information, so that the registration order of the terminals T1 to T3 of the candidate lists of the base stations B1 to B3 is as described above.

That is, in the candidate list of the base station B1, the registration order of the terminals T1 to T3 is in the order of the terminals T2, T1, and T3, and in both of the candidate lists of the base stations B2 and B3, the registration order of the terminals T1 and T3 is in the order of the terminals T1 and T3.

Here, in the candidate list of the base station B1 (FIG. 31), the priority of the base station B1 with respect to the terminals T1 to T3 is the first priority. For the terminals T1 and T3 of which the priority of the base station B1 registered in the candidate list of the base station B1 is the first priority, the priority of the base station B2 is the second priority (FIG. 32), and the priority of the base station B3 is the third priority (FIG. 33), so that there are base stations B2 and B3 as lower order base stations.

Therefore, the lower order information is true for the terminals T1 and T3 of which the priority of the base station B1 registered in the candidate list of the base station B1 is the first priority.

Furthermore, the terminal T2 of the first priority of the base station B1 registered in the candidate list of the base station B1 has not been registered in the candidate list of the base stations B2 and B3, and there is no lower order base station.

Therefore, the lower order information is false for the terminal T2 of which the priority of the base station B1 registered in the candidate list of the base station B1 is the first priority.

As described above, for the terminals T1 to T3 registered in the candidate list of the base station B1, the SINR is higher in the order of the terminals T1, T2, and T3, and the lower order information of the terminals T1 and T3 becomes true, and the lower order information of the terminal T2 is false. Therefore, in the candidate list of the base station B1 after being sorted in step S364 of the lowest order terminal priority processing, the registration order of the terminals T1 to T3 is in the order of the terminals T2, T1, and T3.

As a result, in the charged terminal distribution processing for a terminal of which priority of the base station idx is the first priority (steps S342 to S358 of the fourth charged terminal determination processing (FIGS. 27 to 30) corresponding to steps S242 to S258 of the third charged terminal determination processing (FIGS. 19 to 22)), the terminal T2 of the highest registration order in the candidate list of the base station B1 is determined as the charged terminal of the base station B1.

In the candidate list of the base station B2 (FIG. 32), the priorities of the base station B1 with respect to the terminals T1 and T3 are the second priority. For the terminals T1 and T3 of which the priority of the base station B2 registered in the candidate list of the base station B2 is the second priority, the priority of the base station B3 is the third priority (FIG. 33), so that there are base stations B2 and B3 as lower order base stations.

Therefore, the lower order information is true for the terminals T1 and T3 of which the priority of the base station B1 registered in the candidate list of the base station B2 is the second priority.

In the candidate list of the base station B3 (FIG. 33), the priorities of the base station B1 with respect to the terminals T1 and T3 are the third priority. The lower order information is false for the terminals T1 and T3 of which the priority of the base station B3 registered in the candidate list of the base station B3 is the third priority, since there is no base station of which priority is low.

Then, the terminals T1 and T3 registered in the candidate lists of the base stations B2 and B3 are sorted according to the priority of the base station, the lower order information, and the SINR, so that the registration order of the terminals T1 and T3 is the order of the terminals T1 and T3.

In this case, the terminal T1 having the highest registration order in the candidate list of the base station B2 (FIG. 32) has not been registered in the determination lists of the base stations B1 and B3 (FIGS. 31 and 33) as the cooperating base stations, and is not a charged terminal of the base stations B1 and B3. Therefore, in the charged terminal distribution processing (steps S342 to S358) for the terminal of the second priority idx of the base station, the terminal T2 is registered in the determination list of the base station B2 as the charged terminal of the base station B2, as shown in FIG. 32. Since the number of possible terminals of the base station B2 is one, the remaining terminal T3 registered in the candidate list of the base station B2 is not registered in the determination list of the base station B2.

The terminal T1 of the highest registration order in the candidate list of the base station B3 (FIG. 33) has been registered in the determination list of the base station B2 (FIG. 32) as the cooperating base station, and is a charged terminal of the base station B2. Therefore, in the charged terminal distribution processing (steps S342 to S358) for the terminal of the third priority idx of the base station, the terminal T1 is suspended from being registered in the determination list of the base station B3, and is registered in the pending list of the base station B2, as shown in FIG. 33.

The terminal T3 of the lowest registration order in the candidate list of the base station B3 has not been registered in the determination lists of the base stations B1 and B2 (FIGS. 31 and 32) as the cooperating base stations, and is not a charged terminal of the base stations B1 and B2. Therefore, in the charged terminal distribution processing (steps S342 to S358) for the terminal of the third priority idx of the base station, the terminal T3 is registered in the determination list of the base station B3 as the charged terminal of the base station B3, as shown in FIG. 33.

As described above, according to the fourth charged terminal determination processing, in the lowest order terminal priority processing, the registration order of the candidate list of the base station B#j for the terminal T#i of the lowest priority of the base station B#j is raised, and the terminal T#i of the lowest priority of the base station B#j is preferentially determined as the charged terminal of the base station B#j.

Therefore, in a case where the number of base stations that receive the connection request frame is biased depending on the terminals, the charged terminals are distributed to each base station, and it is possible to prevent the occurrence of terminals that are not charged terminals of any of the base stations.

<Fifth Charged Terminal Determination Processing>

FIG. 34 is a diagram showing an example of a candidate list of the base station B#j used in fifth charged terminal determination processing.

Here, in the lowest order terminal priority processing of the fourth charged terminal determination processing, the registration order of the terminal T#i in the candidate list of the base station B#j is manipulated by binary determination as to whether or not the priority of the base station B#j with respect to the terminal T#i is the lowest. The registration order of the terminal T#i in the candidate list of the base station B#j can be manipulated according to the tendency of the terminal T#i to become the charged terminal in another base station as a lower order base station for which priority lower than the priority of the base station B#j is set with respect to the terminal T#i, for example.

For example, for the registration order of the terminal T#i in the candidate list of the base station B#j, according to the tendency of the terminal T#i to become the charged terminal of the lower order base station, in a case where the terminal T#i is hard to become the charged terminal of the lower order base station of the terminal T#i, the registration order of the terminal T#i in the candidate list of the base station B#j is raised, and therefore, the terminal T#i that is hard to become the charged terminal of the lower order base station can be preferentially determined as the charged terminal of the base station B#j.

Specifically, from the number of terminals that the lower order base station can be in charge of (hereinafter, also referred to as the number of remaining terminals), that is, the vacancy of the determination list of the lower order base station and the registration order of the terminal T#i in the candidate list of the lower order base station, the tendency of the terminal T#i to become the charged terminal of the lower order base station is predicted, and the registration order of the terminal T#i in the candidate list of base station B#j can be manipulated so that as the terminal T#i is less likely to become the charged terminal of the lower order base station, the registration order of the terminal T#i in the candidate list of the base station B#j is raised.

Here, the tendency of the terminal T#i to become the charged terminal of the lower order base station can also be said as the tendency of the terminal T#i to be registered in the determination list of the lower order base station. Therefore, the processing of, according to the tendency of the terminal T#i to become the charged terminal of the lower order base station, in a case where the terminal T#i is hard to become the charged terminal of the lower order base station of the terminal T#i, raising the registration order of the terminal T#i in the candidate list of the base station B#j, and preferentially determining the terminal T#i that is hard to become the charged terminal of the lower order base station as the charged terminal of the base station B#j is also referred to as registrability priority processing.

FIG. 34 shows a candidate list of the base station B#j used in the fifth charged terminal determination processing in which the registrability priority processing is performed.

In the candidate list of the base station B#j in FIG. 34, in addition to the priority of the base station B#j, the SINR, and the lower order information registered in the candidate list of FIG. 26, registrability information is registered as a registration order index.

The registrability information indicates the tendency of the terminal T#i to become the charged terminal of the lower order base station in the lower order base station, that is, the tendency of the terminal T#i to be registered in the determination list of the lower order base station. In a case where the terminal T#i is easy to be registered in the determination list of the lower order base station, the registrability information is set to true, and in a case where the terminal T#i is hard to be registered in the determination list of the lower order base station, the registrability information is set to false.

Note that, here, for the sake of simplicity, as the registrability information, two values that are, true, which indicates that the terminal T#i is easy to be registered in the determination list of the lower order base station, and false, which indicates that the terminal T#i is hard to be registered in the determination list of the lower order base station, are adopted. However, as the registrability information, three values more than two values of true and false, which indicate the tendency of the terminal T#i to be registered in the determination list of the lower order base station can be adopted.

Figure 35:
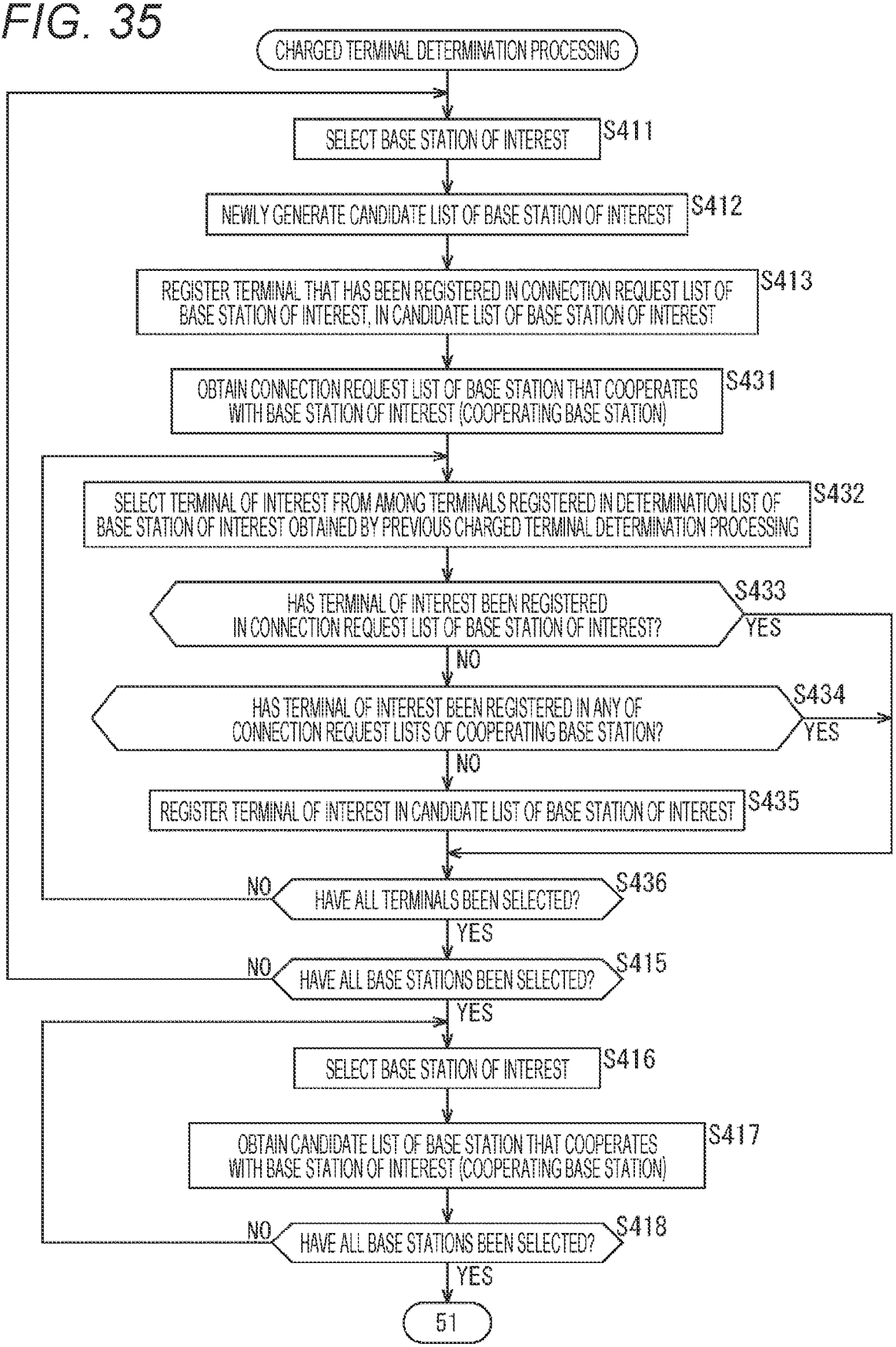
FIG. 35 is a flowchart for explaining fifth charged terminal determination processing.

FIG. 35 is a flowchart for explaining fifth charged terminal determination processing.

Figure 36:
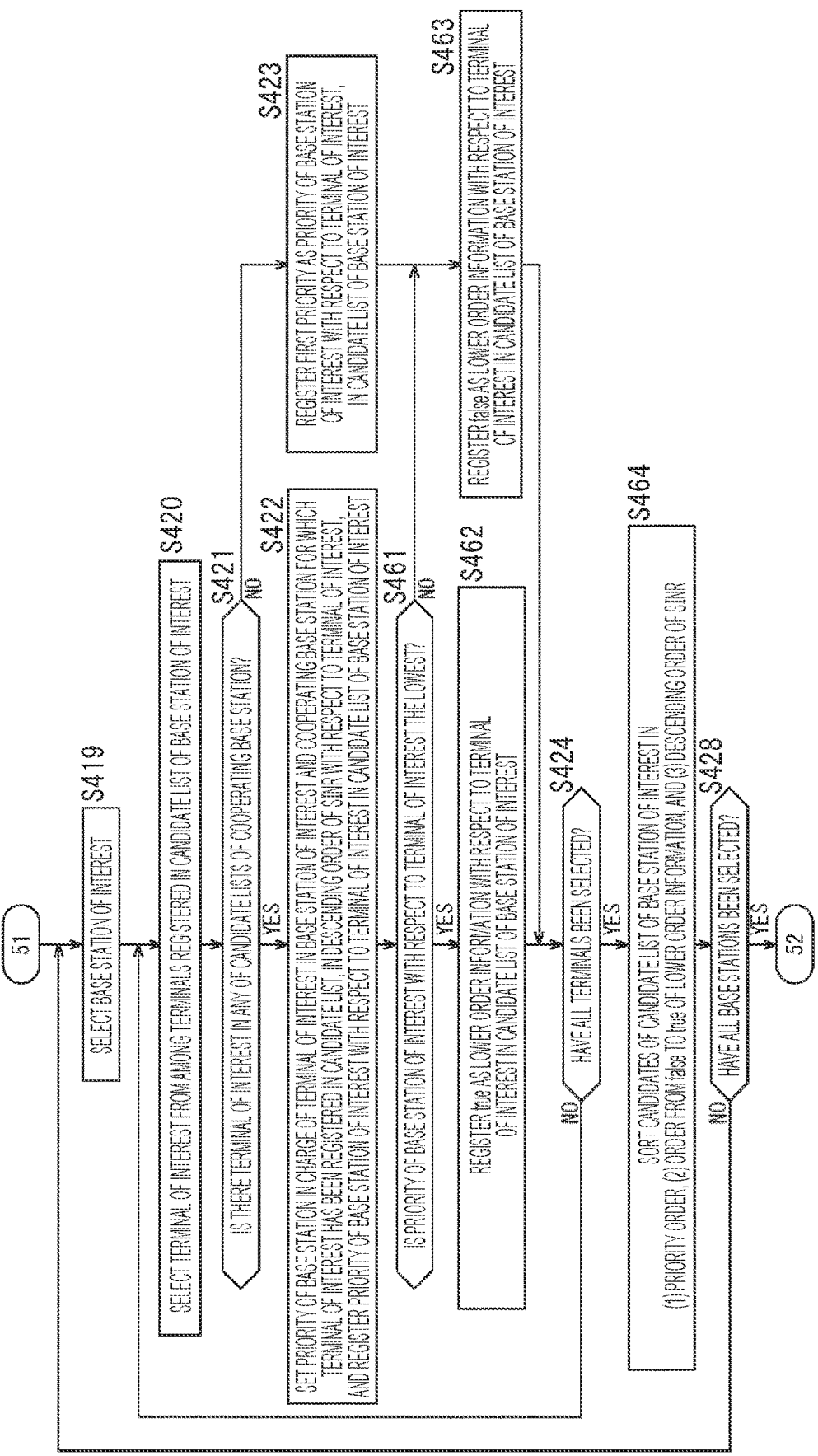
FIG. 36 is a flowchart for explaining fifth charged terminal determination processing.
Figure 37:
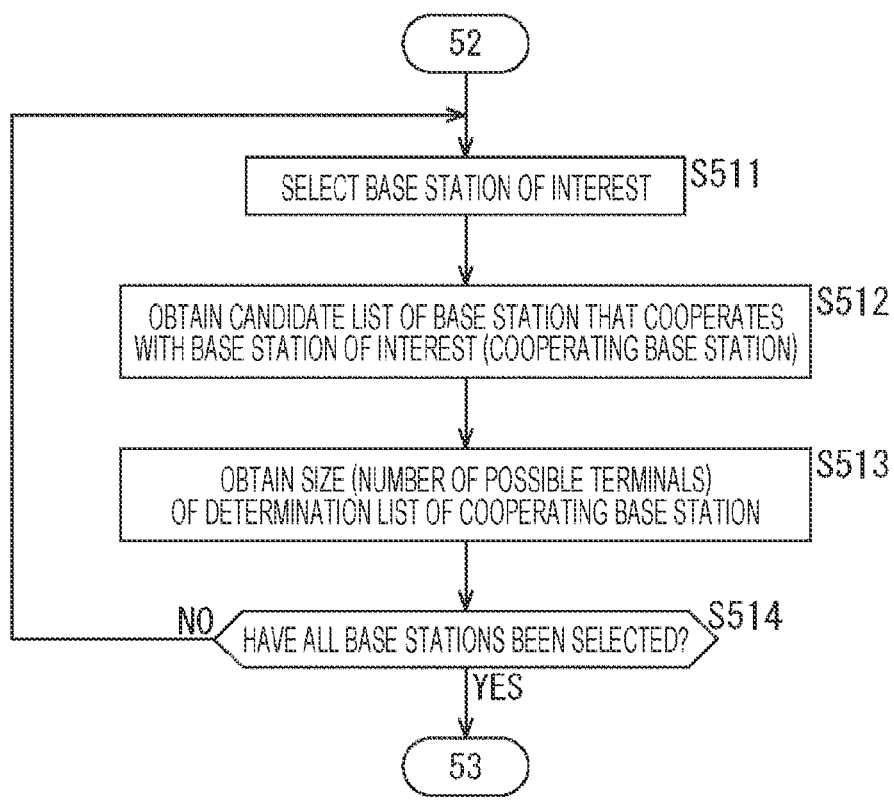
FIG. 37 is a flowchart for explaining fifth charged terminal determination processing.
Figure 38:
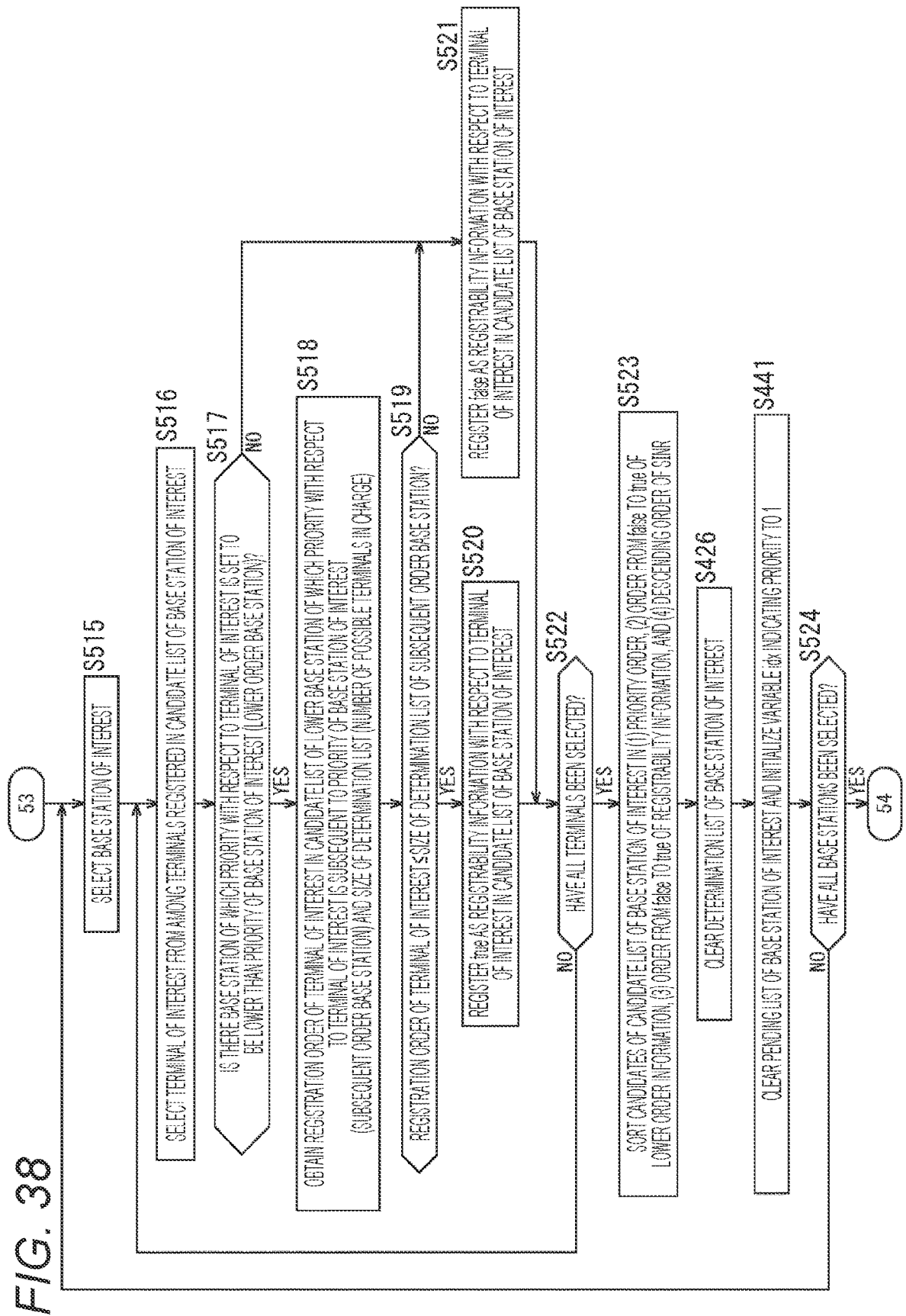
FIG. 38 is a flowchart for explaining fifth charged terminal determination processing.
Figure 39:
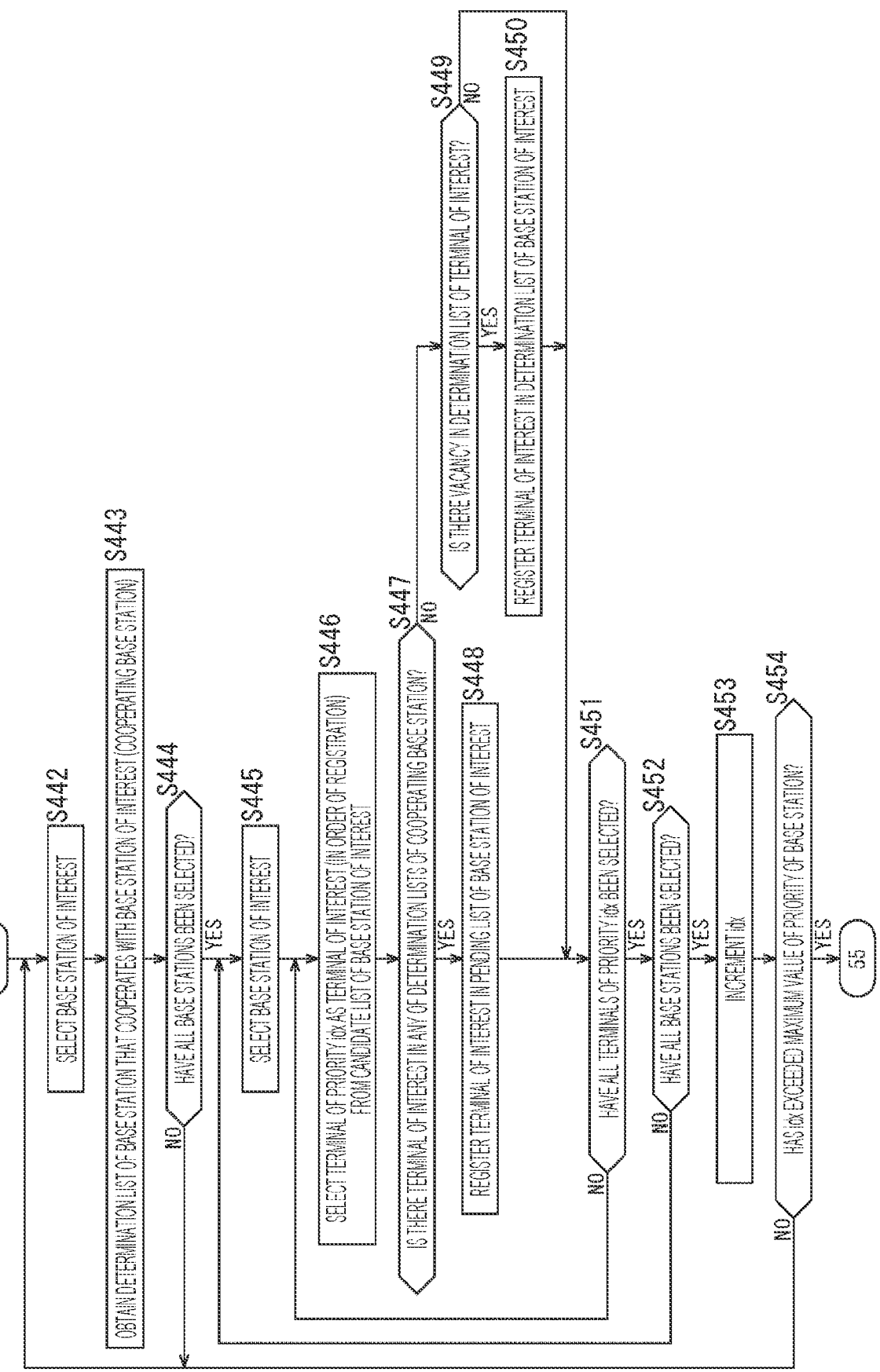
FIG. 39 is a flowchart for explaining fifth charged terminal determination processing.
Figure 40:
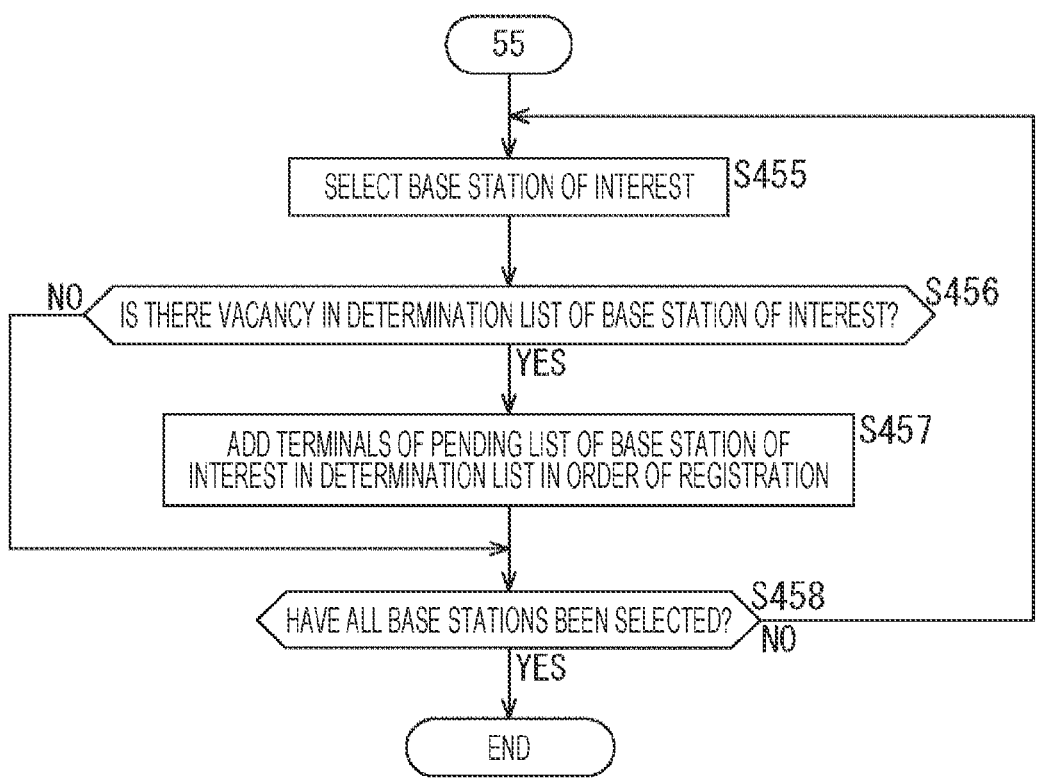
FIG. 40 is a flowchart for explaining fifth charged terminal determination processing.

FIG. 36 is a flowchart following FIG. 35. FIG. 37 is a flowchart following FIG. 36. FIG. 38 is a flowchart following FIG. 37. FIG. 39 is a flowchart following FIG. 38. FIG. 40 is a flowchart following FIG. 39.

In the fifth charged terminal determination processing, in addition to the fourth charged terminal determination processing, the registrability priority processing is performed.

In the fifth charged terminal determination processing, in steps S411 to S428 and steps S461 to S464 of FIGS. 35 and 36, the similar processing to that in steps S311 to S328 and steps S361 to S364 of the fourth charged terminal determination processing (FIGS. 27 and 28) is performed.

Note that, in the fifth charged terminal determination processing, the processes of steps S426 and S441 (FIG. 38) corresponding to steps S326 and S341 of the fourth charged terminal determination processing (FIG. 28) are performed in steps S511 to S524 as the registrability priority processing as described later.

Thereafter, steps S511 to S524 as the registrability priority processing are performed.

That is, in step S511 of FIG. 37, the charged terminal determination unit 33 selects one base station that has not been selected as the base station of interest from the base stations included in the wireless communication system as the base station of interest, and the process proceeds to step S512.

In step S512, the charged terminal determination unit 33 acquires a candidate list of the cooperating base station that cooperates with the base station of interest, and the process proceeds to step S513.

In step S513, the charged terminal determination unit 33 acquires the size of the determination list of the cooperating base station, that is, the number of possible terminals (the number of terminals that can be the charged terminals), and the process proceeds to step S514.

In step S514, the charged terminal determination unit 33 determines whether or not all the base stations included in the wireless communication system have been selected as the base stations of interest, and in a case where it is determined that all base stations are not selected as the base stations of interest, the process returns to step S511. In step S511, the base station of interest is newly selected, and the similar processing is repeated thereafter.

Furthermore, in step S514, in a case where it is determined that all the base stations included in the wireless communication system have been selected as the base stations of interest, selection of all the base stations included in the wireless communication system as the base stations of interest is reset, and the process proceeds to step S515 of FIG. 38.

In step S515, the charged terminal determination unit 33 selects one base station that has not been selected as the base station of interest from the base stations included in the wireless communication system as the base station of interest, and the process proceeds to step S516.

In step S516, the charged terminal determination unit 33 selects, for example, one terminal having the highest registration order that is not selected as the terminal of interest from the terminals registered in the candidate list of the base station of interest as the terminal of interest, and the process proceeds to step S517.

In step S517, the charged terminal determination unit 33 determines whether or not there is a lower order base station with respect to the terminal of interest in the cooperating base stations, that is, whether or not there is another base station for which priority lower than the priority of the base station of interest with respect to the terminal of interest.

In a case where it is determined in step S517 that there is a lower order base station with respect to the terminal of interest, the process proceeds to step S518.

In step S518, the charged terminal determination unit 33 acquires the registration order of the terminal of interest in the candidate list of the lower order base station (hereinafter, also referred to as subsequent base station) of which priority of base station with respect to the terminal of interest is subsequent to the base station of interest, among lower order base stations, and the size (number of possible terminals) of the determination list of the subsequent base station, and the process proceeds to step S519.

In step S519, the charged terminal determination unit 33 determines whether or not the registration order of the terminals of interest in the candidate list of the subsequent base station is equal to or less than the size (number of possible terminals) of the determination list of the subsequent base station.

In step S519, in a case where it is determined that the registration order of the terminal of interest of the candidate list of the subsequent base station is equal to or less than the size of the determination list of the subsequent base station, that is, if the terminals registered in the candidate list are registered in the determination list in the registration order in the subsequent base station, in a case where the terminal of interest is registered in the determination list, the process proceeds to step S520.

In step S520, the terminal of interest is easy to be registered in the determination list of the subsequent base station, so that the charged terminal determination unit 33 registers (sets) true in the registrability information with respect to the terminal of interest in the candidate list of the base station of interest, and the process proceeds to step S522.

Furthermore, in step S519, in a case where it is determined that the registration order of the terminal of interest of the candidate list of the subsequent base station is not equal to or less than the size of the determination list of the subsequent base station, that is, if the terminals registered in the candidate list are registered in the determination list in the registration order in the subsequent base station, in a case where the terminal of interest is not registered in the determination list, the process proceeds to step S521.

In step S521, the terminal of interest is hard to be registered in the determination list of the subsequent base station, so that the charged terminal determination unit 33 registers false in the registrability information with respect to the terminal of interest in the candidate list of the base station of interest, and the process proceeds to step S522.

On the other hand, in a case where it is determined in step S517 that there is no lower order base station with respect to the terminal of interest, the process proceeds to step S521.

In step S521, as described above, false is registered for the registrability information with respect to the terminal of interest in the candidate list of the base station of interest, and the process proceeds to step S522.

In step S522, the charged terminal determination unit 33 determines whether or not all the terminals registered in the candidate list of the base station of interest have been selected as the terminals of interest, and in a case where all the terminals are not selected as the terminals of interest, the process returns to step S516. In step S516, the terminal of interest is newly selected, and the similar processing is repeated thereafter.

Furthermore, in step S522, in a case where it is determined that all the terminals registered in the candidate list of the base station of interest are selected as the terminals of interest, selection of all the terminals registered in the candidate list of the base station of interest as the terminals of interest is reset, and the process proceeds to step S523.

In step S523, the charged terminal determination unit 33 sorts the terminals registered in the candidate list (FIG. 34) of the base station of interest in the order of the priority of the base station, the lower order information, the registrability information, and the SINR according to the priority of the base station, the lower order information, the registrability information, and the SINR as the registration order index.

That is, the charged terminal determination unit 33 sorts the terminals registered in the candidate list of the base station of interest in the order of priority of the base stations. Moreover, the charged terminal determination unit 33 sorts the terminals having the same base station priority among the terminals registered in the candidate list sorted in the order of the priority of the base station, in the order of the lower order information from false to true. Then, the charged terminal determination unit 33 sorts the terminals having the same priority of the base station and the same lower order information among the terminals registered in the candidate list after being sorted in the order of the lower order information, in the order of the registrability information from false to true. Moreover, the charged terminal determination unit 33 sorts the terminals having the same priority of the base station, lower order information, and registrability information among the terminals registered in the candidate list after being sorted in the order of the registrability information in (descending) order of the SINR.

After step S523, the process proceeds sequentially to steps S426 and S441, and the similar processing to that of steps S326 and S341 of the fourth charged terminal determination processing (FIG. 28) is performed, and the process proceeds to step S524.

In step S524, the charged terminal determination unit 33 determines whether or not all the base stations included in the wireless communication system have been selected as the base stations of interest, and in a case where it is determined that all base stations are not selected as the base stations of interest, the process returns to step S515. In step S515, the base station of interest is newly selected, and the similar processing is repeated thereafter.

Furthermore, in step S524, in a case where it is determined that all the base stations included in the wireless communication system have been selected as the base stations of interest, selection of all the base stations included in the wireless communication system as the base stations of interest is reset, and the process proceeds to step S442 of FIG. 39.

In step S442 of FIG. 39 to step S458 of FIG. 40, the similar processing to that of steps S342 to S358 of the fourth charged terminal determination processing (FIGS. 29 and 30) is performed, and the fifth charged terminal determination processing ends.

FIGS. 41, 42, and 43 are diagrams showing examples of a candidate list, a determination list, and a pending list used in the fourth charged terminal determination processing.

FIGS. 44, 45, and 46 are diagrams showing examples of a candidate list, a determination list, and a pending list used in the fifth charged terminal determination processing.

In FIGS. 41 to 46, three base stations B1, B2, and B3 exist as base stations B#j, and six terminals T1, T2, T3, T4, T5, and T6 exist as terminals T#i. FIGS. 41 and 44 show a candidate list, a determination list, and a pending list for the base station B1, and FIGS. 42 and 45 show a candidate list, a determination list, and a pending list for the base station B2. FIGS. 43 and 46 show a candidate list, a determination list, and a pending list for base station B3.

Furthermore, in FIGS. 41 to 46, it is assumed that the numbers of possible terminals of the base stations B1 to B3 are all two.

Now, it is assumed that, by performing the processing of steps S311 to S328 of the fourth charged terminal determination processing (FIGS. 27 to 30) and the processing of steps S361 to S364 as the lowest order terminal priority processing, the candidate lists of the base stations B1 to B3 as shown in FIGS. 41 to 43 (the candidate list after being sorted of step S364) are acquired.

That is, the terminals T1 to T3 are registered in the candidate list of the base station B1 (FIG. 41) in the order of the terminals T1, T2, and T3, and the terminals T3 to T5 are registered in the candidate list of the base station B2 (FIG. 42) in the order of the terminals T4, T5, and T3. In the candidate list of the base station B3 (FIG. 43), the terminals T2 and T6 are registered in the order of the terminals T6 and T2. Note that the priorities of the base station B1 with respect to the terminals T1 to T3 registered in the candidate list of the base station B1 are all the first order, and the priorities of the base station B2 with respect to the terminals T3, T4, and T5 registered in the candidate list of the base station B2 is second, first, and first, respectively. The priorities of the base station B3 with respect to the terminals T2 and T6 registered in the candidate list of base station B3 are second and first, respectively. Therefore, there is no lower order base station for the terminal T1. For the terminal T2, the base station B3 is a lower order base station of the base station B1. For the terminal T3, the base station B2 is a lower order base station of the base station B1. There is no lower order base station for the terminals T4 to T6. As a result, for the terminal T1 among the terminals T1 to T3 registered in the candidate list of the base station B1, there is no lower order base station, so that false is set as the lower order information, and for the terminals T2 and T3, there is a lower order base station, so that true is set. For the terminals T3 to T5 registered in the candidate list of the base station B2 and the terminals T2 and T6 registered in the candidate list of the base station B3, false is set as lower order information since there is no lower order base station.

In this case, by performing processing of steps S342 to S354 among steps S342 to S358 as the charged terminal distribution processing in the fourth charged terminal determination processing (FIGS. 27 to 30), in the determination list of the base station B1, as shown in FIG. 41, the terminals T1 and T2 which are upper two terminals of the registration order in the candidate list of the base station B1 are registered. As shown in FIG. 42, the terminals T4 and T5, which are upper two terminals of the registration order in the candidate list of the base station B2, are registered in the determination list of the base station B2. As shown in FIG. 43, in the determination list of the base station B3, the terminal T6, which is the terminal of the highest registration order in the candidate list of the base station B3, is registered, and as shown in FIG. 43, in the pending list of the base station B3, the terminal T2 of the second registration order in the candidate list of the base station B3 is registered.

That is, for the base station B1 (FIG. 41), the terminal T1 of the highest registration order and the second terminal T2 of the second registration order in the candidate list are not registered in the determination list of the base stations B2 and B3 as cooperating base stations, and therefore, the terminals T1 and T2 are not registered in the pending list of the base station B1, but are registered in the determination list of the base station B1. The terminal T3, of the third registration order in the candidate list, has not been registered in the determination list of the base stations B2 and B3 as cooperating base stations, and is not registered in the pending list of the base station B1. Moreover, when the terminals T1 and T2 are registered in the determination list of the base station B1, there is no vacancy in the determination list of the base station B1, so that the terminal T3 of the third registration order in the candidate list is not registered also in the determination list of the base station B1.

For the base station B2 (FIG. 42), the terminal T4 of the highest registration order and the second terminal T5 of the second registration order in the candidate list are not registered in the determination lists of the base stations B1 and B3 as cooperating base stations, and therefore, the terminals T4 and T5 are not registered in the pending list of the base station B2, but are registered in the determination list of the base station B2. The terminal T3, of the third registration order in the candidate list, has not been registered in the determination lists of the base stations B1 and B3 as cooperating base stations, and is not registered in the pending list of the base station B2. Moreover, when the terminals T4 and T5 are registered in the determination list of the base station B2, there is no vacancy in the determination list of the base station B2, so that the terminal T3 of the third registration order in the candidate list is not registered also in the determination list of the base station B2.

For the base station B3 (FIG. 43), the terminal T6 of the highest registration order in the candidate list is not registered in the determination lists of the base stations B1 and B2 as cooperating base stations, and therefore, the terminal T6 is not registered in the pending list of the base station B3, but is registered in the determination list of the base station B3. The terminal T2, of the second registration order in the candidate list, has been registered in the determination list of the base station B1 (FIG. 41) as a cooperating base station, and is registered in the pending list of the base station B3.

Thereafter, by performing processing of steps S355 to S358 among steps S342 to S358 as the charged terminal distribution processing in the fourth charged terminal determination processing (FIGS. 27 and 30), in the determination list of the base station B3 where there is a vacancy, as shown in FIG. 43, the terminal T2 registered in the pending list is registered.

Therefore, in the fourth charged terminal determination processing, the terminal T3 does not become the charged terminal of any of the base stations B1 to B3.

On the other hand, according to the fifth charged terminal determination processing, in the lowest order terminal priority processing (steps S461 to S464 (FIG. 36) corresponding to steps S361 to S364 of the fourth charged terminal determination processing (FIGS. 27 to 30)), in a case where the candidate lists like FIGS. 41 to 43 are acquired, it is possible to prevent the terminal T3 from not becoming the charged terminal of any of the base stations B1 to B3.

That is, now, in the fifth charged terminal determination processing, it is assumed that, by performing the processing of steps S411 to S428 and the processing of steps S461 to S464 that are similar to the processing of steps S311 to S328 of the fourth charged terminal determination processing and the processing of steps S361 to S364 as the lowest order terminal priority processing, respectively, the candidate lists of the base stations B1 to B3 as shown in FIGS. 44 to 46 (the candidate list after being sorted in step S464) are acquired.

Note that the candidate lists of the base stations B1 to B3 after being sorted in step S464 of FIGS. 44 to 46 are the same as the candidate lists of base stations B1 to B3 after being sorted in step S364 of FIGS. 41 to 43.

Thereafter, in the fifth charged terminal determination processing, the processing of steps S511 to S524 (FIGS. 37 and 38) as the registrability priority processing is performed, and as the candidate lists of the base stations B1 to B3 after being sorted in step S523, the candidate lists as shown in FIGS. 44 to 46 are acquired.

That is, in the candidate list of the base station B1 (FIG. 44) before the registrability priority processing is performed, the terminals T1 to T3 are registered in the order of the terminals T1, T2, and T3. In the candidate list of the base station B2 (FIG. 45), the terminals T3 to T5 are registered in the order of the terminals T4, T5, and T3. In the candidate list of the base station B3 (FIG. 46), the terminals T2 and T6 are registered in the order of the terminals T6 and T2.

According to the registrability priority processing of the fifth charged terminal determination processing, the registrability information of the terminals T1 and T3 becomes false and the registrability information of the terminal T2 becomes true in the candidate list of the base station B1.

That is, for the terminal T1 registered in the candidate list of the base station B1 (FIG. 44), the lower order information is false and there is no secondary base station, so that the registrability information is false.

For the terminal T2 registered in the candidate list of the base station B1 (FIG. 44), the lower order information is true, and there is the base station B3 as a subsequent base station. Then, the number of possible terminals of the base station B3 as the subsequent base station is two, and the registration order of terminals T2 and T6 registered in the candidate list of the base station B3 (FIG. 46) before the registrability priority processing is performed is the order of the terminals T6 and T2. Therefore, the upper two terminals T6 and T2 of the registration order in the candidate list of the base station B3 are easy to be registered in the determination list of the base station B3. As a result, by performing the registrability priority processing is performed, in the candidate list of the base station B1 (FIG. 44), the registrability information of the terminal T2, which is easy to be registered in the determination list of the base station B3 as the subsequent base station is true.

Furthermore, For the terminal T3 registered in the candidate list of the base station B1 (FIG. 44), the lower order information is true, and there is the base station B2 as a subsequent base station. Then, the number of possible terminals of the base station B2 as the subsequent base station is two, and the registration order of terminals T3 to T5 registered in the candidate list of the base station B2 (FIG. 45) before the registrability priority processing is performed is the order of the terminals T4, T5, and T3. Therefore, the upper two terminals T4 and T5 of the registration order in the candidate list of the base station B2 are easy to be registered in the determination list of the base station B2, and the lowest terminal T3 is hard to be registered in the determination list of the base station B2. As a result, by performing the registrability priority processing is performed, in the candidate list of the base station B1 (FIG. 44), the registrability information of the terminal T3, which is easy to be registered in the determination list of the base station B2 as the subsequent base station is false.

In the candidate list of the base station B1 in FIG. 44, for the terminals T2 and T3 of which lower order information is all true, the registrability priority processing is performed, so that the terminal T3 of which registrability information is false is registered (sorted) to be the highest among the terminals T2 and T3.

As a result, in the candidate list of the base station B1 acquired in the registrability priority processing (steps S511 to S524) of the fifth charged terminal determination processing, as shown in FIG. 44, the terminals T1 to T3 are registered in the order of the terminals T1, T3, and T2, and the registration order of the terminal T3 is higher than in a case of FIG. 41.

In this case, by performing the processing of steps S442 to S458 of the fifth charged terminal determination processing, as shown in FIG. 44, in the determination list of the base station B1, the terminals T1 and T3 that are upper two terminals in the candidate list of the base station B1 and have not been registered in the determination list of the base stations B2 and B3 as the cooperating base stations are registered.

Regarding the candidate list of the base station B2 (FIG. 45) acquired by the registrability priority processing of the fifth charged terminal determination processing, since there is no lower order base station to be the subsequent base station for the terminals T3 to T5, the registrability information of the terminals T3 to T5 is false. Therefore, before and after the registrability priority processing, the registration order of the terminals T3 to T5 registered in the candidate list of the base station B2 does not change, and remains in the order of the terminals T4, T5, and T3.

In this case, by performing the processing of steps S442 to S458 of the fifth charged terminal determination processing, as shown in FIG. 45, in the determination list of the base station B2, the terminals T4 and T5 that are upper two terminals in the candidate list of the base station B2 and have not been registered in the determination lists of the base stations B1 and B3 as the cooperating base stations are registered.

Regarding the candidate list of the base station B3 (FIG. 46) acquired by the registrability priority processing of the fifth charged terminal determination processing, since there is no lower order base station to be the subsequent base station for the terminals T2 and T6, the registrability information of the terminals T2 and T6 is false. Therefore, before and after the registrability priority processing, the registration order of the terminals T2 and T6 registered in the candidate list of the base station B3 does not change, and remains in the order of the terminals T6 and T2.

In this case, by performing the processing of steps S442 to S458 of the fifth charged terminal determination processing, as shown in FIG. 46, in the determination list of the base station B3, the terminals T6 and T2 that are upper two terminals in the candidate list of the base station B3 and have not been registered in the determination list of the base stations B1 and B2 as the cooperating base stations are registered.

Therefore, in the fifth charged terminal determination processing, the terminal T3, which has not been the charged terminal of any of the base stations B1 to B3 in the fourth charged terminal determination processing, is registered in the determination list of the base station B1 (FIG. 44), and becomes the charged terminal of the base station B1. As a result, in the fifth charged terminal determination processing, all of the terminals T1 to T6 become the charged terminals of any of the base stations B1 to B3, as in the case of FIGS. 41 to 43, it is possible to prevent the terminal T3 from not becoming a charged terminal of any of the base stations B1 to B3.

<Explanation of Computer to which the Present Technology is Applied>

Next, the series of processing described above can be also executed by hardware or can be executed by software. In a case where a series of processing is executed by software, a program constituting the software is installed in a general computer or the like.

FIG. 47 is a block diagram showing a configuration example of an embodiment of a computer on which a program for executing the above-described series of processing is installed.

The program can be recorded in advance on a hard disk 905 or ROM 903 as a recording medium built in the computer.

Alternatively, the program can be stored (recorded) in a removable recording medium 911 driven by a drive 909. Such a removable recording medium 911 can be provided as so-called package software. Here, examples of the removable recording medium 911 include a flexible disk, a compact disc read only memory (CD-ROM), a magneto optical (MO) disk, a digital versatile disc (DVD), a magnetic disk, and a semiconductor memory.

Note that the program can be installed on the computer from the removable recording medium 911 as described above, or can be downloaded to the computer via a communication network or a broadcasting network and installed on the built-in hard disk 905. That is, for example, the program can be wirelessly transferred from a download site to a computer via an artificial satellite for digital satellite broadcasting, or can be transferred to the computer by wire via a network such as the local area network (LAN) or the Internet.

The computer has a built-in central processing unit (CPU) 902, and an input and output interface 910 is connected to the CPU 902 via the bus 901.

When a command is input by the user by operating the input unit 907 or the like via the input and output interface 910, the CPU 902 executes a program stored in the read only memory (ROM) 903 according to the command. Alternatively, the CPU 902 loads the program stored in the hard disk 905 into the random access memory (RAM) 904 and executes the program.

Therefore, the CPU 902 performs the processing according to the above-described flowchart or the processing performed according to the above-described block diagram configuration. Then, for example, the CPU 902 outputs the processing result from the output unit 906, transmits the processing result from the communication unit 908, or records the processing result on the hard disk 905, via the input and output interface 910 as necessary.

Note that the input unit 907 includes a keyboard, a mouse, a microphone, and the like. Furthermore, the output unit 906 includes a liquid crystal display (LCD), a speaker, and the like.

Here, in the present specification, processing performed by a computer according to a program does not necessarily need to be performed in a time series in the order described in the flowchart. That is, the processing performed by the computer according to the program also includes processing executed in parallel or individually (for example, parallel processing or processing by an object).

Furthermore, the program may be processed by one computer (processor) or processed by a plurality of computers in a distributed manner. Moreover, the program may be transferred to a distant computer and executed.

Moreover, in this specification, a system means a set of a plurality of constituent elements (devices, modules (parts), or the like), and it does not matter whether or not all constituent elements are in the same casing. Therefore, a plurality of devices that is housed in separate housings and is connected via a network, and one device in which a plurality of modules is housed in one housing are both systems.

Note that the embodiments of the present technology are not limited to the above-described embodiments, and various modifications are possible without departing from the gist of the present technology.

For example, in the present technology, it is possible to adopt a configuration of cloud computing in which one function is shared by a plurality of devices via a network, and is collaboratively processed.

Furthermore, each step described in the above-described flowchart can be executed by one device or shared by a plurality of devices.

Moreover, in a case where a plurality of processes is included in one step, a plurality of processes included in the one step can be executed by one device or shared and executed by a plurality of devices.

Furthermore, in the present embodiment, based on the first charged terminal determination processing, in the second charged terminal determination processing, an out-of-area terminal avoidance processing is added to the first charged terminal determination processing, and in the third charged terminal determination processing, the charged terminal distribution processing is added to the second charged terminal determination processing. Furthermore, in the fourth charged terminal determination processing, the lowest order terminal priority processing is added to the third charged terminal determination processing, and in the fifth charged terminal determination processing, the registrability priority processing is added to the fourth charged terminal determination processing.

The more the charged terminal distribution processing, the lowest order terminal priority processing, and the registrability priority processing are added to the first charged terminal determination processing, it is possible to prevent more the terminal from not becoming a charged terminal of any of the base stations. However, the more the out-of-area terminal avoidance processing, the charged terminal distribution processing, the lowest order terminal priority processing, and the registrability priority processing are added to the first charged terminal determination processing, the more the processing amount of the management server 30 increases.

Therefore, the management server 30 can dynamically change the charged terminal determination processing performed by the management server 30 according to the load applied to the management server 30.

For example, in a case where the number of terminals subject to the charged terminal determination processing is small, the management server 30 can perform the fourth or fifth charged terminal determination processing. Then, as the number of terminals subject to the charged terminal determination processing increases, the management server 30 can subsequently change the charged terminal determination processing performed by the management server 30 to the third charged terminal determination processing, the second charged terminal determination processing, and the first charged terminal determination processing.

Furthermore, in a case where there is no terminal that moves as terminal T#i, when the management server 30 performs the third to fifth charged terminal determination processing, processing excluding the out-of-area terminal avoidance processing from the third to fifth charged terminal determination processing (precisely, processing of registering to the candidate list of the base station of interest not by the out-of-area terminal avoidance processing (steps S131 to S136) but by steps S13 and S14 (FIG. 9) of the first charged terminal determination processing) can be performed.

Note that, the effects described in the present specification are merely examples and are not intended to be limiting, and other effects may be provided.

The present technology can adopt the following configuration.

<1>

An information processing apparatus including a charged terminal determination unit that sets priority of a base station in charge of receiving processing of a terminal among base stations that have received a connection request from the terminal for each of a plurality of terminals, and determines a charged terminal in charge of the receiving processing for each of a plurality of base stations according to the priority of the base station.

<2>

The information processing apparatus according to <1>, in which the charged terminal determination unit determines the charged terminal of the base station of interest so as to avoid determination of the terminal that has moved to an outside of a receivable area in which a base station of interest can take charge of the receiving processing, as a charged terminal of the base station of interest.

<3>

The information processing apparatus according to <2>, in which the charged terminal determination unit determines the charged terminal of the base station of interest so as to avoid determination of the terminal for which the connection request has not been received by the base station of interest and for which the connection request has been received by another base station, as the charged terminal of the base station of interest.

<4>

The information processing apparatus according to any one of <1> to <3>, in which the charged terminal determination unit determines the terminal that has not been determined as a charged terminal of another base station, as the charged terminal of the base station of interest for each priority of the base station of interest, and in a case where there is vacancy for the charged terminal of the base station of interest, determines the terminal that has been determined as the charged terminal of the another base station among pieces of the terminal for which priority of the base station of interest have been set, as the charged terminal of the base station of interest for the number of vacancy.

<5>

The information processing apparatus according to <4>, in which the charged terminal determination unit determines the terminal that has not been determined as a charged terminal of another base station, as the charged terminal of the base station of interest in descending order of the priority of the base station of interest, and in a case where there is vacancy for the charged terminal of the base station of interest, determines the terminal that has been determined as the charged terminal of the another base station among pieces of the terminal for which priority of the base station of interest has been set, as the charged terminal of the base station of interest for the number of the vacancy.

<6>

The information processing apparatus according to any one of <1> to <5>, in which the charged terminal determination unit preferentially determines the terminal of a lowest priority of the base station of interest as the charged terminal of the base station of interest.

<7>

The information processing apparatus according to any one of <1> to <6>, in which the charged terminal determination unit preferentially determines the terminal that is hard to be the charged terminal of a lower order base station of a lower priority than the base station of interest as the charged terminal of the base station of interest according to tendency of the terminal to be the charged terminal of the lower order base station.

<8>

The information processing apparatus according to any one of <1> to <7>, in which the charged terminal determination unit sets priority of the base station with respect to the terminal according to a signal to interference noise ratio (SINR) when the base station receives the connection request from the terminal.

<9>

The information processing apparatus according to any one of <1> to <8>, in which the charged terminal determination unit sets the priority of the base station with respect to the terminal according to a distance between the base station and the terminal.

<10>

The information processing apparatus according to <1>, in which the base station transmits a connection request list in which the terminal for which the connection request has been received is registered, and the charged terminal determination unit performs a charged terminal determination processing including registering the terminal registered in the connection request list of the base station of interest, and the terminal registered in a determination list in which the charged terminal of the base station of interest has been registered, the determination list being acquired by a previous charged terminal determination processing, in the candidate list in which the terminal as a candidate for the charged terminal is registered, setting priority of the base station of interest for which a terminal of interest has been registered in the candidate list and priority of a base station that takes charge of receiving processing of the terminal of interest in cooperating base stations that cooperate with the base station of interest, with respect to the terminal of interest, sorting pieces of the terminal registered in the candidate list of the base station of interest according to the priority, and registering the pieces of the terminal registered in the candidate list of the base station of interest in the determination list of the base station of interest as the charged terminal of the base station of interest for the number of possible terminals for which the base station of interest can take charge of the receiving processing, in the registration order.

<11>

The information processing apparatus according to <10>, in which the charged terminal determination unit registers the terminal that has not been registered in the connection request list of the base station of interest and has not been registered in the connection request list of the cooperating base station among the terminals registered in the determination list of the base station of interest acquired by previous charged terminal determination processing, in the candidate list of the base station of interest.

<12>

The information processing apparatus according to <10> or <11>, in which the charged terminal determination unit registers the terminal that has not been registered in the determination list of the cooperating base station among the terminals registered in the candidate list of the base station of interest, in the determination list of the base station of interest in registration order of the candidate list of the base station of interest after being sorted according to the priority, registers the terminal that has been registered in the determination list of the cooperating base station in a pending list in which the terminal suspended from being registered in the determination list is registered, and registers the terminal registered in the pending list of the base station of interest in the determination list of the base station of interest in registration order until the number of the terminal registered in the determination list of the base station of interest reaches the number of possible terminals.

<13>

The information processing apparatus according to any one of <10> to <12>, in which the charged terminal determination unit sorts pieces of the terminal registered in the candidate list of the base station of interest in order of the priority and lower order information according to the priority and the lower order information indicating whether or not there is a lower order base station for which priority lower than priority of the base station of interest is set with respect to the terminal.

<14>

The information processing apparatus according to any one of <10> to <13>, in which the charged terminal determination unit sorts the pieces of the terminal registered in the candidate list of the base station of interest in order of the priority and registrability information according to the priority and the registrability information indicating tendency of the terminal to be registered in the determination list of the lower order base station for which the priority lower than the priority of the base station of interest is set with respect to the terminal.

<15>

An information processing method including steps of setting priority of a base station in charge of receiving processing of a terminal among base stations that have received a connection request from the terminal for each of a plurality of terminals, and determining a charged terminal in charge of the receiving processing for each of a plurality of base stations according to the priority of the base station.

<16>

A program for causing a computer to function as a charged terminal determination unit that sets priority of a base station in charge of receiving processing of a terminal among base stations that have received a connection request from the terminal for each of a plurality of terminals, and determines a charged terminal in charge of the receiving processing for each of a plurality of base stations according to the priority of the base station.

REFERENCE SIGNS LIST

11 Wireless communication unit
12 Control unit
21 Wireless communication unit
22 Wired communication unit
23 Control unit
24 Demodulation unit
25 Terminal information storage unit
31 Communication unit
32 Control unit
33 Charged terminal determination unit
901 Bus
902 CPU
903 ROM
904 RAM
905 Hard disk
906 Output unit
907 Input unit
908 Communication unit
909 Drive
910 Input and output interface
911 Removable recording medium

The invention claimed is:

1. An information processing apparatus, comprising:
a charged terminal determination unit configured to:
set a priority of each base station among a plurality of base stations,
wherein the priority of each base station is set for a terminal of a plurality of terminals, and each base station of the plurality of base stations receives a connection request from the terminal; and
determine a charged terminal from the plurality of terminals for each base station based on the priority of a corresponding base station,
wherein each base station is in charge of receiving processing for the charged terminal,
wherein each base station transmits a connection request list in which the terminal for which the connection request is received is registered, and
the charged terminal determination unit is further configured to
perform a first charged terminal determination processing;
in the first charged terminal determination processing, the charged terminal determination unit is further configured to:
register the terminal registered in the connection request list of a first base station of the plurality of base stations, and the terminal registered in a determination list in which the charged terminal of the first base station is registered,
wherein the determination list is acquired by a second charged terminal determination processing, in a candidate list in which the terminal as a candidate for the charged terminal is registered, and the second charged terminal determination processing is performed prior to the first charged terminal determination processing;
set priority of the first base station for which a terminal of interest is registered in the candidate list and priority of a second base station of the plurality of base station that takes charge of the receiving processing of the terminal of interest in cooperating base stations that cooperate with the first base station of interest, with respect to the terminal of interest.

2. The information processing apparatus according to claim 1, wherein
the charged terminal determination unit is further configured to determine the charged terminal for a base station of the plurality of base stations, and
the charged terminal is inside of an area in which the base station takes charge of the receiving processing.

3. The information processing apparatus according to claim 2, wherein
the charged terminal determination unit is further configured to determine the charged terminal for the base station, and
the base station receives the connection request from the charged terminal.

4. The information processing apparatus according to claim 1, wherein
the charged terminal determination unit is further configured to determine, as the charged terminal, a terminal from the plurality of terminals,
the charged terminal is determined for a first base station of the plurality of base stations,
the terminal is not determined as the charged terminal for a second base station different from the first base station
the plurality of base stations includes the second base station, and
in a case of vacancy for the charged terminal for the first base station, the charged terminal determination unit is further configured to determine the terminal determined as the charged terminal for the second base station for which priority of the first base station is set, as the charged terminal for the first base station of interest.

5. The information processing apparatus according to claim 4, wherein
the charged terminal determination unit is further configured to determine the terminal not determined as the charged terminal for the second base station, as the charged terminal for the first base station in descending order of the priority of the first base station of interest, and
in a case of vacancy for the charged terminal for the first base station, the charged terminal determination unit is further configured to determine the terminal determined as the charged terminal for the second base station for which priority of the first base station is set, as the charged terminal of the first base station.

6. The information processing apparatus according to claim 1, wherein the charged terminal determination unit is further configured to determine the terminal of a lowest priority for a base station of the plurality of base stations as the charged terminal for the base station.

7. The information processing apparatus according to claim 1, wherein the charged terminal determination unit is further configured to set the priority of each base station with respect to the terminal based on a signal to interference noise ratio (SINR) when a corresponding base station receives the connection request from the terminal.

8. The information processing apparatus according to claim 1, wherein the charged terminal determination unit is further configured to set the priority of each base station with respect to the terminal based on a distance between a corresponding base station and the terminal.

9. The information processing apparatus according to claim 1,
wherein the plurality of base stations includes the cooperating base stations;
sort a set of terminals registered in the candidate list of the first base station based on the priority; and
register the set of terminals registered in the candidate list of the first base station in the determination list of the first base station as the charged terminal of the first base station for a number of possible terminals for which the first base station takes charge of the receiving processing, in a registration order.

10. The information processing apparatus according to claim 9, wherein the charged terminal determination unit is further configured to register the terminal that is not registered in the connection request list of the first base station and not registered in a connection request list of the cooperating base stations among a set of terminals of the plurality of terminals registered in the determination list of the first base station acquired by the second charged terminal determination processing, in the candidate list of the first base station.

11. The information processing apparatus according to claim 9, wherein the charged terminal determination unit is further configured to:
register the terminal that is not registered in the determination list of the cooperating base stations among a set of terminals of the plurality of terminals registered in the candidate list of the first base station, in the determination list of the first base station in the registration order of the candidate list of the first base station after being sorted based on the priority;
register the terminal that is registered in the determination list of the cooperating base stations in a pending list in which the terminal suspended from being registered in the determination list is registered; and
register the terminal registered in the pending list of the first base station in the determination list of the first base station in the registration order until a number of terminals registered in the determination list of the first base station reaches the number of possible terminals.

12. The information processing apparatus according to claim 9, wherein the charged terminal determination unit is further configured to sort the set of terminals registered in the candidate list of the first base station in order of the priority and lower order information whether there is a lower order base station for which a priority lower than the priority of the first base station is set with respect to the terminal.

13. The information processing apparatus according to claim 9, wherein the charged terminal determination unit is further configured to sort the set of terminals registered in the candidate list of the first base station in order of the priority and registrability information indicating tendency of the terminal to be registered in the determination list of a lower order base station for which a priority lower than the priority of the first base station is set with respect to the terminal.

14. An information processing method, comprising:
setting priority of each base station among a plurality of base stations,
wherein the priority of each base station is set for a terminal of a plurality of terminals, and each base station of the plurality of base stations receives a connection request from the terminal; and
determining a charged terminal from the plurality of terminals for each base station based on the priority of a corresponding base station,
wherein each base station is in charge of the receiving processing for the charged terminal,
wherein each base station transmits a connection request list in which the terminal for which the connection request is received is registered, and
the charged terminal determination unit is further configured to
perform a first charged terminal determination processing;
in the first charged terminal determination processing, the charged terminal determination unit is further configured to:
register the terminal registered in the connection request list of a first base station of the plurality of base stations, and the terminal registered in a determination list in which the charged terminal of the first base station is registered,
wherein the determination list is acquired by a second charged terminal determination processing, in a candidate list in which the terminal as a candidate for the charged terminal is registered, and the second charged terminal determination processing is performed prior to the first charged terminal determination processing;
set priority of the first base station for which a terminal of interest is registered in the candidate list and priority of a second base station of the plurality of base station that takes charge of the receiving processing of the terminal of interest in cooperating base stations that cooperate with the first base station of interest, with respect to the terminal of interest.

15. A non-transitory computer-readable medium having stored thereon, computer-executable instructions which, when executed by a computer, cause the computer to execute operations, the operations comprising:
setting priority of each base station among a plurality of base stations,
wherein the priority of each base station is set for a terminal of a plurality of terminals, and each base station of the plurality of base stations receives a connection request from the terminal; and
determining a charged terminal from the plurality of terminals in charge for each base station based on the priority of a corresponding base station,
wherein each base station is in charge of the receiving processing for the charged terminal,
wherein each base station transmits a connection request list in which the terminal for which the connection request is received is registered, and
the charged terminal determination unit is further configured to
perform a first charged terminal determination processing;
in the first charged terminal determination processing, the charged terminal determination unit is further configured to:
register the terminal registered in the connection request list of a first base station of the plurality of base stations, and the terminal registered in a determination list in which the charged terminal of the first base station is registered,
wherein the determination list is acquired by a second charged terminal determination processing, in a candidate list in which the terminal as a candidate for the charged terminal is registered, and the second charged terminal determination processing is performed prior to the first charged terminal determination processing;

set priority of the first base station for which a terminal of interest is registered in the candidate list and priority of a second base station of the plurality of base station that takes charge of the receiving processing of the terminal of interest in cooperating base stations that cooperate with the first base station of interest, with respect to the terminal of interest.

* * * * *